United States Patent [19]
Hayashi

[11] Patent Number: 5,982,947
[45] Date of Patent: Nov. 9, 1999

[54] IMAGE FORMING APPARATUS WITH COLOR ADJUSTMENT

[75] Inventor: Kouji Hayashi, Yokohama, Japan

[73] Assignee: Ricoh Company, Ltd., Tokyo, Japan

[21] Appl. No.: 08/725,825

[22] Filed: Oct. 7, 1996

[30] Foreign Application Priority Data

Oct. 6, 1995 [JP] Japan .................................. 7-286861
Oct. 11, 1995 [JP] Japan .................................. 7-290279
Oct. 11, 1995 [JP] Japan .................................. 7-290285

[51] Int. Cl.$^6$ .................................................. H01N 1/40
[52] U.S. Cl. ........................................ 382/274; 382/275
[58] Field of Search .................................. 382/274–275, 382/286; 358/406, 504

[56] References Cited

U.S. PATENT DOCUMENTS 4,751,377  6/1988  Ishizaka et al. ....................... 250/205
5,258,783  11/1993 Sasanuma et al. ..................... 346/157
5,321,524  6/1994  Yanagita ................................. 358/455

FOREIGN PATENT DOCUMENTS 0 269 033  6/1988  European Pat. Off. .

Primary Examiner—Thomas D Lee
Assistant Examiner—Stephen Brinich
Attorney, Agent, or Firm—Oblon, Spivak, McClelland, Maier & Neustadt, P.C.

[57] ABSTRACT

A digital image forming apparatus capable of allowing the colors of an image to be adjusted is disclosed. The apparatus guarantees tonality in a high image density portion and allows a low image density portion to be reproduced with a target density. Tonality correction tables can be generated without regard to the material of a recording medium or whether or not a cover plate or an ADF (Automatic Document Feeder) is laid on the medium. Further, the contribution of background data included in a scanner output representative of exclusive patterns can be determined machine by machine.

21 Claims, 39 Drawing Sheets

| Fig. 9A |
|---------|
| Fig. 9B |

EXECUTION OF AIC ( SUB:EXECUTION OF AIC )

OUTPUT PATTERNS ON MEDIUM — S11

MEDIUM IS LAID ON GLASS PLATEN — S12

CAUSE SCANNER TO READ MEDIUM — S13

S14 BACKGROUND CORRECTION SELECTED ?

N

Y — S15

EXECUTE BACKGROUND CORRECTION

Fig. 11

AIC  [END]

FOR COPY  [EXECUTE] [RETURN]

FOR PRINTER  [EXECUTE] [RETURN]

BACKGROUND CORRECTION  [ON] [OFF]

CORRECTION OF DENSE PORTION  [ON] [OFF]

Fig. 12

AIC

A TEST PATTERN WILL BE PRINTED.
CHECK PAPER AND TOUCH PRINT START KEY.

[PRINT START]  [CANCEL]

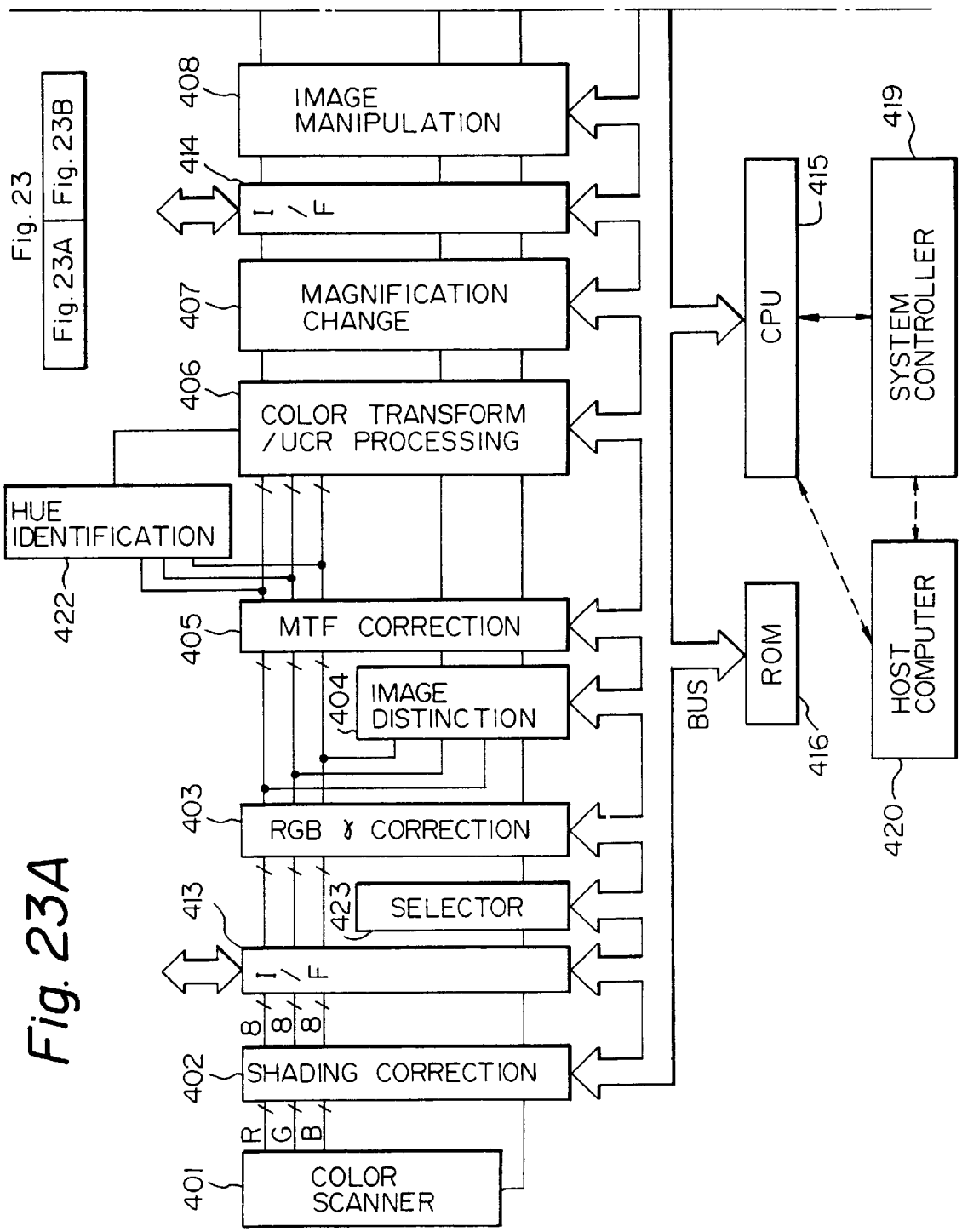

WITHOUT RGB γ TRANSFORM

Fig. 34

| AIC | END |

| REGISTRATION OF BACKGROUND CORRECTION DATA | ON |

| BACKGROUND CORRECTION | ON | OFF |
| RGB γ TRANSFORM | ON | OFF |

SELECT OFF IF HIGHLIGHT PORTION IS IMPORTANT.

| AIC | ON |

| RETURN | ON |

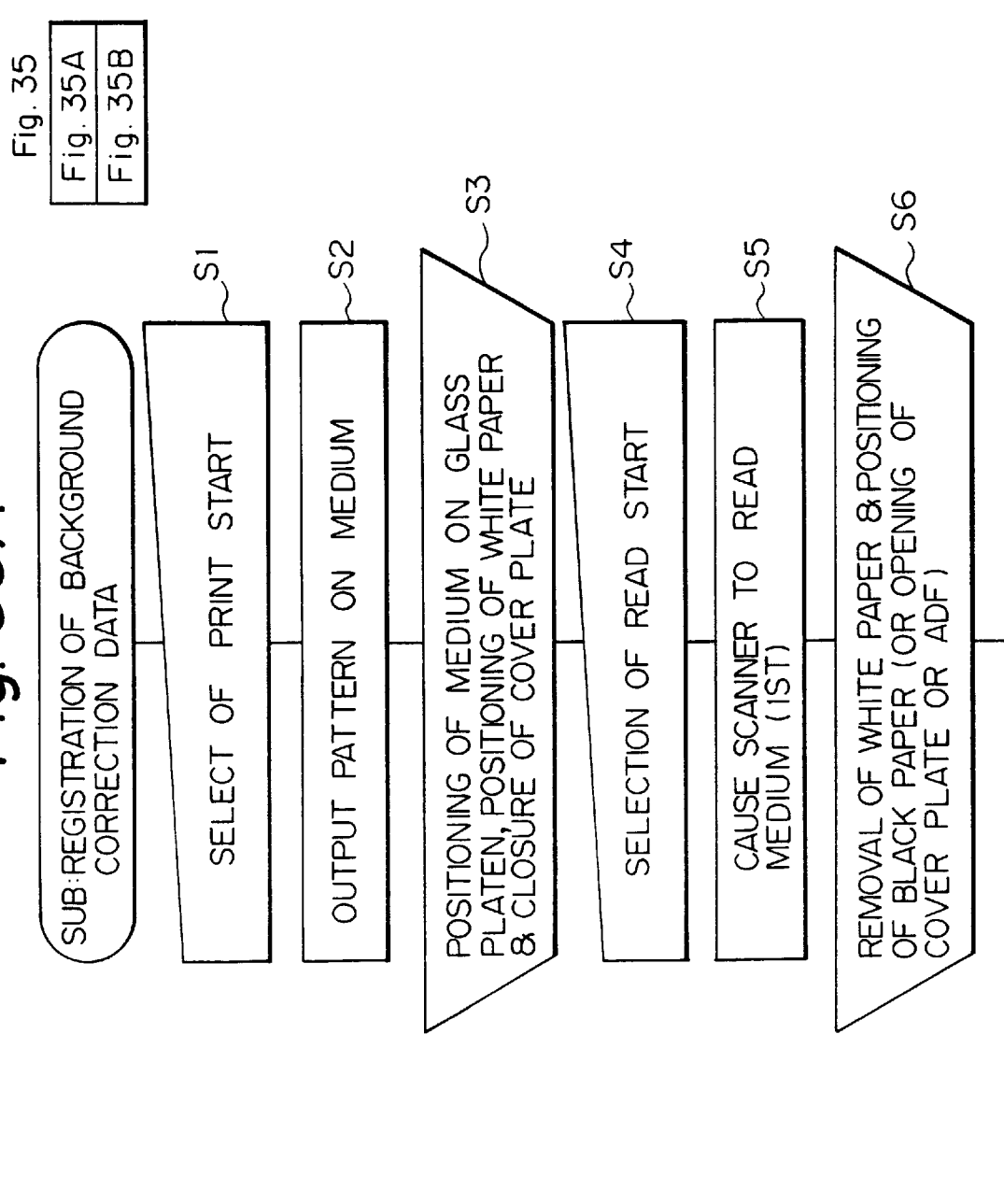

REGISTRATION OF BACKGROUND CORRECTION DATA

A TEST PATTERN WILL BE PRINTED.
CHECK SHEET AND TOUCH PRINT START KEY.

PRINT START    CANCEL

REGISTRATION OF BACKGROUND CORRECTION DATA

POSITION THE TEST PATTERN ON GLASS IN THIS POSITION, PUT WHITE PAPER OR CLOSE COVER PLATE, AND TOUCH READ START KEY.

POSITION ON GLASS PLATEN

SHEET

WHITE PAPER    READ START    CANCEL

IMAGE FORMING APPARATUS WITH COLOR ADJUSTMENT

BACKGROUND OF THE INVENTION

1. Field of the Invention

The present invention relates to a digital copier, printer, facsimile apparatus or similar image forming apparatus and, more particularly, to an image forming apparatus allowing the colors of an image to be adjusted.

2. Discussion of the Background

It is a common practice with a digital image forming apparatus to use a look-up table (LUT) for correcting the output characteristic of a printer included in the apparatus or for enhancing a particular density range. Generally, the apparatus includes image reading or scanning means, image processing means, image writing means, and image processing means. The LUT is included in the image processing means and allows an image signal input from the image reading means to the processing means to be transformed and then output to the image writing means as an output image signal.

The problem with the LUT is that because it reflects the output characteristic of the printer as to image density, sufficient correction is not achievable when the characteristic of the printer varies due to aging or contamination. In light of this, so-called process control has customarily been executed within the apparatus. For the process control, a plurality of patterns each having a particular density are formed on a photoconductive drum, transfer body or similar image carrier. An optical sensor senses light reflected from or transmitted through each of the patterns. Then, a charge potential, bias for development and amount of laser exposure are varied on the basis of the output of the sensor, or a tonality correction table is varied. This process control is automatically executed within the apparatus and does not need any manual operation. However, because the optical sensor is not sensitive to a high density portion where a great amount of toner is deposited, it allows correction to be executed only in a low density portion to a medium density portion. Moreover, the process control cannot cope with the amount of transferred toner varying due to the aging of an image transfer section and the fixing ability of a fixing section also varying due to aging.

It has also been customary to transfer a pattern image from an image carrier to a recording medium, fix it on the medium, and cause a scanner to read it. This kind of scheme allows a tonality correction table to be selected or generated on the basis of data output from the scanner, or allows color transform coefficients and RGB (Red, Green, Blue) to YMCK (Yellow, Magenta, Cyan, Black) color transform tables to be generated. Although this approach requires manual operation, e.g., requires a person to lay the recording medium driven out of the apparatus on a glass platen, it allows correction to be effected with a high density portion where a great amount of toner is deposited. In addition, correction can be made against the aging of the image transfer section and the varying ability of the fixing section.

Japanese Patent Laid-Open publication No. 5-114962 proposes a correction method using a test pattern loaded in the apparatus itself. After image forming means built in the apparatus has formed an image representative of the test pattern on a recording medium, the recording medium is driven out of the apparatus. Then, image reading means also built in the apparatus automatically reads the image of the medium. An image signal transform table is corrected on the basis of an image signal output from the image reading means. Such a self-testing arrangement is capable of reflecting the momentary variation of the characteristic ascribable to, e.g., the deterioration of the image forming means. Therefore, despite the varying characteristic of, e.g., the image forming means, the transform table can be maintained in its optimal condition, insuring high image quality.

However, the conventional approaches described above have some problems yet to be solved, as follows.

(1) To generate the tonality correction table, use is made of reference data stored in a ROM (Read Only Memory) or a RAM (Random Access Memory). The reference data or target data are implemented as a combination of values input to the table and target values. The target values are each associated with a value produced by electrostatically forming a latent image on a photoconductive element with a preselected laser output, developing the latent image, transferring the resulting toner image to a recording medium, and reading the toner image with a scanner. Toner included in a developer bears a great amount of charge in its initial condition or in a low humidity environment. In this condition, it is likely that the toner fails to deposit on the photoconductive element or image carrier in a sufficient amount. Then, the actual image density (particularly the maximum density) on the medium undergone fixation is short of the target image density represented by the reference data. As a result, the table generated has its high density portion smeared out. Although the target image density can be faithfully reproduced up to the maximum density which the printer can output, only a constant image density is available with higher target densities and causes tonality information or the details of an image to be lost.

(2) After the recording medium has been laid on the glass platen, a cover plate or an ADF (Automatic Document Feeder) is used to cover the medium from above. The output of the scanner varies for the same recording medium, depending on which of the cover plate and ADF overlies the medium. As a result, the amount of correction and therefore the result of the correction table varies. Such a difference stems from the difference in reflectance between the surfaces pressing the document from above. Specifically, light issuing from a halogen lamp included in the scanner is partly reflected from the medium, reflected by a first to a third mirror, and then incident to a CCD (Charge Coupled Device) image sensor. At the same time, the light is partly transmitted through the medium, reflected from the rear of the document, again transmitted through the medium, reflected by the first to third mirrors, and then incident to the image sensor. When the rear of the medium or document has a high reflectance, a great amount of light is incident to the image sensor, so that the density of the image is determined to be low. On the other hand, when the rear of the document has a low reflectance, the amount of light incident to the image sensor decreases, so that the density of the document is determined to be high. While the cover plate is implemented as a plate formed of plastics or coated with vinyl, the ADF usually conveys the document with a conveyor belt. The cover plate and belt each has a particular surface reflectance, and each eventually results in different data despite that the toner pattern is the same. Consequently, the correction table selected, and therefore tonality to be output on a recording medium, differs from the case using the cover plate to the case using the ADF. This problem is particularly serious when an image generated by a computer is to be printed on a recording medium. An image generated by a computer must be reproduced with the same tonality without regard to which of the cover plate and ADF is used.

Another issue is the kind of the recording medium, e.g., a thin paper, thick paper, recycled paper, or paper with a high degree of whiteness. Even when images are printed by the same printer at the same period and even if the developing characteristic of the printer is constant, the data output from the image sensor differs due to the difference in the amount of reflection or that of transmission ascribable to the kind of the recording medium. As a result, the developing characteristic differs in the apparent sense, causing an inadequate correction table to be used.

It is difficult to compute the contribution (ratio) of background data contained in the scanner output more accurately due to the difference between scanners and irregularity in adjustment (within an allowable range). Therefore, the result of automatic adjustment differs from one machine to another machine.

SUMMARY OF THE INVENTION

It is therefore an object of the present invention to provide an image forming apparatus capable of insuring the tonality of a high image density portion and reproducing a low image density portion with a target density.

It is another object of the present invention to provide an image forming apparatus capable of generating tonality correction tables without regard to the kind of a recording medium or a cover plate or an ADF selectively used.

It is another object of the present invention to provide an image forming apparatus allowing the contribution of background data contained in scanner output to be determined machine by machine.

In accordance with the present invention, an image forming apparatus includes an image reading device for reading a document located at a preselected position by optically scanning it to thereby output an image signal. An image processing device transforms the image signal to an output image signal. An image writing device writes information on an image carrier in accordance with the output image signal. An image forming device forms an image on a recording medium with a developer. The image processing device or said image writing device includes an image signal generating device for generating a plurality of patterns and an image signal transform table disposed in the image processing device for transforming the image signal output from the image reading device to the output image signal. The image signal transform table is corrected by reference data in response to an output signal of the image reading device read image patterns formed by the image writing device and image forming device on the basis of the plurality of patterns. The reference data consist of the output signal of the image reading devcie and input values input to the image signal transform table and are corrected in accordance with read values read out of the plurality of patterns.

Also, in accordance with the present inventiopn, in an image forming apparatus of the type having the image reading device, image processing device, image writing device, and image forming device, the image processing device or the image writing device includes an image signal generating device for generating a plurality of patterns and an image signal transform table disposed in the image processing device for transforming the image signal output from the image reading device to the output image signal. The image signal transform table is corrected by reference data in response to an output signal of the image reading device read image patterns formed by the image writing device and image forming device on the basis of the plurality of patterns. The reference data includes input values input to the image signal transform table. The apparatus further includes a device for designating a range of the reference data to be corrected in accordance with the read values read out of the plurality of patterns, and a range not to be corrected.

Further, in accordance with the present invention, in an image forming apparatus of the type having the image reading device, image processing device, image writing device, and image forming device, the image processing device or the image writing device includes an image signal generating device for generating a plurality of patterns and an image signal transform table disposed in the image processing device for transforming the image signal output from the image reading device to the output image signal. In a procedure for correcting the image signal transform table with reference data in response to an output signal of the image reading device read image patterns formed by the image writing device and image forming device on the basis of the plurality of patterns, data representative of the background of the recording medium is read, and the output signal of the image reading device is corrected on the basis of such data.

Moreover, in accordance with the present invention, in an image forming apparatus of the type having the image reading device, image processing device, image writing device, and image forming device, the image processing device or the image writing device includes an image signal generating device for generating a plurality of patterns and an image signal transform table disposed in the image processing device for transforming the image signal output from the image reading means to the output image signal. The image signal transform table is corrected by reference data in response to an output signal of the image reading device read image patterns formed by the image writing device and image forming device on the basis of said plurality of patterns. The output signal of the image reading device is corrected in accordance with reference data and data representative of the background of the recording medium. The amount of correction of the data of the background is determined on the basis of the result of comparison between a signal output from the image reading device when the reflectance of a material forming the rear of the recording medium carrying the patterns is increased and a signal output when the reflectance is reduced.

BRIEF DESCRIPTION OF THE DRAWINGS

The above and other objects, features and advantages of the present invention will become apparent from the following detailed description taken with the accompanying drawings in which:

FIGS. 11 and 12 each shows a particular picture to appear on the operation panel;

FIG. 34 shows a specific picture to appear on the operation panel;

DESCRIPTION OF THE PREFERRED EMBODIMENTS

Figure 22:
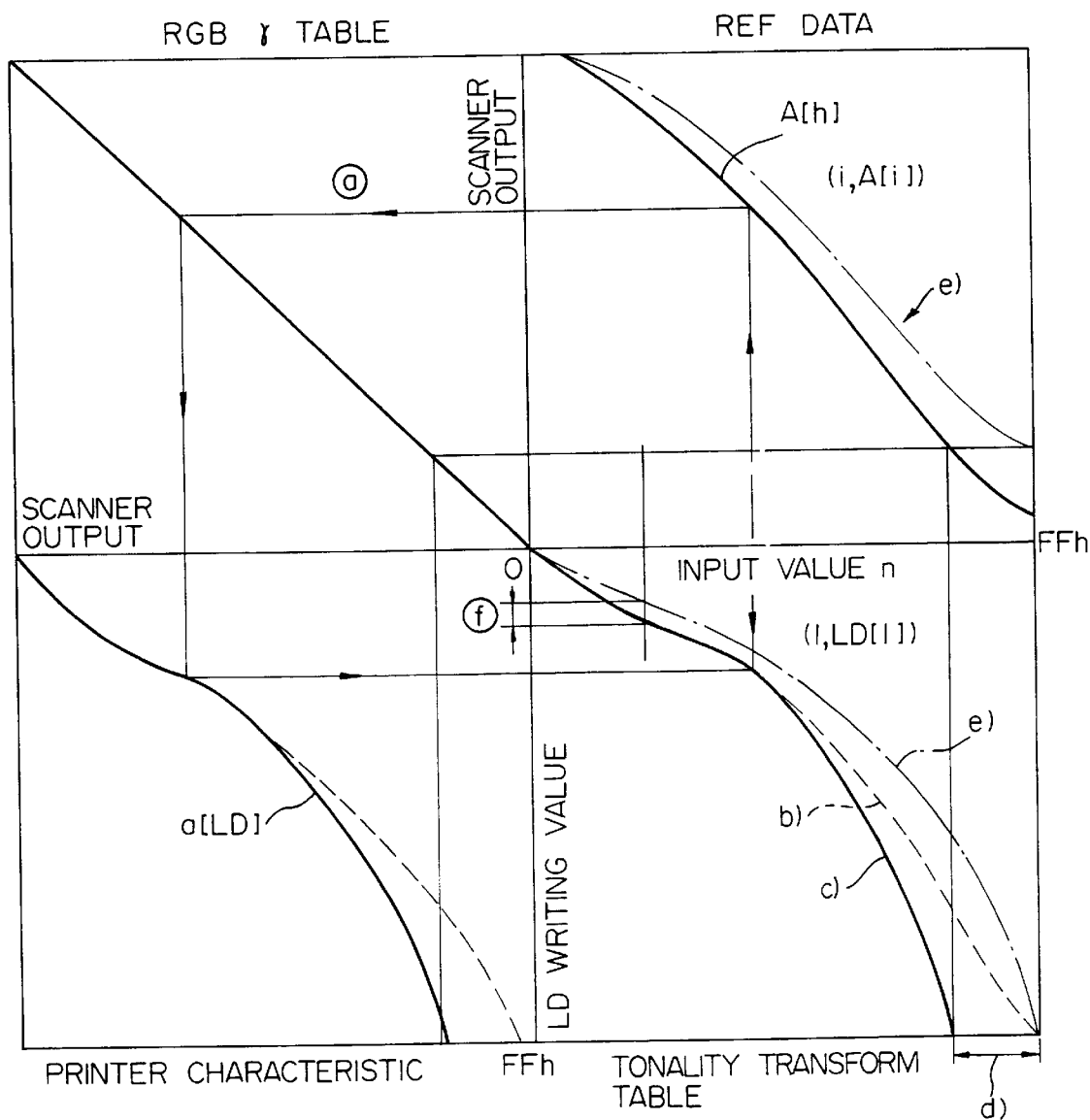
FIG. 22 shows a specific conventional YMCK γ correction table.

To better understand the present invention, a reference will be made to FIG. 22 for describing the previously stated problem (1) of the conventional correction schemes more specifically. FIG. 22 shows a specific conventional YMCK γ correction table. In the table, the first quadrant is representative of the reference data A[i] mentioned earlier. In the first quadrant, the abscissa indicates values n input to a YMCK tonality transform table while the ordinate indicates values read by a scanner and undergone RBG γ conversion. The second quadrant is representative of an RBG γ transform table. In the second quadrant, the abscissa indicates input values not subjected to RBG γ transform while the ordinate indicates output values subjected to the transform; the RGB γ transform is not effected in this case (through). The third quadrant is representative of a printer characteristic; the abscissa indicates values which the scanner read out of a transfer medium carrying a toner pattern formed by a preselected laser diode (LD) output. When the RGB γ transform is not effected, the graph of the third quadrant coincides with a[LD] read by the scanner. The fourth quadrant is representative of a YMCK tonality transform table LD[i]. The object is to obtain this table LD[i]. In the fourth quadrant, a dashed curve b and a solid curve c are respectively representative of a sufficient image density condition and a short image density condition. For the same reference data A[n] (first quadrant), the final tonality transform table has tonality at d, but not at c.

Assume that tonality is compressed in accordance with a ratio between the maximum density available with a printer and the target maximum density designated by the reference data, as indicated by e in FIG. 22. Then, as indicated by f in FIG. 22, a low density portion has its density made even lower than the target density (lighter). As a result, the low density portion cannot be reproduced as an image.

Preferred embodiments of the image forming apparatus in accordance with the present invention will be described hereinafter.

1st Embodiment

Referring to FIGS. 1–21, an image forming apparatus embodying the present invention will be described. In the illustrative embodiment, the apparatus is implemented as an electrophotographic copier by way of example.

As shown, the copier includes a body 101 and a photoconductive drum 102 using an organic photoconductor (OPC) and located at substantially the center of the body 101. The drum 102 has a diameter of 120 mm and plays the role of an image carrier. Arranged around the drum 102 are a main charger 103, laser optics 104, a black (K) developing unit 106, a yellow (Y) developing unit 106, a magenta (M) developing unit 107, a cyan (C) developing unit 108, an intermediate transfer belt 109, a bias roller 110, a cleaning unit 111, and a discharger 112. The main charger 103 charges the surface of the drum 102 uniformly. The laser optics 104 scans the charged surface of the drum 102 with a laser beam for thereby electrostatically forming a latent image thereon.

The developing units 105–108 each develops such a latent image with toner of respective color. The resulting toner images are sequentially transferred from the drum 102 to the intermediate transfer belt 109 one above the other. The bias roller 110 applies a transfer bias to the belt 109. The cleaning unit 111 removes the toner left on the drum 102 after the image transfer.

A transfer bias roller 113 applies a transfer voltage to the transfer belt 109 in the event of transfer of the composite toner image from the belt 109 to a recording medium. A belt cleaning device 114 removes the toner left on the transfer belt 109 after the image transfer to the recording medium. A conveyor belt 115 conveys the recording medium separated from the transfer belt 109 to a fixing unit 116. The fixing unit fixes the toner image on the recording medium with heat and pressure. The recording medium with the fixed toner image is driven out to a copy tray 117.

A glass platen 118 is mounted on the top of the apparatus body 101 above the laser optics 104. A lamp 119 illuminates a document laid on the glass platen 118. The resulting reflection from the document is focused onto a CCD image sensor 123 via a mirror 121 and a lens 122. In response, the image sensor 123 outputs an electric image signal. The image signal is processed by an image processor, not shown, and then fed to the laser optics 104 in order to control the oscillation of a semiconductor laser included in the laser optics 104.

Figure 2:
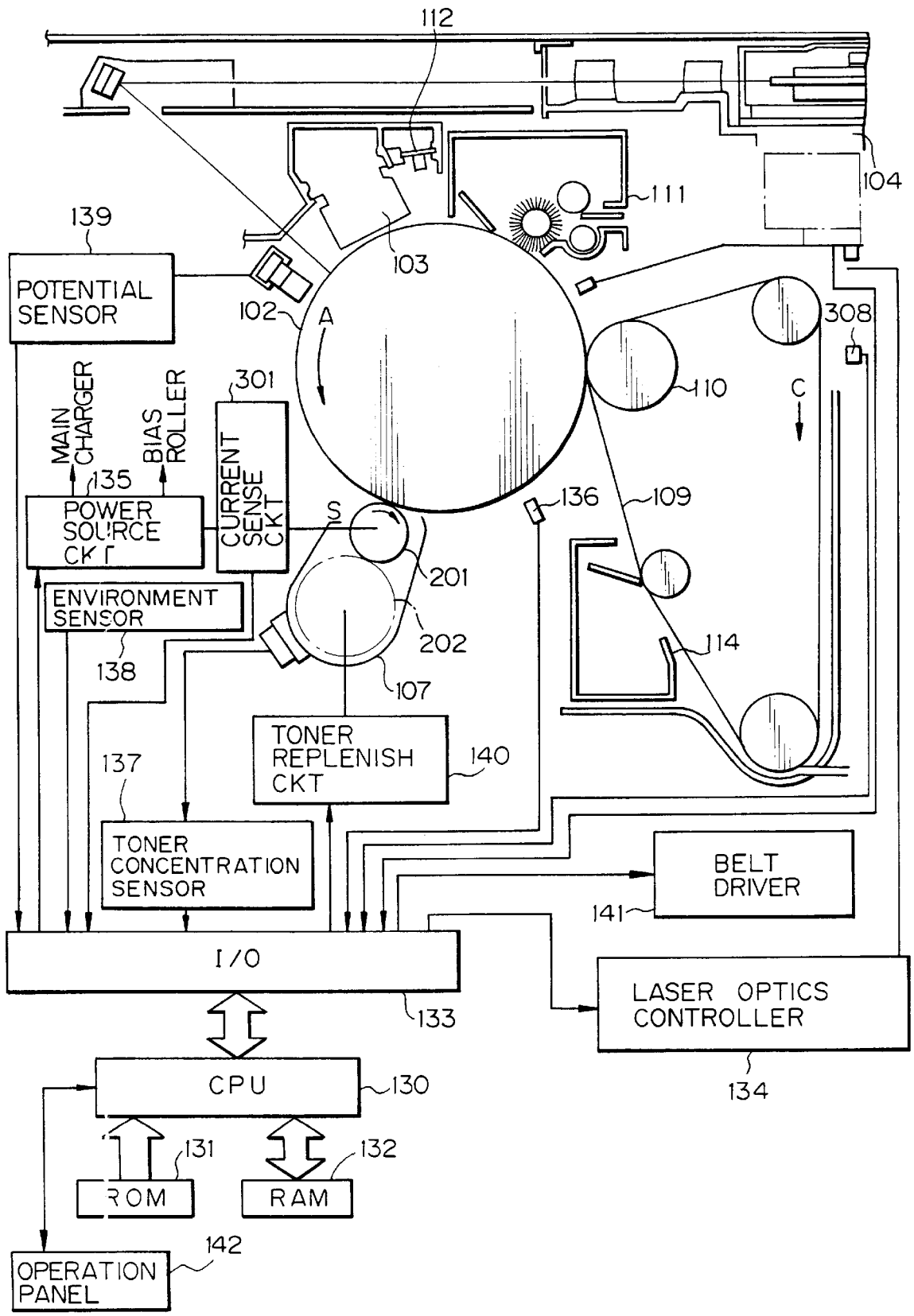
FIG. 2 is a block diagram showing a control system included in the apparatus shown in FIG. 1.

FIG. 2 shows a control system built in the copier. As shown, the control system includes a main controller or CPU (Central Processing Unit) 130. A ROM 131 and a RAM 132 are associated with the main controller 130. Connected to the main controller 130 via an I/O (Input/Output) interface 133 are a laser optics controller 134, a power source circuit 135, an optical sensor 136, a toner concentration sensor 137, an environment sensor 138, a surface potential sensor 139, a toner replenishing circuit 140, a transfer belt driver 141, and an operation panel 142.

The laser optics controller 134 adjusts the laser output of the laser optics 104. The power source circuit 135 applies a preselected discharge voltage to the main charger 113, applies a preselected bias voltage for development to each of the developing units 105–108, and applies a preselected voltage to each of the bias roller 110 and transfer bias roller 113.

The optical sensor 136 consists of a light emitting diode or similar light emitting device adjoining the portion of the drum 102 undergone image transfer, and a photosensor or similar light-sensitive device. The sensor 136 senses, color by color, the amount of toner deposited on a latent image formed on the drum 102 and derived from an exclusive pattern for detection, and the amount of toner deposited on the background. Further, the sensor 136 senses a potential remaining on the drum 102 after the drum 102 has been discharged. The output of the sensor 136 is sent to a photoelectric sensor controller, not shown. In response, the photoelectric sensor controller determines a ratio between the amount of toner deposited on the exclusive pattern and the amount of toner deposited on the background. Then, the sensor controller compares the ratio with a reference value in order to detect a variation in image density, and corrects the control value meant for the toner concentration sensor 137.

The developing units 105–108 are each provided with the toner concentration sensor 137 although only the developing unit 107 is shown in FIG. 2. The sensor 137 senses the toner concentration of a developer present in the associated developing unit in terms of a variation in the permeability of the developer. The CPU 130 compares the toner concentration sensed by the sensor 137 with a reference value. If the actual toner concentration is lower than the reference value, the CPU 130 delivers to the toner replenishing circuit 140 a replenish signal for causing it to replenish toner to the developing unit.

The surface potential sensor 139 senses the surface potential of the drum 102. The transfer belt driver 141 controllably drives the transfer belt 109.

The K developing unit 105 stores a developer made up of black toner and carrier. An agitator 202 is disposed in the developing unit 105 to agitate the developer. The developer is deposited on a developing sleeve 201 while being regulated in amount by a regulating member, not shown. The sleeve 201 conveys the developer or magnet brush while magnetically retaining it thereon.

Figure 3:
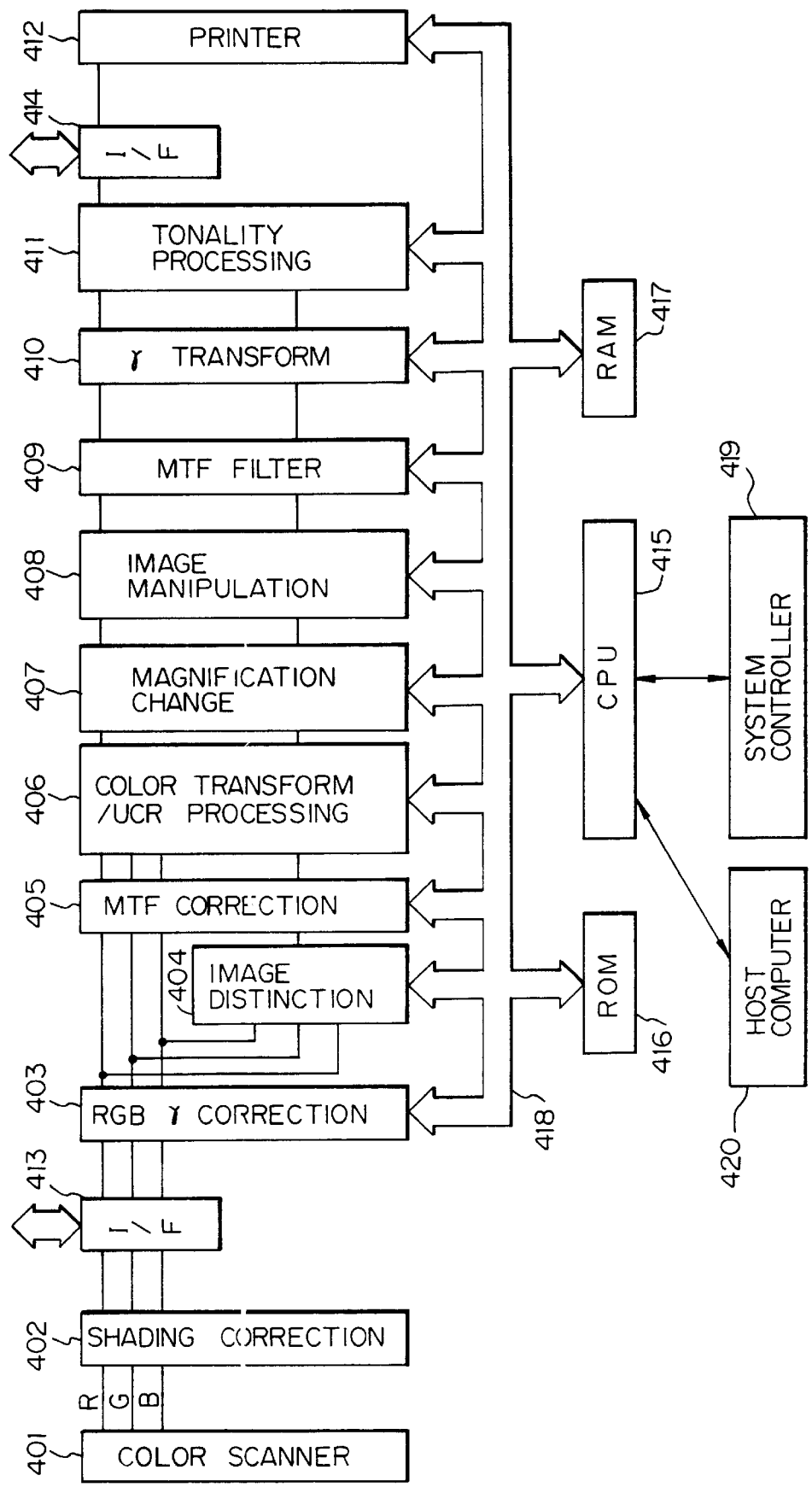
FIG. 3 is a block diagram schematically showing a control system included in a first embodiment of the present invention.

FIG. 3 shows a specific configuration of the image processor included in the embodiment. There are shown in FIG. 3 a color scanner 401, a shading correction 402, an RGB γ correction, an image distinction 404, an MTF (Modulation Transfer Function) correction 405, a color conversion/UCR (Under Color Removal) processing 406, a magnification change 407, an image manipulation (creation) 408, an MTF filter 409, a γ correction 410, a tonality processing 411, and a printer 412.

The color scanner 401 sequentially reads R, G and B color components out of a document while separating them from each other. The shading correction 402 corrects irregularities particular to an image pick-up device and light source. The RGBγ correction 403 transforms the signal output from the scanner, i.e., reflectance data, to lightness data. The image distinction 404 distinguishes a text portion and a photo portion and distinguishes chromatic color and achromatic color. The MTF correction 405 corrects the deterioration of the MTF characteristic of the input system, particularly in a high frequency range. The color conversion/UCR processing 406 consists of a color correcting section and a UCR section. The color correcting section corrects a difference between the color separation characteristic of the input system and the spectral characteristic of each color material of the output system, thereby determining the amounts of Y, M and C color materials. The UCR section substitutes K for a portion where Y, M and C overlap. The color correction is achievable with the following matrix:

$$\begin{pmatrix} Y \\ M \\ C \end{pmatrix} = \begin{pmatrix} a11 & a12 & a13 \\ a21 & a22 & a23 \\ a31 & a32 & a33 \end{pmatrix} \begin{pmatrix} \langle B \rangle \\ \langle G \rangle \\ \langle R \rangle \end{pmatrix}$$

where <R>, <G> and <B> are respectively representative of the complements of R, G and B. The matrix coefficient aij is determined by the spectral characteristic of the input system and that of the output system (color material). While a linear masking equation is shown above, use may be made of <B>2, <BG> or similar quadratic term or a term of higher degree in order to further enhance accurate color correction. If desired, the equation may be changed, depending on the hue, or even the Neugebauer equation may be used. In any case, Y, M and C are attainable from <B>, <G> and <R> (or B, G and R, if desired).

The color correcting section, or hue identifying section, determines which hue R, G, B, C, M or Y each of the RGB image signals has, and then selects a particular color transform coefficient matching the hue. On the other hand, the UCR section performs the following computations:

$Y'=Y-\alpha\cdot\min(Y, M, C)$ $M'=M-\alpha\cdot\min(Y, M, C)$ $C'=C-\alpha\cdot\min(Y, M, C)$ $BK=\alpha\cdot\min(Y, M, C)$ where α denotes a coefficient for determining a UCR amount. When α is 1, 100% UCR will be executed. The coefficient a may have a fixed value. For example, it may be close to 1 in a high density portion or close to 0 in a highlight portion.

The magnification change 407 changes magnification in the vertical and horizontal directions. The image manipulation (creation) 408 performs repeat processing or similar conventional processing. The MTF filter 409 changes the frequency characteristic of the image signal for, e.g., edge enhancement or smoothing, so that a sharp image or a soft image can be output, as desired.

The γ correction 410 corrects the image signal in accordance with the characteristic of the printer 412. The tonality processing 411 performs dither processing or pattern processing. Interfaces (I/Fs) 413 and 414 allow the image data output from the scanner 401 to be processed by an outside image processing device or allow image data output from the outside device to be printed out by the printer 412, as desired.

A CPU 415 for controlling the above image processing circuitry, a ROM 416 and a RAM 417 are connected together by a bus 418. The CPU 415 is connected to a system controller 419 via a serial I/F.

Figure 4:
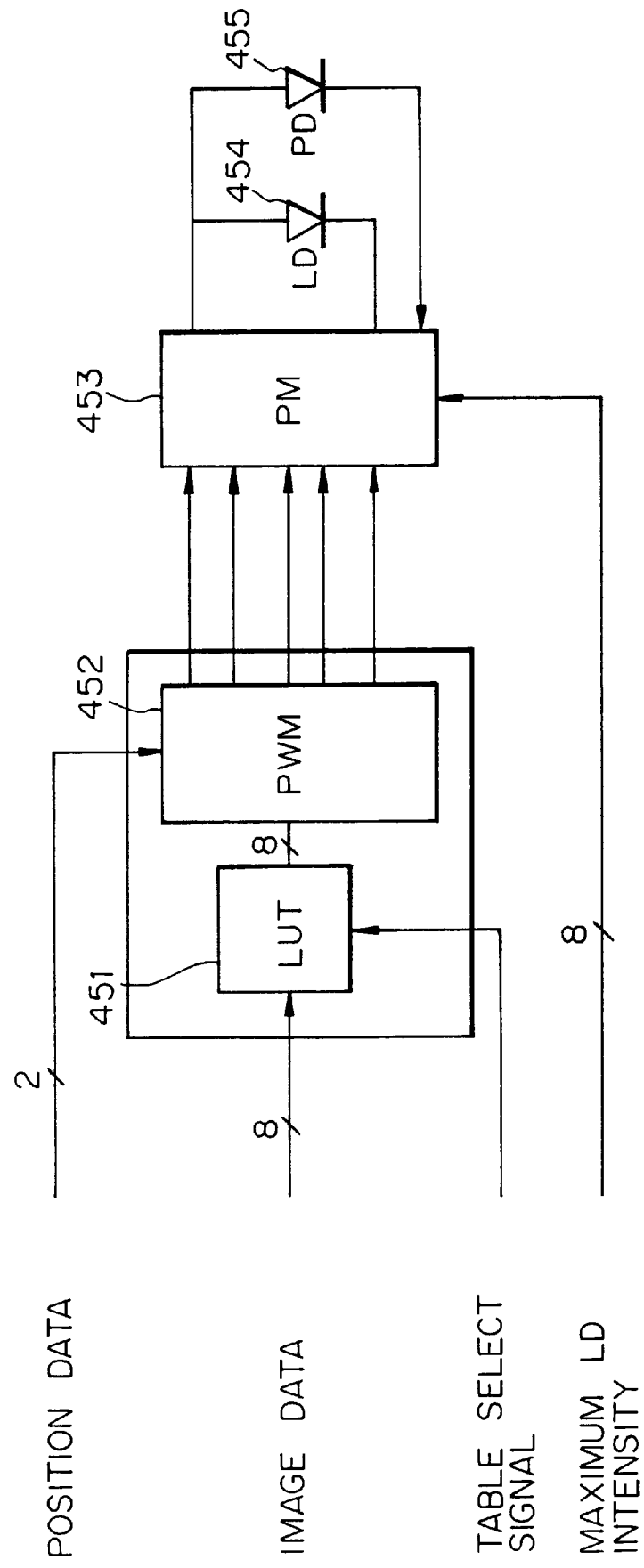
FIG. 4 is a block diagram schematically showing a laser modulation circuit.

FIG. 4 shows a laser modulating circuit. The writing frequency is 18.6 MHz while a single pixel scanning time is 53.8 nsec. Eight-bit image data is subjected to γ transform using an LUT 451. A pulse width modulation (PWM) circuit 452 transforms the eight-bit image data to an eight-level pulse width on the basis of upper three bits of the image signal. A power modulation (PM) circuit 453 performs sixty-four-level power modulation with the lower five bits of the input. A laser diode (LD) 454 emits in accordance with the modulated signal. A photodetector (PD) 455 monitors the emission intensity of the LD 454 and corrects it dot by dot.

The maximum output of the LD 454 can be varied in eight bits (356 steps) independently of the image signal. The beam diameter in the main scanning direction is less than 90% of the size of a single pixel inclusive, preferably 80% of the pixel size. The beam diameter in the above direction is defined as a width when the intensity of a stationary beam decreases from its maximum value to $1/e^2$. For a resolution of 400 dpi (dots per inch) and a pixel size of 63.5 μm, the beam diameter should preferably be less than 50 μm inclusive.

Figure 5:
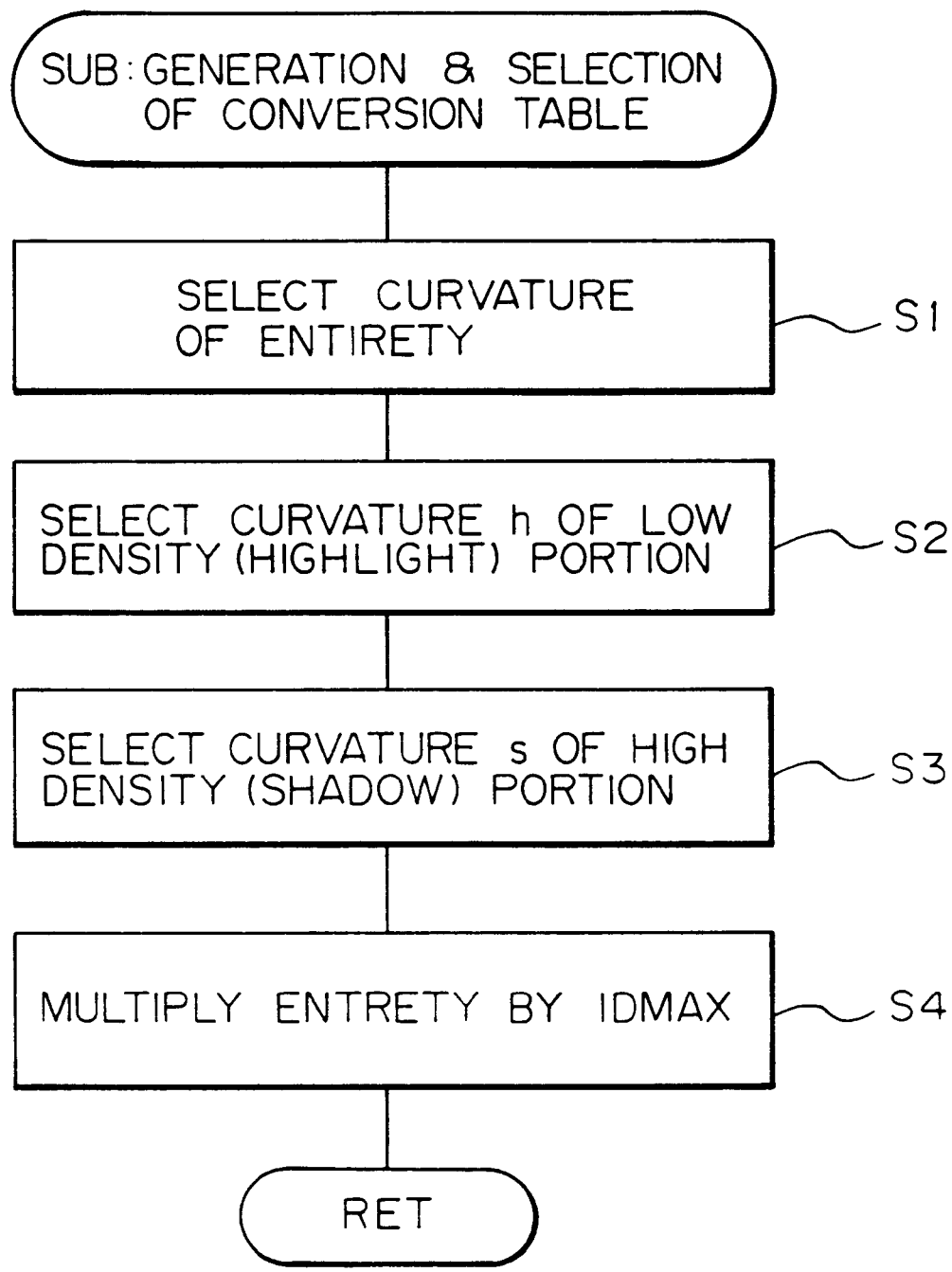
FIG. 5 is a flowchart demonstrating a specific procedure for generating a tonality transform curve.

A specific procedure for generating the tonality transform table (LUT) for the γ transform 410 will be described with reference to FIG. 5. The procedure consists of the steps of selecting a curvature of the entire image (step 1), selecting a curvature of a low image density (highlight) portion (step S2), selecting a curvature of a high image density (shadow) portion (step S3), and multiplying the entire image by a coefficient so as to set up a desired image density.

Figure 6:
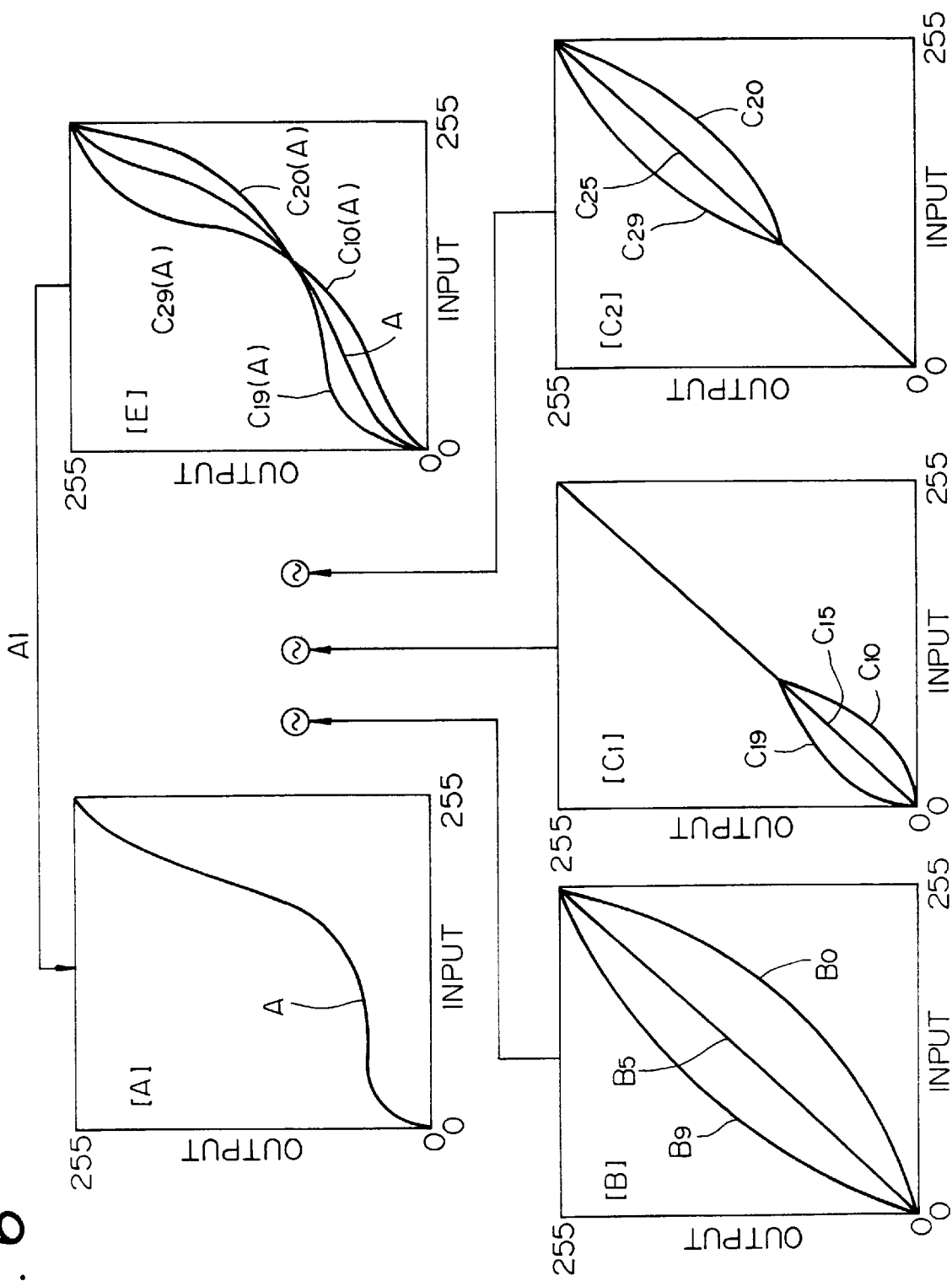
FIG. 6 schematically shows the specific selection of a curvature.
Figure 7:
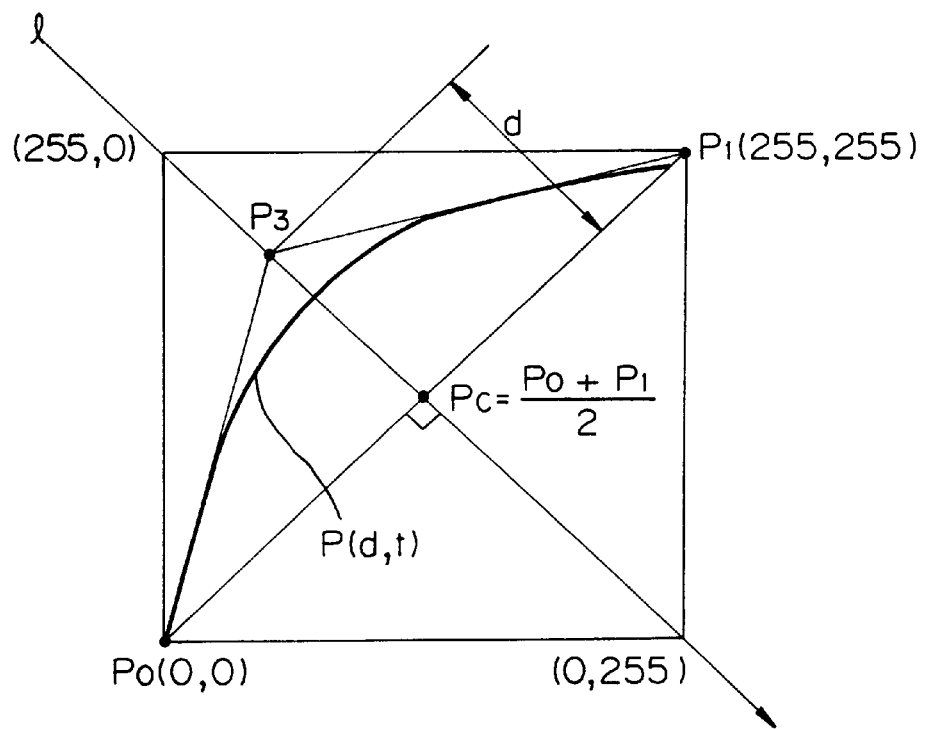
FIG. 7 shows a Bezier function.

As shown in FIG. 6, in the step S1, assume a reference tonality curve A, tonality transform B for changing the overall curvature, tonality transform CH for changing the curvature of a highlight (low density) portion, and tonality transform CS for changing the curvature of a shadow (high density) portion.

Further, assume that the tonality curve A turns out tonality curves E when transformed by the tonality transform B, and that this transform is denoted as E=B(A).

The above procedure may be represented by the format of programming language C, as follows:

```
<List 1>
    typedefint        Table[256]
    Table             A, E;
    int               B(intA, intcurvature)
    {
                      int   value;
                      /*computation for changing curvature
                      in accordance with curvature size*/
                      ...
                      return value;
    }
    /*full( ):        processing for changing overall curvature   */
    Table             full(intcurvature)
    {
                      /*curvature is degree of curvature*      /
                      int   i;
                      for(i = 0; 1 < = 255; i++)
                              E[i] = B(A[i], m);
                      return      E;
``` where B denotes a function for changing the curvature of A.

An example of the above function is a quadrature Bezier function satisfying 0=B(0, n) and 255=B(255, n) where n is a desired integer. Specifically, assume a line POP1 connecting a start point P0(0, 0) and an end point P1(255, 255), a line L intersecting the line OPO1, and a control point P2 existing on the line L and having a distance d from the junction of the lines POP1 and line L as a parameter. Then, the above Bezier function can be represented by a quadrature Bezier curve based on the lines POP1 and L and control point P2.

If the above distance d is held proportional in accordance with an integer "curvature" which is the factor of the function B, it is possible to change the curvature. This will be described, taking the line L1 perpendicular to the line POP1 and a line L2 perpendicular to the ordinate by way of example.

In a first example, assume that the distance d from the center PC of the segment of the line POP1 defined by the points P0 and P1, i.e., PC=(P0+P1)/2=(127.5, 127.5) or (127, 127) or (128, 128) is a parameter. Then, the control point P2 is expressed as:

$$P2(d)=PC+(-d/\sqrt{2}, \sqrt{2})=(127.5-d/\sqrt{2}, 127.5+d/\sqrt{2})$$

Therefore, a tonality transform curve P(d, t) is produced by:

$$P(d,\ t)=P0\cdot t^2+2\cdot P2(d)\cdot t\cdot(1-t)+P1\cdot(1-t)^2 \qquad \text{Eq. (1)}$$

where t is a parameter lying in the range of $0 \le t \le 1$. P(d, t) is given as a combination (x, y) of inputs x and y to the tonality transform curve. Hence, the integer A given as a factor for the function B( ) is dealt with as x=A in order to determine t based on the Eq. (1). Then, the value t is again substituted for the Eq (1) in order to produce the output value y.

In practice, instead of performing the above computation each time, the embodiment produces the output values y with all the (x, y) combinations and stores them in a ROM in the form of a table. This successfully reduces the computing time. Specifically several (or several tens of) tonality transform tables each having a particular curvature are stored in the ROM. The curvature is produced by the factor "curvature" for the function B( ).

The <List 1> is therefore rewritten as follows:

```
<List 2>
    const                       table_max = 9;
    typedefint      Table[256]
    Table              A,   E,   B[Table_max];
    /*processing for changing overall curvature,     */
    Table    full(intcurvature)
    {
            /*curvature designates curvature    */
            int                 i;
            for(i = 0; i < 255; i++)
                    E[i] = B[curvature][A[i]];
            return              E;
    main( )
    {
            /*m is curvature (degree of curvature)
    */
            int                 m = 1;
            E = full(m)
```

It is to be noted that table_9 shown above is representative of nine tables each having a particular curvature.

Of course, the Bezier curve may be replaced with a spline function or a function of higher degree or, for a scanner signal, a power function or an exponential or logarithmic function.

The steps S2 and S3 will be described specifically. The curvature of a low density (highlight) portion and that of a high density (shadow) portion can be changed in the same manner as described above.

The <List 2> may be written in a more general form, as follows:

```
<List 3>
    const                       table_max = 9;
    typedefint      Table[256];
    Table              A,   E,   B[table_max];
    /*Transform( ): curvature changing processing    */
    table    Transform(TableTransformer, TableOriginal)
    {
    /*      This function refers to changing    *
    *       curvature of tonality conversion curve Original
    *
    *       by using tonality transform curve Transformer
    *
            int     i;
            for(i = 0; 1 < = 255; 1++)
                    E[i] = Transformer[Original[i]];
            return      E;
    }
    main( )
    {
            /*m is curvature (degree of curvature)   */
            int    m = 1;
            E = Transform(B[m], A);
    /*      Changing curvature of tonality transform curve A
    *
            by using tonality transform curve B[m]   */
    }
```

By the transform of a highlight transform curve CH[h] and a shadow transform curve CS[s], the following is also available:

```
<List 4>
    const                       table_max = 9;
    typedefint      Table[256];
    Table              A, B[table_max], E,
                       CH[Table_max], CS[Table_max];
    /*Curvature changing processing,    */
    Table    transform(TableTransformer, TableOriginal);
```

```
    main( )
    {
            int      m, h, s;
    /*      changing curvature of curve
            by changing numerical values m, h and s
    */
            E = transform(B[m, A]);
            /*changing curvature of low density
            (highlight) portion    */
            E = Transform(CH[h], E);
            /*changing curvature of high density
            (shadow) portion     */
            E = transform(CS[s], E);
    }
``` where m, h and s are respectively the values for determining the curvatures of the entirety, highlight portion, and shadow portion. It is to be noted that the highlight portion and shadow portion have their curvatures generated independently of each other.

Tonality transform curves for changing the curvatures of particular density regions, e.g., highlight region and shadow region, are generated, as follows. Again assume the line POP1 connecting the start point P0 and end point P1, the line L intersecting the line POP1, and the control point P2 existing on the line L and having the distance d as a parameter. Then, the tonality transform curves are generated on the basis of the lines POP1 and L and control point P2 by using a cubic Bezier curve. This will be described taking the line L1 perpendicular to the line POP1 and the line L2 parallel to the ordinate as an example.

Figure 8:
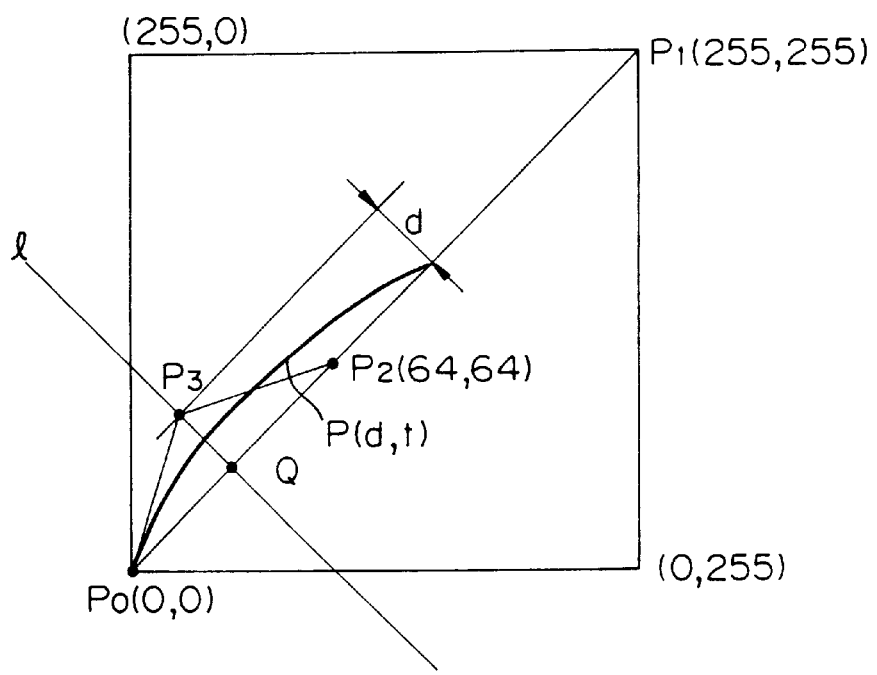
FIG. 8 shows a specific transform curve for transforming the tonality characteristic of a highlight portion.

FIG. 8 shows a specific procedure for generating the transform curve for changing the tonality characteristic of a highlight portion. Assume that the start point P0 and end point P1 are P0=(0, 0) and (255, 255), respectively, and that the first control point P2 is (32, 32).

In the first example, a control point P3 is assumed to be P3(d)=(16, 16)+(−d/√2, d/√2), using the distance d as a parameter. In the second example, the control point P3 is assumed to be P3(d)=(16, 16)+(0, d). Then, a tonality transform curve P(d, t) is expressed as:

$$P(d, t) = P0 \cdot t^3 + 3 \cdot P2 \cdot t^2 \cdot (1-t) + 3 \cdot P3(d) \cdot t \cdot (1-t)^2 + P1 \cdot (1-t)^3 \qquad \text{Eq. (2)}$$

While the end point is assumed to be P1=(255, 255), it may be replaced with P1=(64, 64) or the like existing on the line segment m: (0, 0)–(255, 255). At this instant, all the portions not belonging to the line POP1 on the line segment m are directly used as congruence transformation. The other regions play the role of tonality transform curves for changing the curvatures of particular density regions, e.g., highlight region and shadow region.

Figure 9B:
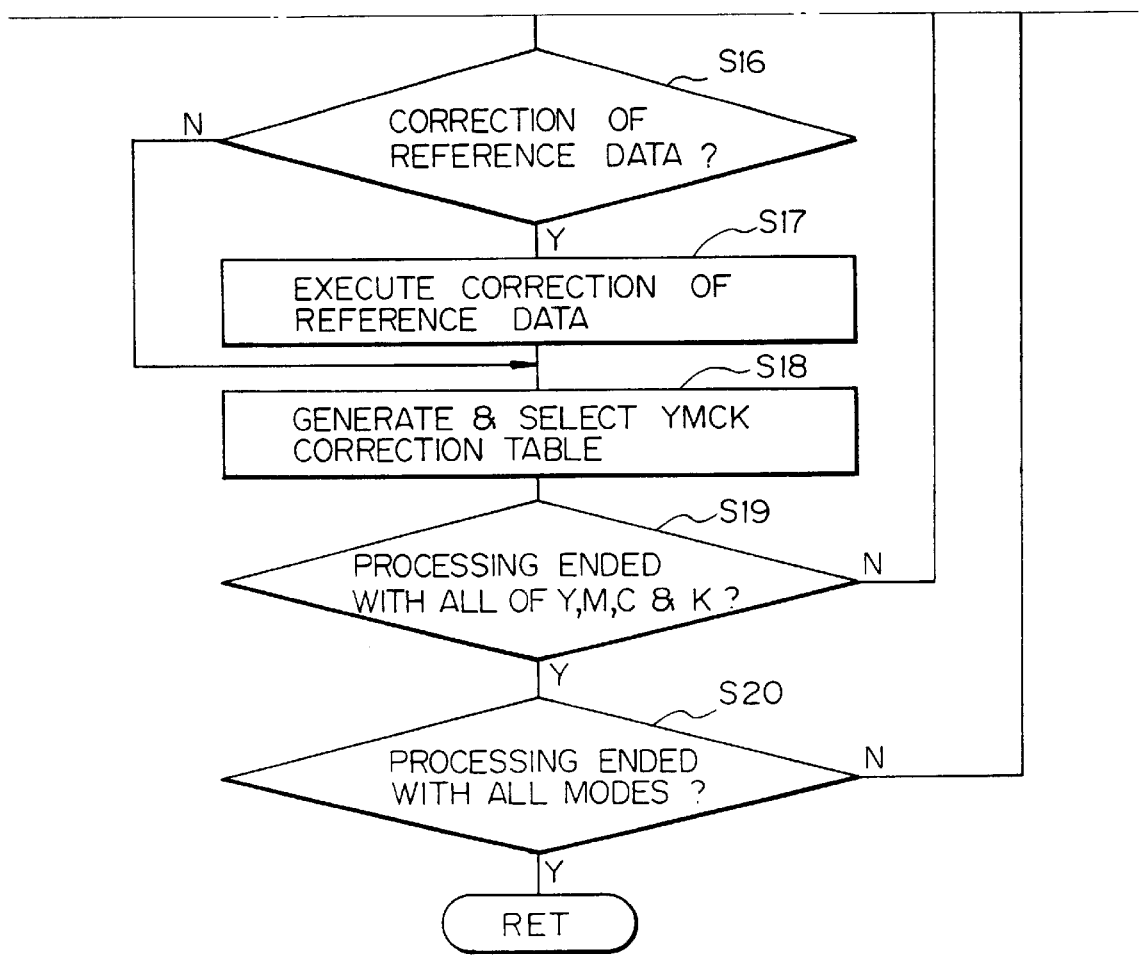
FIG. 9 is a flowchart demonstrating a specific procedure for the automatic correction of image density.
Figure 10:
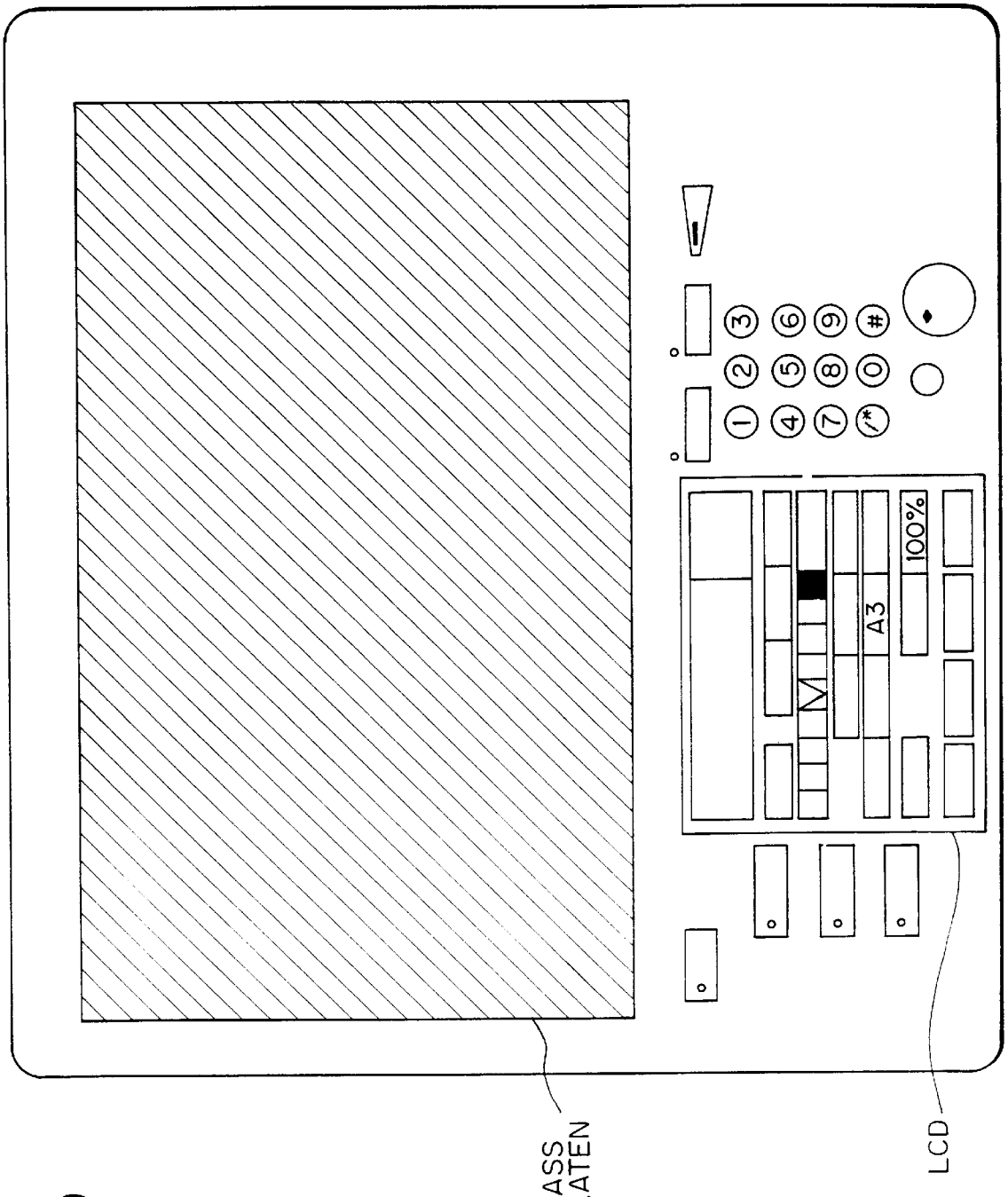
FIG. 10 is a front view of an operation panel.

Automatic image correction (AIC) for automatically correcting image density (tonality) will be described with reference to FIG. 9. FIG. 10 shows a specific LCD (Liquid Crystal Display) provided on the operation panel. When the operator calls an AIC menu on the operation panel, a picture shown in FIG. 11 appears on the LCD. When the operator selects automatic background correction on the picture of FIG. 11, a picture shown in FIG. 12 appears on the LCD.

Assume that the operator touches a print start key included in the picture of FIG. 12. Then, the copier prints a plurality of density or tonality patterns corresponding to the colors Y, M, C and K and the text and photo modes on a recording medium (step S11, FIG. 9). Such density patterns are set and stored in a ROM included in an IPU beforehand.

Figure 13:
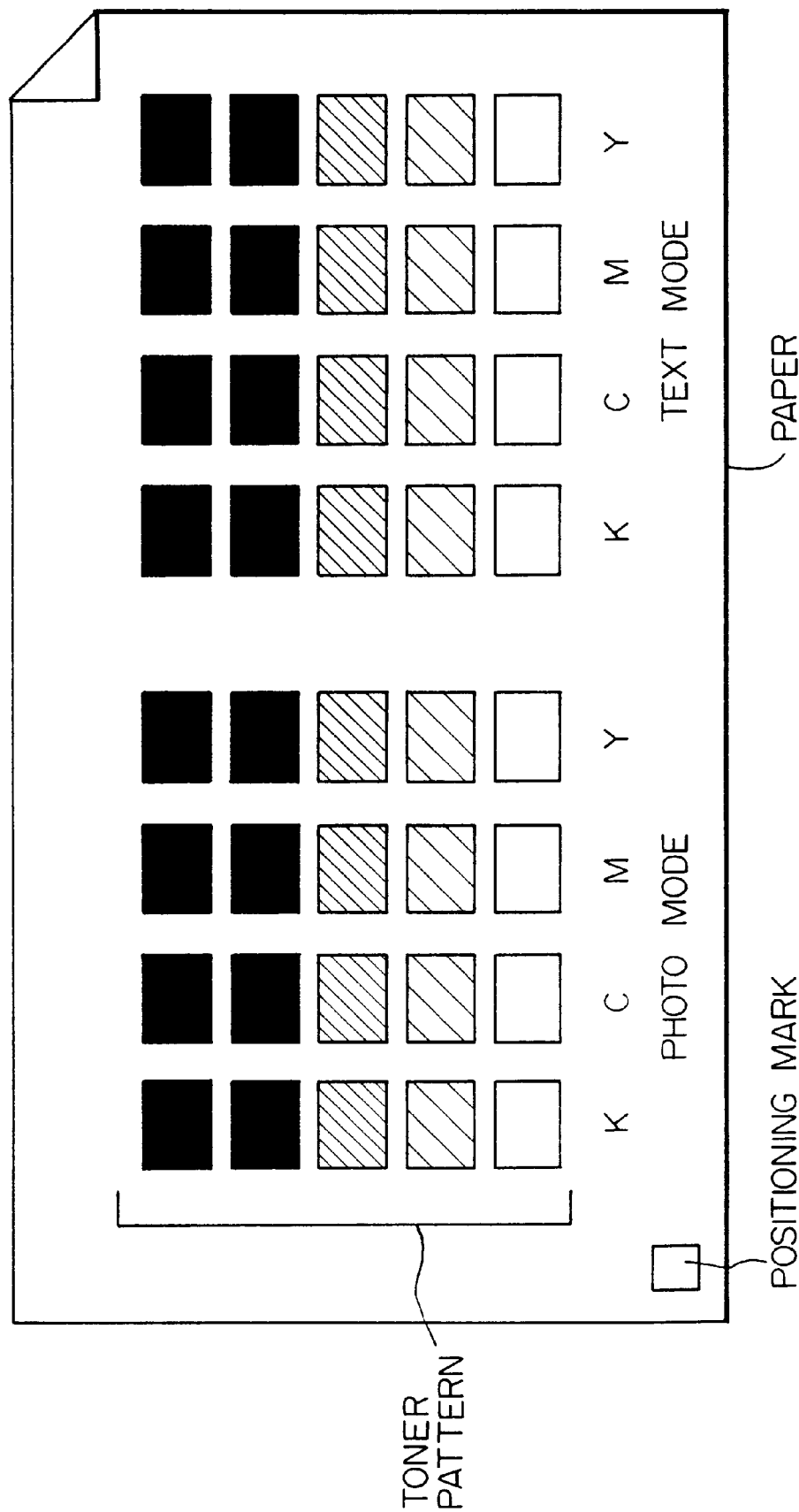
FIG. 13 shows a plurality of specific tonality patterns corresponding to Y, M, C and K and a text and a photo mode.

The patterns are implemented as sixteen hexadecimal patterns 00h, 00h, 22h, . . . , EEh and FFh (in FIG. 13, patches of five consecutive tones are shown except for the background). Any desired values can be selected out of the eight-bit signals 00h–FFh. In the text mode, the patterns are formed with 256 tones for a single dot; dither processing or similar pattern processing is not executed. In the photo mode, an LD writing value is formed by distributing the sum of the writing values of each two pixels adjoining in the main scanning direction. Specifically, assume that the first and second pixels have LD writing values n1 and n2, respectively. Then, the sum of the values n1 and n2 is distributed as follows:

```
if n1 + n2 ≦ 255,
    m1 + n2 for first pixel and 0 for second pixel
if n1 + n2 > 255
    255 for first pixel and n1 + n2 − 255 for second
pixel
or
if n1 + n2 ≦ 128
    n1 + n2 for first pixel and zero for second pixel
if 128 < n1 P n2 ≦ 256
    128 for first pixel and n1 + n2 − 128 for second
pixel
if 256 < n1 + n2 ≦ 383
    n1 + n2 − 128 for first pixel and 128 for second
pixel
if 383 < n1 + n2
    255 for first pixel and n1 + n2 −255 for second
pixel
```

In addition, pattern processing actually used at the time of image formation is used.

Figure 14:
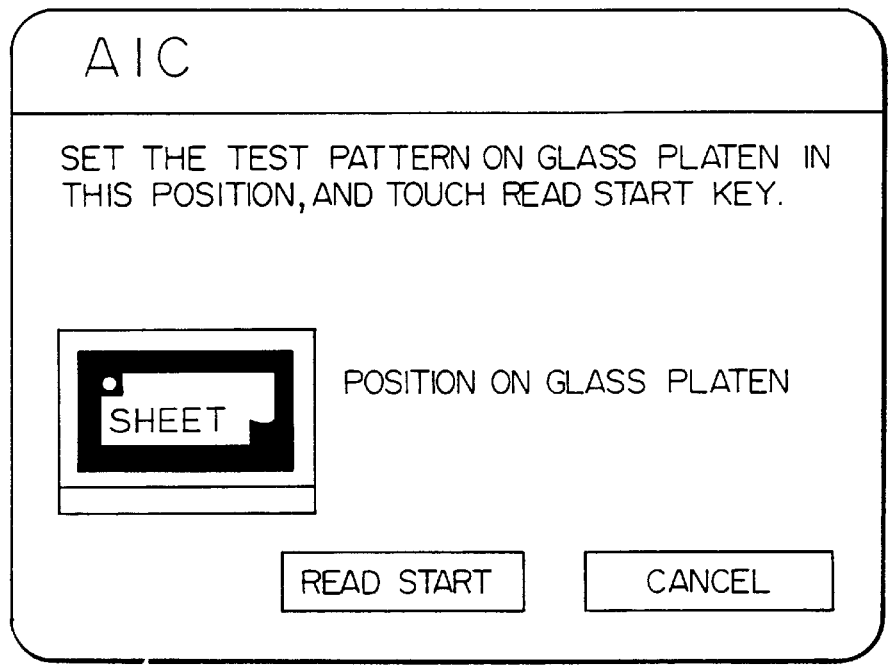
FIGS. 14 and 15 each shows another specific picture to appear on the operation panel shown in FIG. 10.
Figure 15:
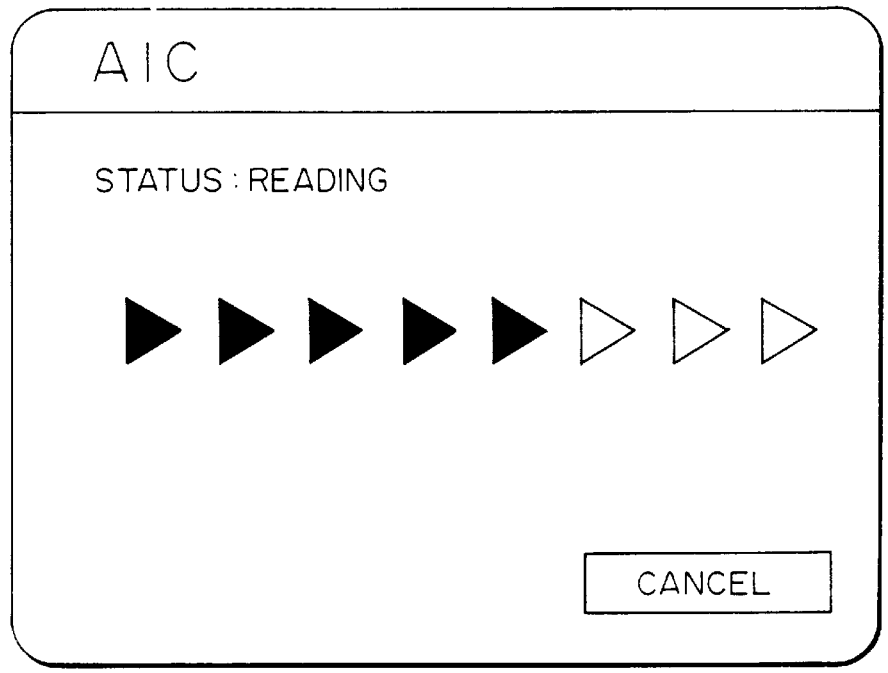

After the recording medium with the patterns shown in FIG. 13 has been output, a picture shown in FIG. 14 appears on the LCD, urging the operator to lay the medium or document on the glass platen 118 in a preselected position. The operator lays the medium on the glass platen 118 (step S12) and then touches a read start key, FIG. 14. In response, the scanner reads the RGB data of the YMCK density patterns as well as the data of the background of the document (step S13). If the operator has selected processing based on the background data (Y, step S14), background data processing is executed with the data (step S15). If the operator has selected the correction of reference data (Y, step S16), the processing of a high density portion is executed for the reference data (step S17). Subsequently, the generation or the selection of a YMCK tonality correction table is executed (step S18).

The above procedure is repeated with each of Y, M, C and K (step S19) and each of the photo and text modes (step S20). While the procedure is under way, a picture shown in FIG. 15 appears on the LCD. If the results of image formation actually performed with the processed YMCK correction tables are not desirable, the operator can select the original Y, M, C and K correction tables, as instructed by the picture shown in FIG. 11.

As for the correction of the background, the operator touches either one of ON and OFF switches shown in FIG. 11. The correction of the background is effected for two different purposes, as follows. First, even when the same image is formed on different recording media at the same period, the resulting output of the scanner depends on the whiteness of the recording medium. Assume a recycled sheet or similar recording medium whose whiteness is low is used for the AIC. Then, because a recycled sheet usually contains many yellow components, the correction table for yellow is generated in such a manner as to reduce the yellow components. In this condition, if an image is formed on coated paper or similar paper having high whiteness, then the image will be low in yellow component. As a result, the color reproducibility is low.

Moreover, when the paper or similar recording medium used for the AIC is thin, the scanner reads even the color of a cover plate pressing the paper from the above. This is also true when the cover plate is replaced with an ADF including a conveyor belt. Because the conveyor belt is formed of rubber, it has low whiteness and appears slightly gray. As a result, an image signal output from the scanner is apparently high. Therefore, the YMCK correction tables are generated in such a manner as to reduce the density. In this condition, if a relatively thick and less permeable paper is used for forming an image thereon, then the entire image will appear low density.

To obviate the above occurrences, the image signals representative of the patterns are corrected on the basis of the image signal representative of the background of the recording medium. However, such correction may not be effected, depending on the user. Specifically, when much of the papers used for image formation involve yellow components, it may occur that better color reproducibility is achievable if the correction is omitted Also, when only thin sheets are used, the tonality correction tables matching them can be generated. In this manner, background correction is effected or not effected, as desired by the user.

Assume that the values of the tonality pattern formed on the photoconductive element are LD[i] (i=1, 2, . . . , 10), and that the values read by the scanner are v[i]≡(r[1], g[i], b[e]) (i=1, 2, . . . , 10). Then, lightness, chroma and hue angle (L* C* h*, lightness, redness, blueness(L* a* b* are applicable to the processing.

Assume v[i]≡(r[i], g[i], r[i]. Then, because the image signals complementary to the Y, M and C toner are b[i], g[i] and r[i], tonality transform tables can be readily generated by use only of the image signals of complementary colors (a[i]; i=1, 2, . . . , 3).

The reference data are implemented as combinations of values v0[i]≡(r0[i], g0[i], b0[i]) output by the scanner and the LD writing values LD[i] (i=1, 2, . . . , 10). The complementary color image signal of the reference data v0[i] is assumed to be a0[col][ni] (0≦ni≦255; i=1, 2, . . . , 10; col=Y, M, C).

How the tonality transform table or LUT to be used by the γ transform 410 is generated will be described. The YMCK transform table is produced by comparing the previously stated a[LD] and the reference data A[n] stored in the ROM 416; n is the value input to the YMCK transform table. The reference data A[n] is the target value of the image signal output from the scanner and representative of the YMC toner pattern which is output by the LD writing value LD[i] after the input value n has been subjected to YMCK transform. The reference data is either the reference data A[n] to be corrected in accordance with the image density available with the printer or the reference data A[n] not to be done so. Whether or not to execute correction is determined on the basis of data for decision stored in the RAM and which will be described specifically later.

LD corresponding to A[n] is produced form a[LD] so as to determine an LD output value LD[n] corresponding to the value n input to the transform table. This is repeated with each of the input values i=0, 1, . . . , 255 (in the case of the eight-bit signal), thereby generating a transform table.

Alternatively, the processing may be executed skipping a part of the input values i=00H, 01H, . . . , ffH (hexadecimal), e.g., only with i=0, 1 1H, 22H, . . . , ffH, in which case the intervening values will be interpolated by, e.g., a spline function. Further, among the YMCK γ correction tables stored in the ROM 416, there may be selected the table passing through the (0, LD[0]), (11h, LD[11h]), (22h, LD[22h]), . . . , (FFh, LD[FFh]) set.

Figure 16:
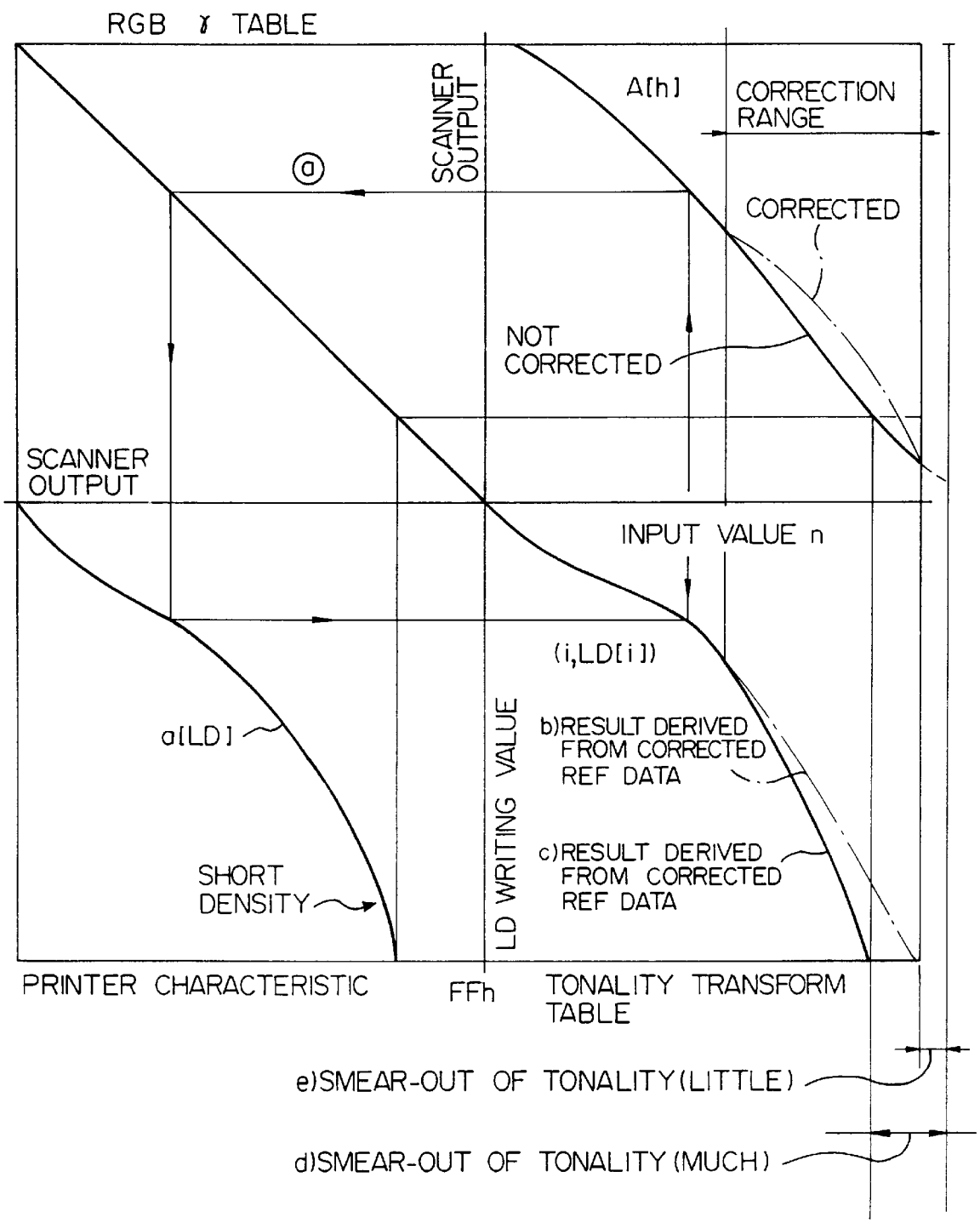
FIG. 16 shows a specific YMCK γ correction table.

The above processing will be described specifically with reference to FIG. 16. In FIG. 16, the first quadrant is representative of the reference data A[i]; the abscissa indicates the values n input to the YMCK tonality transform table while the ordinate indicates scanner outputs undergone RBG γ correction. The second quadrant is representative of RBG γ conversion table; the abscissa indicates input values before γ conversion while the ordinate indicates output values undergone γ conversion. In FIG. 16, RBG γ conversion is not executed.

The third quadrant indicates the LD writing values; the abscissa indicates the output values of the scanner read a toner pattern formed on a recording medium by a preselected laser output LD. FIG. 16 shows the characteristic of the printer. When RBG γ correction is not executed, the graph coincides with a[LD]. While the LD writing values of the actual pattern are sixteen points, i.e., 00H (background), 11H, 22H, EEH, FFH, the intervals between the above points are interpolated so as to complete a continuous graph. The fourth quadrant is representative of the YMCK conversion table LD[i] which is the target. Reference data A[i] is determined for a given input value i, and then an LD output providing the data A[i] is determined, as indicated by arrows.

Figure 17:
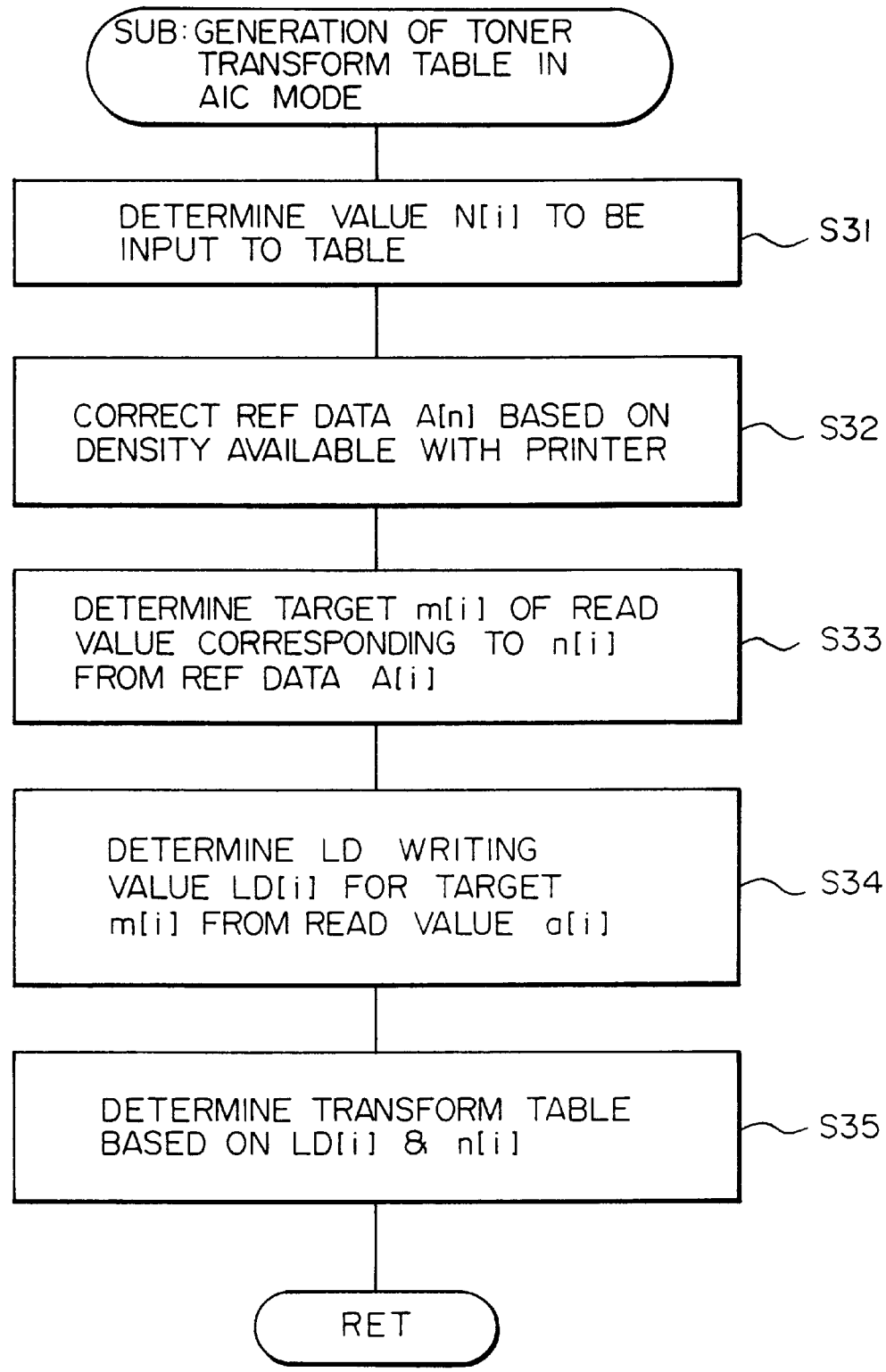
FIG. 17 is a flowchart representative of a computation procedure.

Referring to FIG. 17, a computation procedure will be described. First, in a step S31, input values necessary for the generation of the YMCK γ correction table are determined. Here, the input values are assumed to be n[i]=11(h)×i (i=0, 1, . . . , imax=15). In a step S32, reference data A[n] are corrected in accordance with the image density available with the printer. Specifically, assume that the LD writing value providing the maximum image density available with the printer is FFh (hexadecimal), and that the scanner output m[FFh] corresponding thereto is mmax. Also, assume reference data a[i] (i=0, 1,. . . , i1) not to be corrected from the low density side to the medium density side, reference data [i](i=i2+1, . . . , imax-1) (i2≧i1 and i2≦imax-1) not to be corrected at the high density side, and reference data A[i] (i=i1+1, . . . , i2) to be corrected.

A specific computation procedure will be described on the assumption that the image signal is proportional to the reflectance of the document and not to be subjected to RGB γ correction. First, there is produced a difference Δref between, among the reference data not to be corrected, the reference data A[i2+1] having the lowest density in the high density portion and the reference data A[i1] having the lowest density in the low density portion, as follows:

$$\Delta ref = A[i1] - A[i2+1] \qquad \text{Eq. (3)}$$

If RBG γ correction, or reversal, is not effected, the difference Δrf is greater than zero.

Likewise, a difference Δref is produced on the basis of the value mmax providing the maximum density available with the printer, as follows:

$$\Delta dt = A[i1] - m\text{max} \qquad \text{Eq. (4)}$$

From the Eqs. (3) and (4), the reference data A[1] (i=i1+1, . . . , i2) is rewritten as:

$$A[i] = A[i1] + (A[i] - A[i1]) \times (\Delta dt/\Delta ref) \ (i=i1+1, i1+2, \ldots, i2-1, i2) \qquad \text{Eq. (5)}$$

In a step S33, an image signal m[1] output from the scanner and corresponding to n[i] determined in the step S3 is produced from the reference data A[n]. In practice, reference data A[n[]] (0≦n[j]≦255, j=0, 1, . . . , jmax, and n[j]≦n[k] for j≦k) for the discontinuous n[j] are determined, as follows. First, there is determined j (0≦j≦jmax) setting up n[j]≦n[i]<n[j+1]. As for the eight-bit image signal, the computation will be simplified if reference data are produced beforehand as n[0]=0, n[jmax]=255, n[jmax+1]=n[jmax]+1 and A[jmax+1]=A[jmax].

The interval n[j] between the nearby reference data should preferably be as small as possible in order to enhance the accuracy of the γ correction table to be produced later.

From the above j, m[i] is produced by the following equation:

$$m[i] = A[j] + (A[j+1] - A[i]) \cdot (n[i] - n[j])/(n[j+1] - n[j]) \qquad \text{Eq. (6)}$$

While a linear equation is used, it may be replaced with a function of higher degree or a spline function with interpolation. Then, $$m[i] = f(n[i])$$

In the case of the k-th order function, $$f(x) = \sum_{i=0}^{k} b_1 \times 1$$

In a step S34, an LD writing value LD[i] for obtaining m[i] determined in the step S33 is produced in the same manner as in the step S33. When the image signal data not undergone RBG γ correction is to be processed, a[LD] sequentially decreases with an increase in LD, i.e., a[LD[k]]>a[LD[k+1]] holds.

The values, i.e., LD[k]=00h, 11h, 22h, . . . , 66h, 88h, AAh, FFh (k=0, 1, . . . , 9) are selected for the formation of the pattern. Specifically, as for image density with a small amount of toner deposition, the scanner output noticeably varies relative to the amount of toner deposition, and therefore the interval between the LD writing values LD[k] is reduced. As for image density with a great amount of toner deposition, the scanner output varies little relative to the amount of toner deposition, and therefore the above interval is increased. This kind of scheme is advantageous over the scheme having a greater number of patterns, e.g., LD[k]= 001, 11h, 22h, . . . , EEh, FFh (sixteen points in total), as follows. First, such a scheme reduces toner consumption. Second, the variation against the LD writing value is small. Because the scanner output is apt to reverse due to irregularities in the surface potential of the photoconductive element, the deposition of toner, fixation and potential, reducing the interval between the LD writing values is not always successful to enhance accuracy. For these reasons, the patterns are formed by the above LD writing values.

For LD[k] setting up a[LD[k]]≧m[i]>a[LD[k+1]], LD[i] is produced by:

$$LD[i] = LD[k] + (LD[k+1] - LD[k]) \cdot (m[i] - a[LD[k]])/(a[LD[k+1]] - a[LD[k]])$$

Assuming 0≦k≦kmax (kmax>0), and if a[LD[kmax]]>m[i] (the target density produced from the reference data is high), then LD[i] is estimated by linear extrapolation:

$$LD[i] = LD[k] + (LD[k \text{ max}] - LD[k \text{ max}-1]) \ (m[i] - a[LD[k \text{ max}-1]])/a[LD[k \text{ max}]] - a[LD[k \text{ max}-1]])$$

As a result, the combinations of values n[i] to be input to the UMCKγ correction able and output values LD[i] (n[i], LD[i]) (i=0, 1, . . . , 15) are obtained.

In a step S35, a spline function is used for interpolation based on the above (n[i], LD[i]) (i=0, 1, . . . , 15), or a γ correction table stored in the ROM is selected on the basis of the same.

Figure 18:
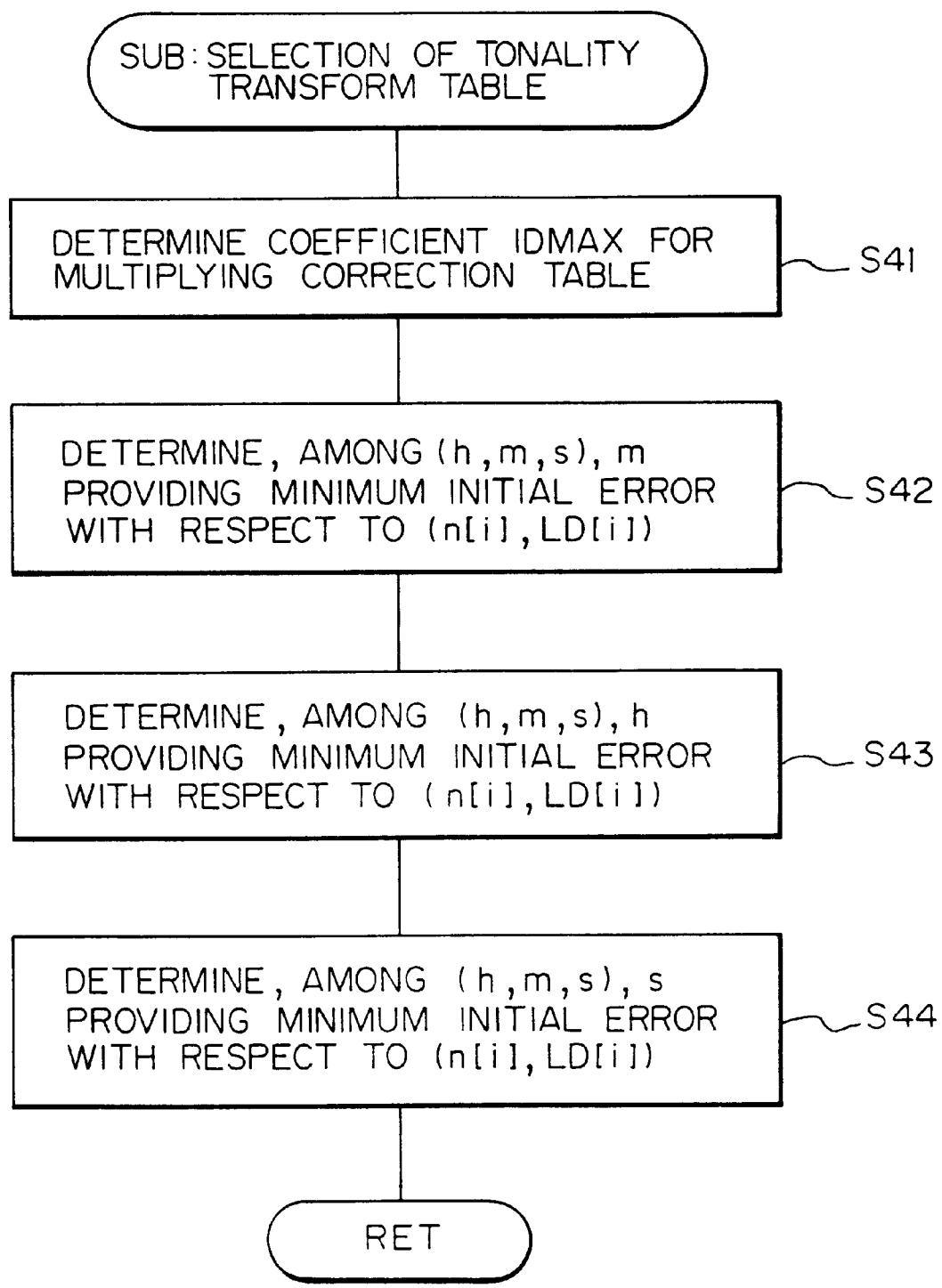
FIG. 18 is a flowchart showing a specific correction table selection procedure.
Figure 19:
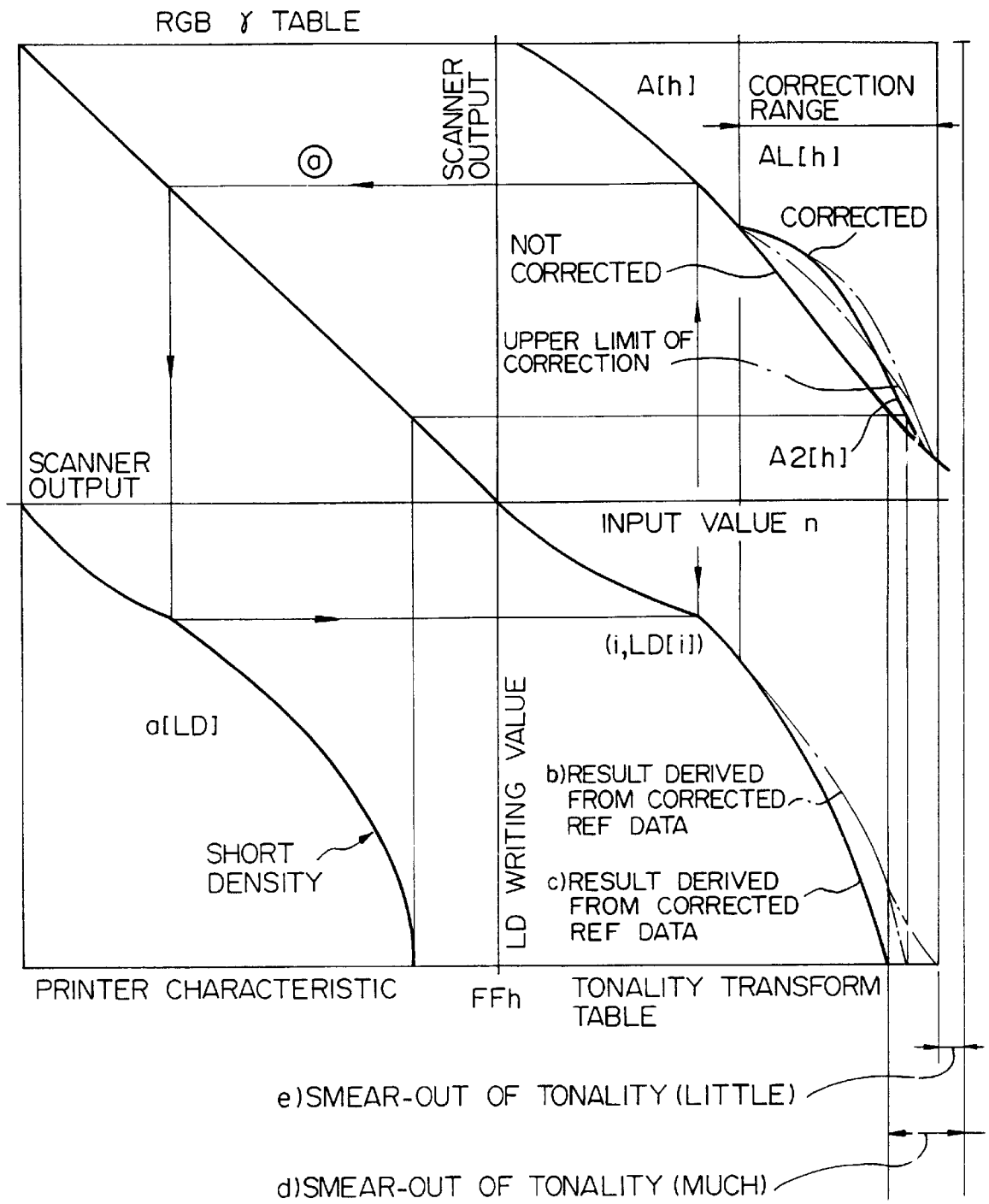
FIG. 19 shows another specific YMCK γ correction table.

As for the generation of the previously stated correction curve, how the γ correction table stored in the ROM should be selected will be described with reference to FIG. 18.

First, in a step S41, a coefficient IDMAX [%] by which the entire γ correction table is to be multiplied is determined. In the case of n[imax]=FFh, IDMAX=LD[imax]/FFh×100 [%] is assumed. Here, LD[i] is replaced with LD'[i]=LD[i]× 100/IDMAX. This makes it needless to take account of IDMAX in the event of the selection of the γ correction table.

Next, m, h and s which are the indexes of the curved portions of the entirety, highlight portion and shadow portion, respectively, are selected. First, the curvature m of the entirety is selected (step S42). Basically, there is selected m making the square sum (referred to as an error hereinafter) error=Σwi·(LD[i]−E[n[i]])$^2$ of a difference between the tonality transform curve E[j] (0≦j≦255) and the combination of the input value n[i] to the YMCK γ correction table and the output value LD[i] (n[i], LD[i]) (0≦i≦15). Here, wi is representative of a weight applied to the i-th value input to the YMCK γ correction table.

If the error of the highlight portion is great, a desirable result is not achievable. In light of this, the weight wi is increased for the highlight portion in order to reduce the error as far as possible. Likewise, a curvature h of the highlight portion which minimizes the error is determined (step S43), and then a curvature s of the shadow portion which minimizes the error is determined (step S44).

The values (h, m, s) and IDMAX so produced are used as the curvature of a new corrected tonality curve.

The step S32 shown in FIG. 17 is executed, as follows.

For the reference data A[i] (i=i1+1, . . . , i2) to be corrected, the upper limit a[i] of correction and the upper limit A0[i] of corrected reference data are determined on the basis of the Eqs. (7) and (8). The relation between A[i], a[i] and A0[i] is expressed as:

$$a[i]=A0[i]/A[i]$$

To prevent the image density from being smeared out, the reference data is varied in the direction for reducing image density. Because the scanner output is proportional to the amount of reflection from a document, there holds A0[i]≧A[i], i.e., a[i]≧1 (the equal sign is equivalent to no correction). In the Eq. (5), assuming that the changed reference data and the final reference data are A1[i] and A2[i], respectively, $$A1[i] = A[i1] + (A[i] - A[i1]) \times (\Delta det / \Delta ref) \quad \text{Eq. (10)}$$

$$A2[i] = \begin{cases} A1[i] (A1[i] < A0[i]) \\ A0[i] (A1[i] \geq A0[i]) \end{cases} (i = i1 + 1, i + 2, \ldots, i2 - 2, i2)$$

While the upper limit is set one-to-one to the reference data in the above computation, it may be continuously set, as follows. The upper limit A0[n] of the amount of correction of the reference data for the value n input to the YMCK transform table is expressed in terms of the previously stated values A[i1] and A[i2+1], and the values n for A[i1] and A[i2+1] are respectively represented by n[i1] and n[i2+1]. Then, $$A0[n] = \begin{cases} A[i1](n[i2+1] > n1 > n \geq n[i1]) \\ A[i1] + (A[ie+1] - A[i1])(n - n1)/(n[i2+1] - n1) \end{cases} \quad \text{Eq. (11)}$$

$$(n[i2+1] > n > n1 \geq n[i1])$$

$$(i = i1+1, i1+2, \ldots, i2-1, i2)$$

Here, n1 is a point between n[i1] and n[i2+1]. As the upper limit n approaches n1, the amount of correction (allowable width) increases with the result that n is sequentially shifted away from n1. As the upper limit n approaches n[i1] and n[i2+1], the upper limit (allowable width) of the amount of correction approaches zero. If desired, such a linear function may be replaced with a quadrature function or a function of higher degree or any other suitable function, e.g., spline function or a logarithmic function.

A range for correcting the reference data and a range for inhibiting it may be designated in accordance with the scanner output, as follows. For every reference data A[i], a ONE (or ZERO) is set for the case with correction while a ZERO (or ONE) is set for the case without correction. These values are stored in the ROM or the RAM.

Assume that the upper limit A0[i] of the amount of correction is selected to be A[i], or that the upper limit a[i] of the ratio of the amount of correction is selected to be 1, as stated earlier. This is equivalent to no correction or the designation of the reference data. The reference data A0[i] ≠A[i] and a[i]≠1 lying in the other range are corrected.

For the correction, it has been assume that the LD writing value providing the maximum density available with the printer is FFh (hexadecimal), that the corresponding scanner output m[FFh] is mmax, and that this value is applied to the Eqs. (4) and (5). If desired, the maximum density may be replaced with a density which will render the density difference insensible even when the laser writing value varies. For the same reason, the LD writing value may be, e.g., F0H in place of the maximum LD writing value FFh.

Another and simpler method consists in estimating a read density at the time of LD=FFh on the basis of the scanner output associated with LD[i] (i=0, 1, . . . , imax−1) and by using a logarithmic or an exponential function.

Figure 20:
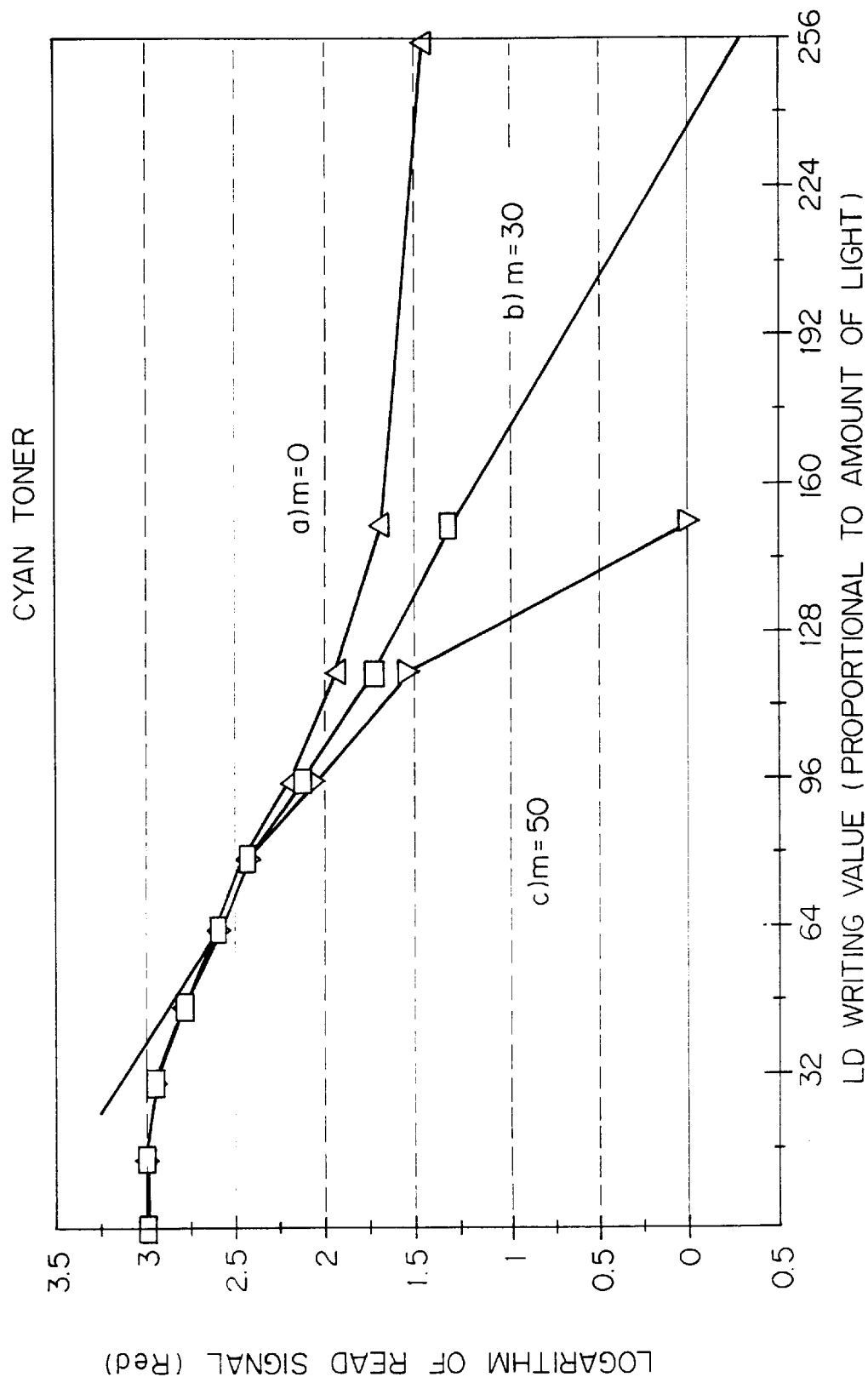
FIG. 20 shows specific processing in which data output from a scanner and associated with C toner are processed.
Figure 21:
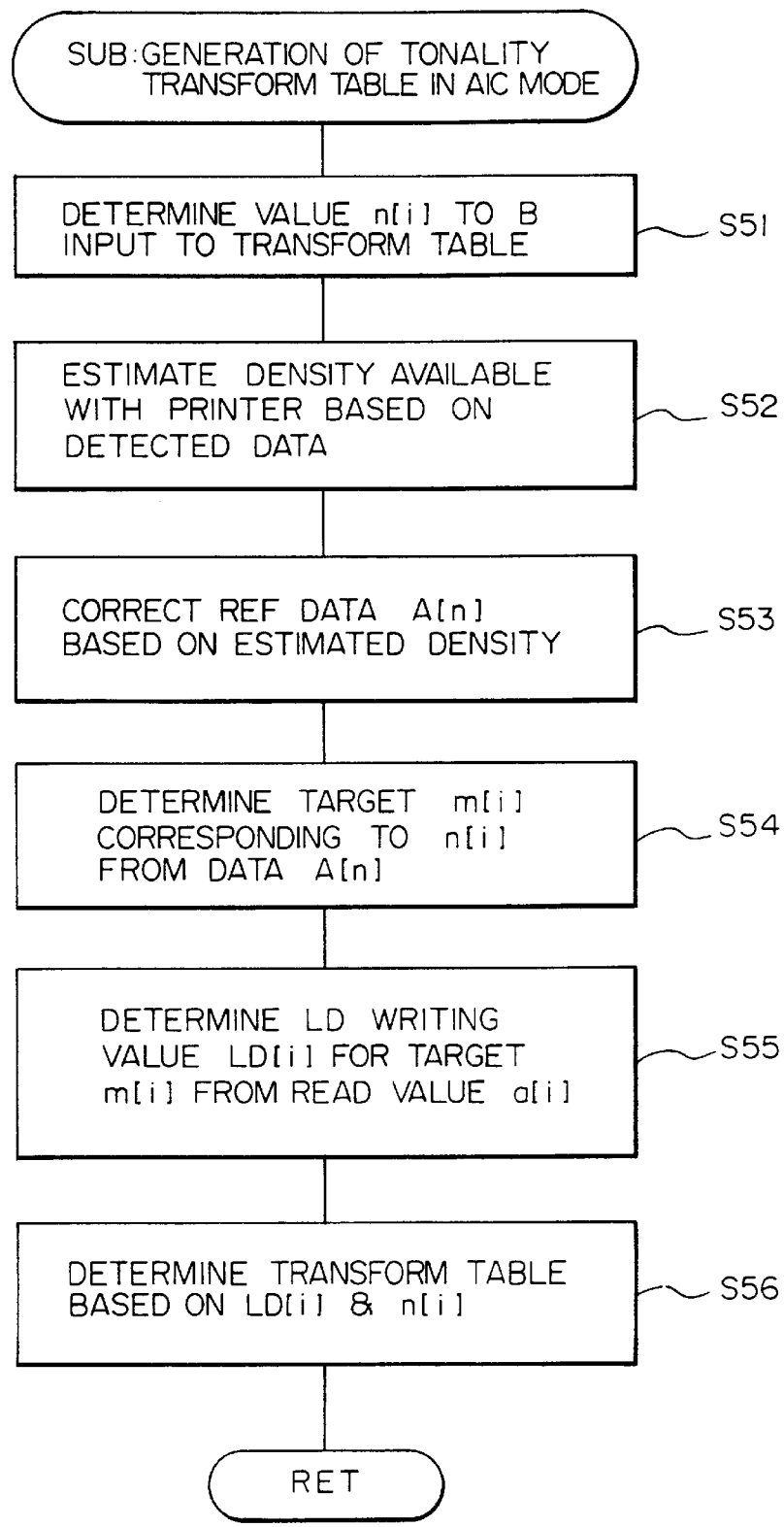
FIG. 21 is a flowchart representative of a computation procedure.

FIG. 20 shows specific scanner output data associated with cyan toner and having the maximum values of 0–1023 (which may be considered to be the sum of four pixels of read values). In FIG. 20, the ordinate γ indicates the common logarithm of read values which is expressed as:

$$y = \log 10\{\text{red component of read signal of cyan toner}\} - \min\} \quad \text{Eq. (12)}$$

The abscissa indicates the LD writing values used for forming the pattern. While the abscissa should preferably indicate the amount of LD light incident to the photoconductive element, it can be replaced with the LD writing value if the amount of LD light and the laser writing value are proportional.

In FIG. 20, curves a), b) and c) are respectively derived from min=0, min=30 and min=50 (1023 is maximum); the curve b) is representative of the values actually read when LD=225. When min is 30, LD=80–152 (50h–98h) have the best linearity. Therefore, by varying the value min, it is possible to determine that the values around LD=80–150 (specific values) and having the best linearity are the signals representative of the pattern formed by LD=255.

When the reading points and the LD writing values at the time of pattern formation are processed by the minimum square method, it is possible to determined the maximum density which can be output, if a value min providing a correlation coefficient closest to 1 is selected.

Likewise, accurate estimated values are available with the yellow toner and magenta toner if use is made of signals complementary to the blue component and green component, respectively. For the black toner, while any one of red, green and blue components may be used, it is desirable to use a signal having the best S/N ratio.

As for processing prior to a step S53 corresponding to the step S32 shown in FIG. 17, the density which the printer can output is estimated on the basis of the data read out of the pattern (step S52). In the step S53, the reference data A[n] is corrected in accordance with the estimated density.

The illustrative embodiment described above has the following unprecedented advantages. Assume that the maximum density available with the printer does not reach the density designated by reference data set before hand due to the freshness of the developer or the surrounding conditions. Even in such a condition, tonality correction tables can be generated which prevent the tonality of a high density portion from being lost.

It is possible to designate a density range (reference data) to be corrected in accordance with the maximum density available with the printer, and a density range not to be corrected. Hence, there can be designated a range where the density is desired to match the target density at the low density side or the high density side, and a range where importance is attached to tonality. As a result, correction tables matching such a condition are achievable.

Assume that the low density range is designated as a range not to be corrected. Then, even when the density available with the printer is lower than the target density, there can be obviated an occurrence that the low density is lowered more than necessary due to the compression of tonality simply based on the ratio between the density available with the printer and the maximum target density.

Assume that the high density range is designated as a range not to be corrected. Then, correction tables which guarantee density as close to the target density indicated by the reference density as possible are achievable. A range to be corrected may be interposed between the range where correction is not to be effected at the low density side and the range where correction is not effected at the high density side. Then, there can be selected or generated correction tables which prevent the actual density from being short of the target density and successfully match the density of the low density side to the reference data.

The range where correction should be effected and the range where it should not be effected can be designated with continuity. This not only guarantees tonality but also implements correction tables which bring even the density to the target density.

The density range where importance is attached to tonality and the density range where importance is attached to the target density can be easily designated in a stepwise fashion or a continuous fashion. This omits the time and labor for setting the upper limit of correction for every reference data.

Whether or not to execute the correction of reference data can be determined, as desired. Therefore, it is possible to correct the reference data when the reproducibility of tonality is important or to omit the correction when the reproducibility of image density is important.

Because the density available with the printer can be estimated, it is not always necessary to consume an amount of toner great enough for the available density when the test pattern is formed. This reduces the consumption of toner.

2nd Embodiment

Figure 1:
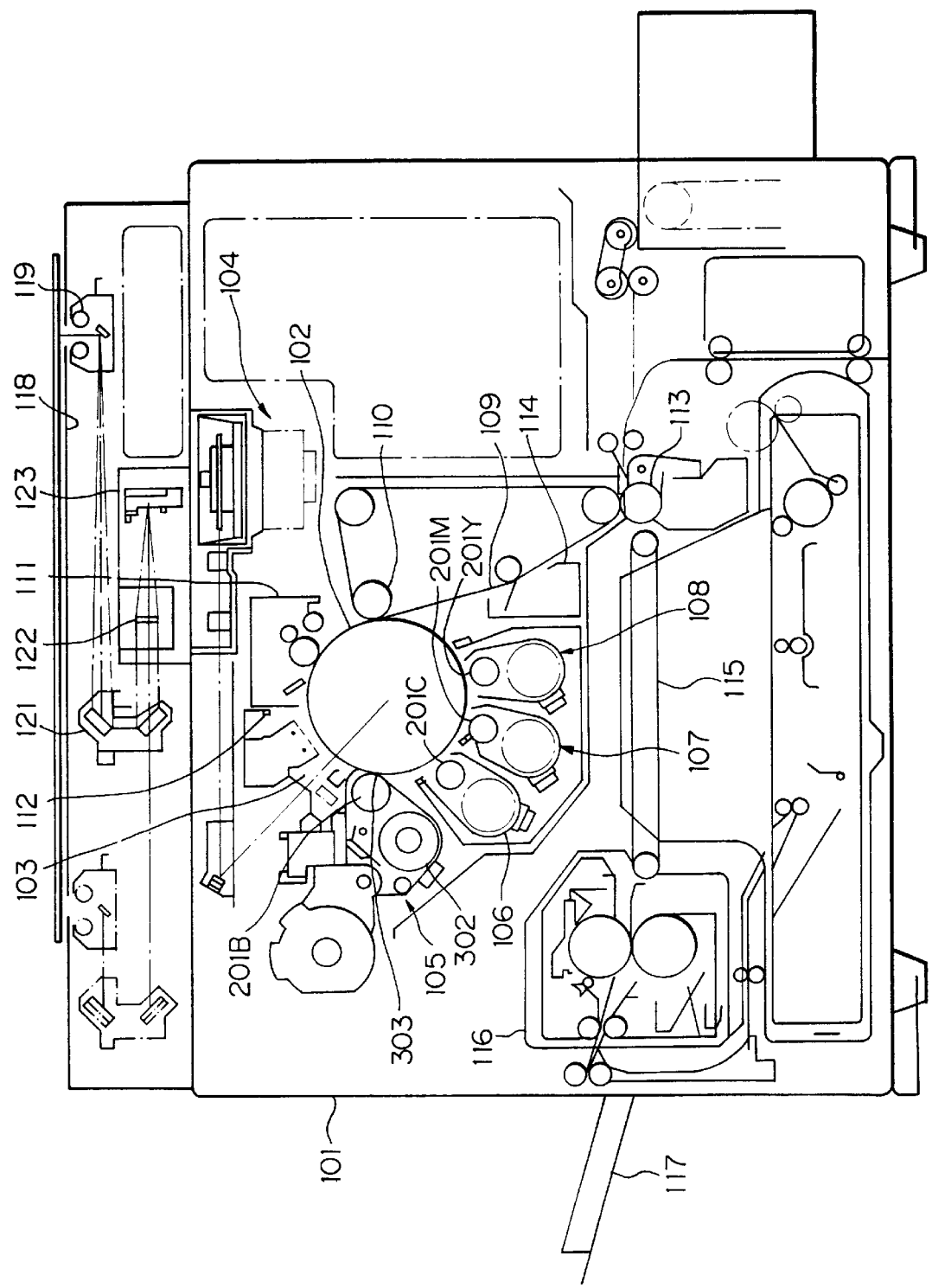
FIG. 1 is a vertical section of an image forming apparatus implementing various embodiments of the present invention.
Figure 23B:
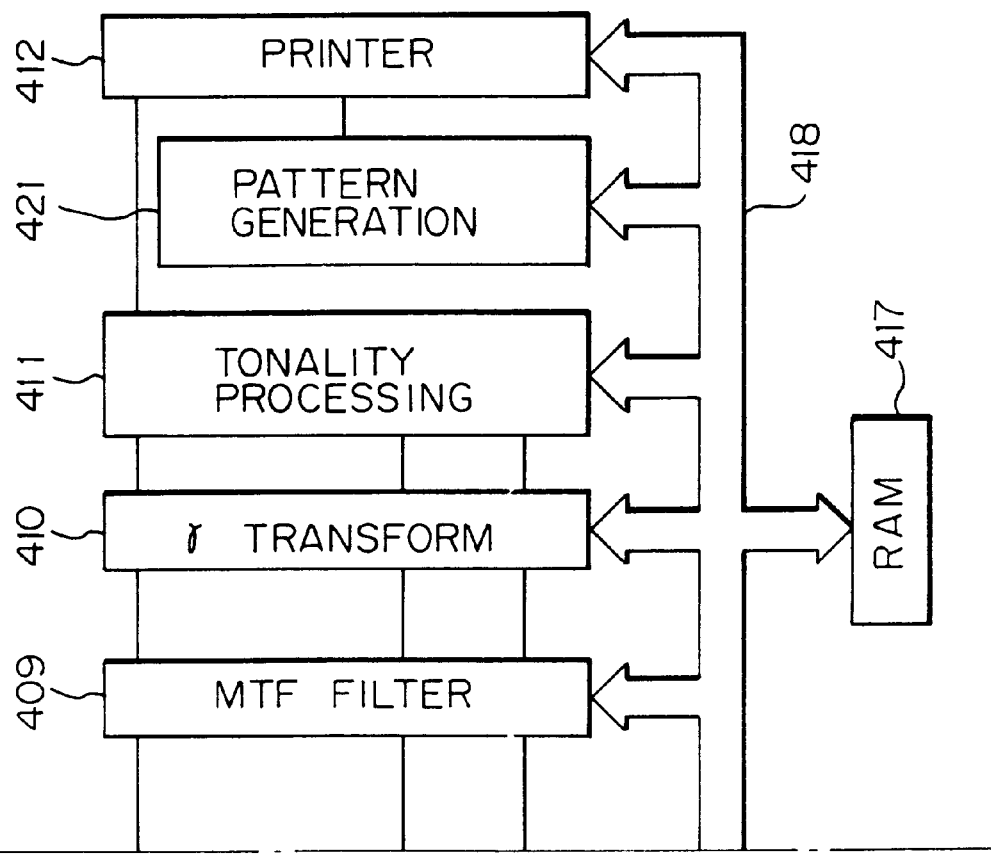
FIG. 23 is a block diagram showing a control system with which a second and a third embodiment are practicable.

This embodiment is also implemented as the copier shown in FIGS. 1 and 2. As shown in FIG. 23, the difference is that the second embodiment includes a pattern generator 421, a hue identification 422 and a selector 423 in addition to the circuitry shown in FIG. 3.

Figure 24:
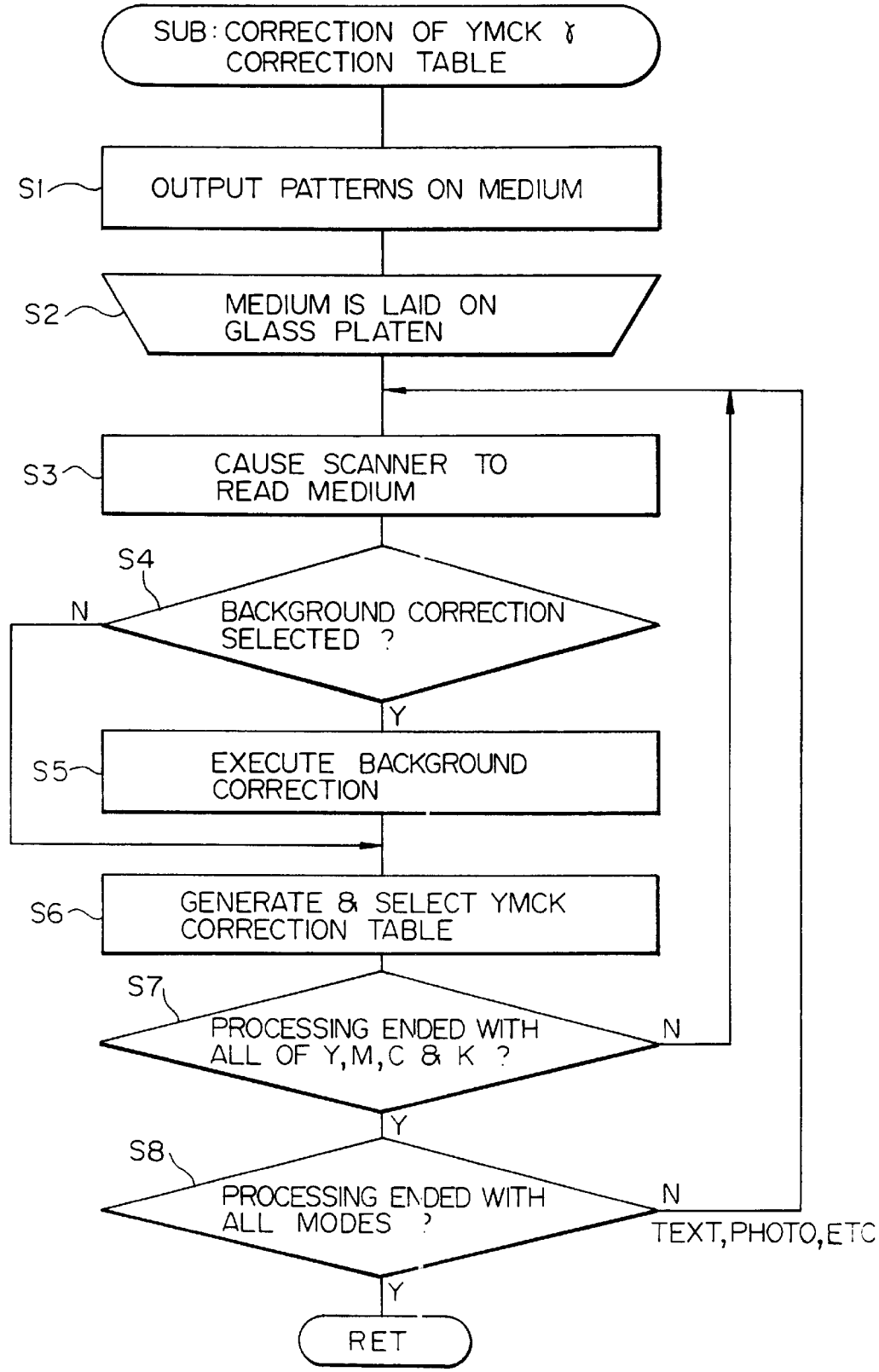
FIG. 24 is a flowchart demonstrating a specific procedure for generating YMCK tonality correction tables.

A reference will be made to FIG. 24 for describing an AIC procedure particular to the illustrative embodiment. When the operator calls the AIC menu on the LCD screen, FIG. 10, a picture shown in FIG. 25 appears on the screen. When the operator selects the automatic background correction on the picture of FIG. 25, the picture shown in FIG. 12 appears. Again, when the operator touches the print start key on the picture of FIG. 12, the density patterns shown in FIG. 13 corresponding to the colors Y, M, C and K and the text and photo modes are printed on a recording medium (step S1, FIG. 24).

Subsequently, the operator lays the above recording medium or document on the glass platen 118 (step S2), as instructed by the picture of FIG. 14. In this condition, the scanner reads the RGB data of the YMCK density patterns and the data of the background (step S3), as stated earlier. When the correction using the background data is desired (step S4), background processing to be described hereinafter is executed (step S5), and then the YMCK correction tables are generated or selected. If the background correction is not desired, the YMCK correction tables are generated or selected with the R, G and B data output from the scanner (step S6). Such processing executed with each of Y, M, C and K and each of the photo mode and text mode (step S7). During this processing, the picture shown in FIG. 15 appears on the screen.

If images formed on the basis of the corrected YMCK tables are not desirable, the operator can select the original YMCK correction tables, as instructed by the picture of FIG. 14. As for the background collection, the operator touches either one of the background ON and OFF switches. As for the RGB γ correction, the operator touches either one of RBG γ conversion ON and OFF switches.

Figure 26:
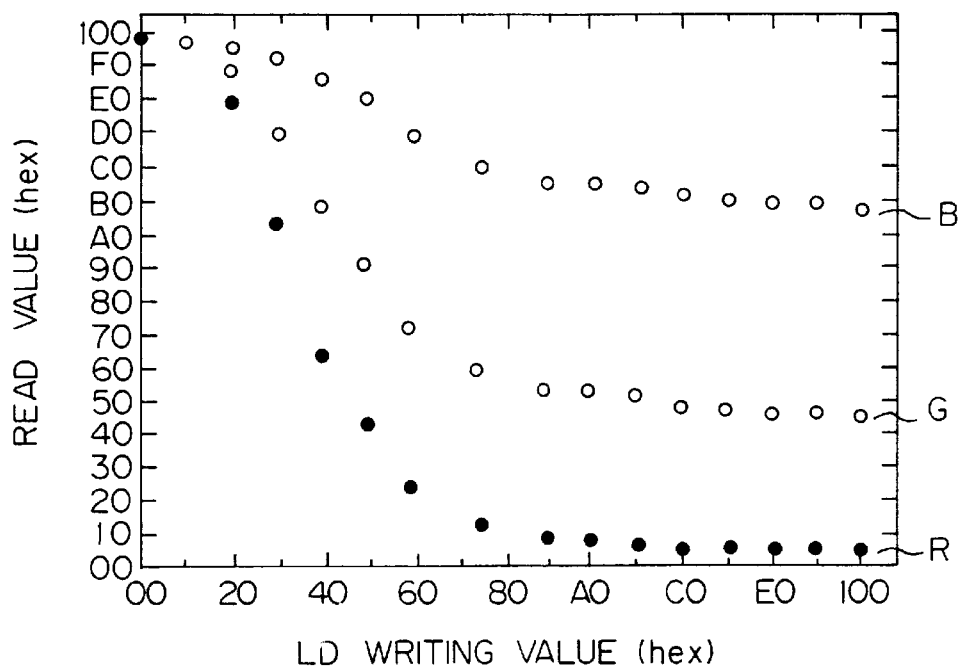
FIG. 26 shows specific values read out of a pattern.
Figure 27:
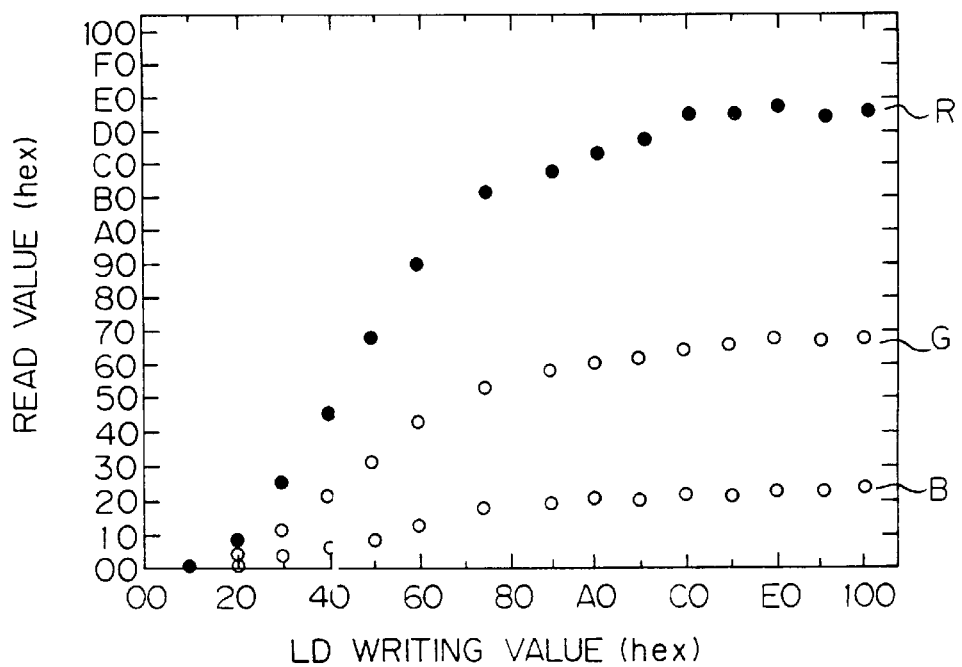
FIG. 27 shows specific values read out of the pattern, but undergone RBG γ correction.

The output of the scanner derived from the recording medium carrying the above patterns is processed as follows. FIG. 26 plots specific values actually read out of the patterns. In FIG. 26, the abscissa indicates LD writing values for forming latent image patterns on the drum 102 (eight-bit signal having levels 0 through 255 by way of example). The latent image patterns formed on the drum 102 are developed, transferred to a recording medium, and then fixed. The resulting RGB values output from the scanner are indicated on the ordinate (eight-bit signal having levels 0 through 255 by way of example). Both the abscissa and the ordinate are represented by the hexadecimal notation. FIG. 26 is a graph derived from cyan by way of example and produced when RBG γ correction was not executed with the output of the scanner. A shown, the R signal shows the greatest variation while the B signal shows the smallest variation.

As FIG. 26 indicates, the output of the scanner falls with an increase in LD writing value because the amount of toner to deposit on the recording medium increases with the increase in LD writing value. However, the image density saturates i n a certain range. The R, G and B signals are complementary to the Y, M and C image patterns, respectively. In FIG. 26, the R signal is used because the scanner output is associated with cyan toner. This is because the signal complementary to any one of Y, M and C has a broad dynamic range and therefore desirable S/N ratio. In addition, using a single component for the correction of image density makes the signal processing simple.

While the scanner outputs R, G and B components, the spectral characteristic of the scanner as to such three color components and that of the human visual sense are different. This results in a difference between the color sensed by a person and the color actually reproduced (metamerism). In order to avoid this, a color component having a spectral sensitivity characteristic other than R, G and B, e.g., cyan, may be added. Then, a color component having the best dynamic range and best S/N ratio is selected for Y, M, C or K. While the correction table for the black toner may be based on any one of R, G and B, use is made of G having a relatively great S/N ratio and a broad dynamic range.

In the above specific procedure, the R, G and B components output from the scanner are used to generate and select the Y, M, C and K correction tables. Generally, all of the R, G and B components are used in order to generate or correct color conversion transform coefficients.

Figure 28:
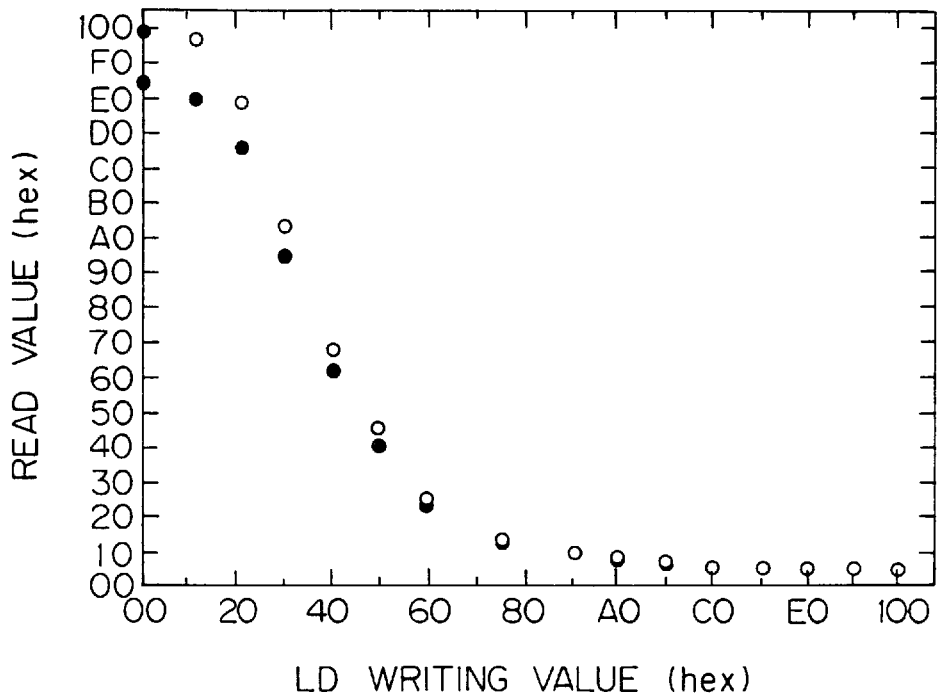
FIG. 28 shows other specific values read out of a pattern.

FIG. 28 plots values output from the scanner when a white paper is laid on the rear of the recording medium carrying the patterns, and when a black paper is laid on the same. In this case, the output of the scanner is not subjected to RBG γ transform. Values obtained with a cover plate and those obtained with an ADF are plotted between the data derived from the white paper and those derived from the black paper. When the surface of the cover plate pressing the document is white, the values output from the scanner with the white paper and those output from the scanner with the black paper are substantially coincident. The values output from the scanner with the cover plate or the ADF opened are substantially coincident with the values derived from the black paper laid on the rear of the document. When the ADF is closed, values substantially intermediate between the above values are output.

Figure 29:
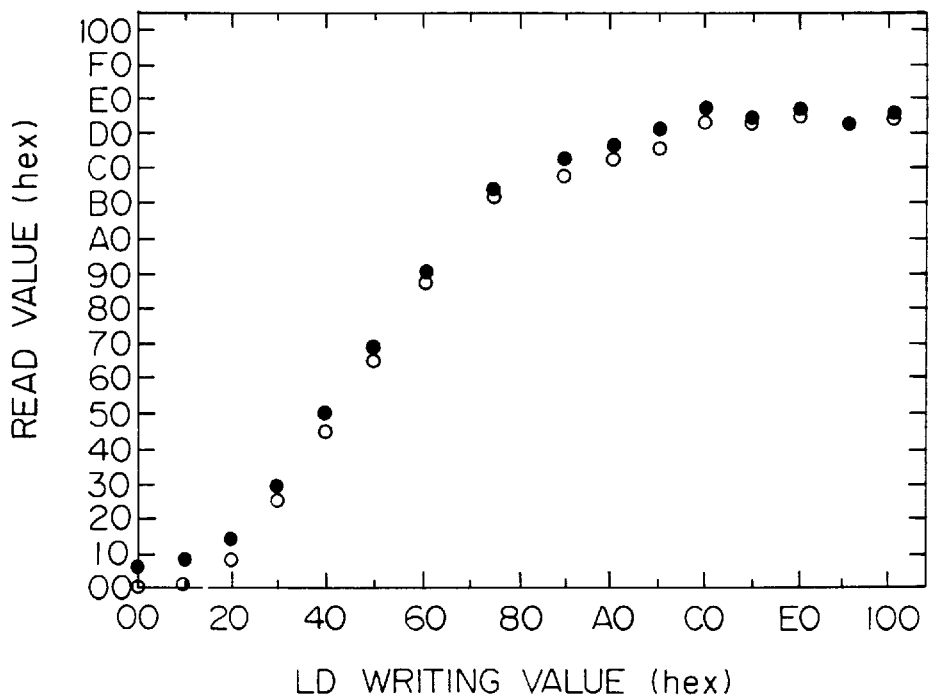
FIG. 29 shows the values read out of the pattern, but undergone RBG γ transform.

In practice, the above values sequentially vary due to aging, e.g., the contamination of the cover plate and that of the belt of the ADF. FIG. 28 shows that the case with the black paper and the case with the black paper differ in data mainly in the range in which the LD writing value is small, i.e., in the low density portion where the amount of toner deposition is small. FIG. 29 corresponds to FIG. 28 except that it shows data based on RBG γ transform.

Figure 30:
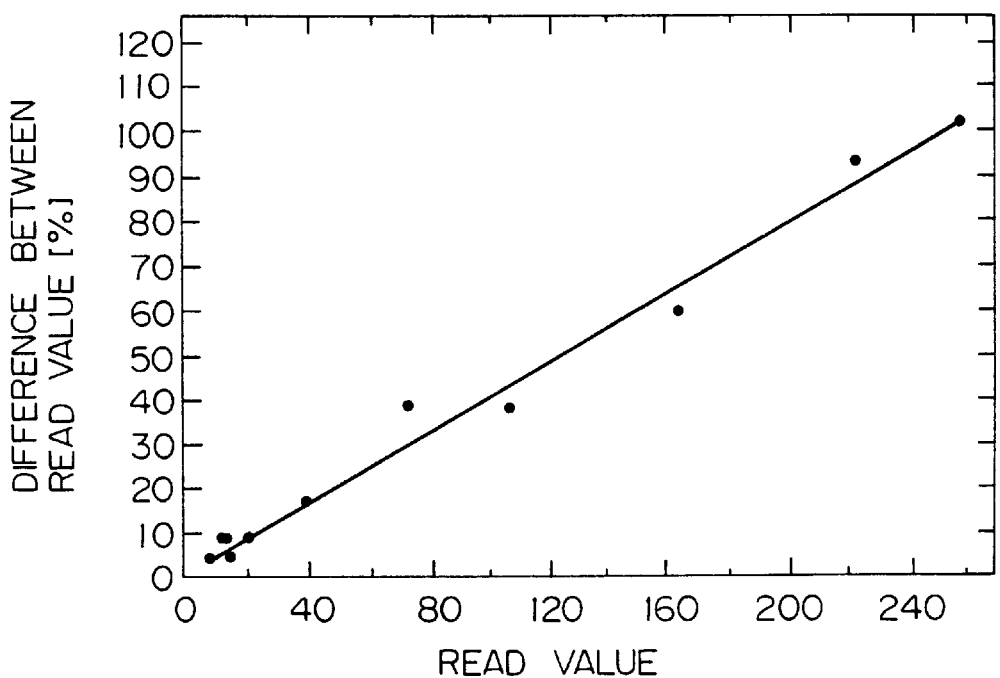
FIG. 30 shows specific values fitted by a linear equation and derived from a 100% difference in background data and a black paper.

FIG. 30 plots a difference between the scanner output derived from the white paper laid on the document and the scanner output from the black paper also laid on the document. The difference is plotted with respect to the values derived from the black paper. A difference in background data is assumed to be 100%. Assume that when a pattern is formed on a recording medium by a LD writing value LD, the scanner outputs a value ak[LD] for the case with the black paper or outputs a value aw[LD] for the case with the white paper. In FIG. 30, the abscissa indicates ak[LD] (=x[LD]) while ordinate indicates the following:

$$ak[LD] \ (x\{LD\}) \ aw[LD]-ak[LD]/(aw[0]-ak[0])\times 100$$
$$(=y[LD]) \ [\%] \quad\quad \text{Eq. (21)}$$

The above equation is representative of the contribution of the black paper included in the values read by the scanner. Although the data points are scattered, they are substantially proportional to the values read out of the pattern. A gradient b and an intercept c can be determined from the graph and is expressed as:

$$y[LD] \ [\%]=b \cdot x[LD]+c \quad\quad \text{Eq. (22)}$$

For the actual adjustment of the copier by the user or a serviceman, use is made of the cover plate or the ADF. Assume that the scanner output representative of the background of a paper carrying the pattern thereon is a[0], that the scanner output representative of the pattern formed by the laser output LD is a[LD], and that the value aw[0] representative of the background, but derived from the white paper, is a constant d. Then, the following equation is derived from the Eqs. (21) nd (22):

$$(aw[LD]-a[LD])/(d-a[0])\times 100=b \cdot a[LD]+c \quad\quad \text{Eq. (23)}$$

Because the data for actually generating the YMCK correction tables is aw[LD], the following equation holds based on the Eq. (23):

$$aw[LD]=(b \cdot a[LD]+c) \cdot (d-a[0])/100+a[LD] \quad\quad \text{Eq. (24)}$$

The above constants b, c and d are stored in the ROM 416. Therefore, even when the cover plate or the ADF is used, the scanner output aw[LD] derived from the reference white paper laid on a recording medium can be determined on the basis of the background value a[0] of the medium read at the time of adjustment and the pattern value a[LD].

While the above correction deals with a cover plate or a n ADF to be laid on the rear of the recording medium, it also holds true with a recycled paper or similar lightly colored recording medium.

Figure 31:
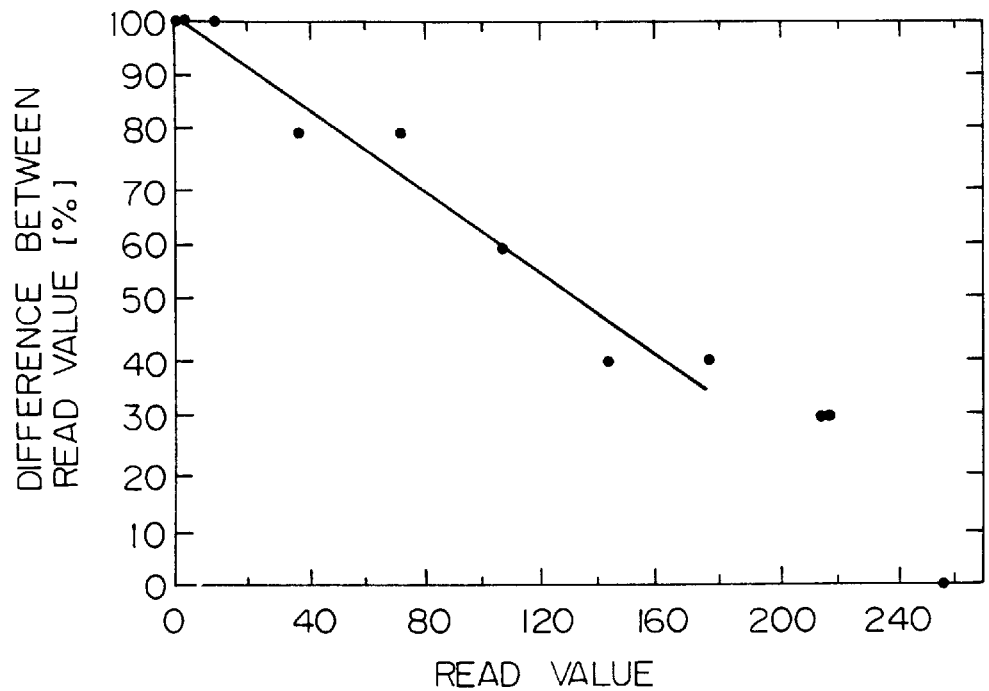
FIG. 31 shows data produced when the values shown in FIG. 30 are subjected to RBG γ transform.

FIG. 31 corresponds to FIG. 30 except that it is based on RBG γ correction. FIGS. 30 and 31 are opposite in inclination because the relation between the values read out of the pattern and the image density of the actual pattern is reversed, depending on whether or not RBG γ correction is effected. Specifically, when RBG γ correction is not effected, the scanner output decreases with an increase in the amount of toner deposited on the recording medium. When RGB γ correction is effected, the scanner output undergone RGBγ correction increases with an increase in the amount of toner deposition.

The value d is 255 levels when the typical signal without RBG γ correction has eight bits or is zero level when RGB γ correction is effected. In practice, however, the value d depends on how the image density corresponding to the scanner output value 0 or 255 is set.

While FIGS. 30 and 31 show values read out of the same pattern, the constants b and c depend on whether or not RGB γ transform is effected. RBG γ transform is used to transform the scanner output proportional to the reflectance to a value proportional to density or lightness. One of major objects of RBG γ correction is to enhance color reproducibility in the event of RGB-YMC color conversion to follow. Another major object is to bring the image data closer to the human visual sense with respect to color or image density, so that a person feels a reproduced image faithful.

Because RBG γ transform transforms the image data to bring them closer to the human visual sense, processing is executed such that color differences or density differences with respect to target values from the low density to the high density are rendered uniform. On the other hand, when processing is executed without RBG γ transform, i.e., with the image signal proportional to the reflectance, the reproducibility is more enhanced with the low density portion than with the high density portion. It follows that usually the generation and selection of the YMCK correction tables are performed with the image signal undergone RBG γ correction, while the scanner outputs are directly dealt with without RGB γ correction when importance is attached to the reproducibility of the low density portion.

While the Eq. (22) is linear, a quadrature or even higher order equation or a table to be referenced is required when higher accuracy is desired, i.e., when correction should be made in consideration of nonlinearity to occur in a region where the amount of toner deposition on the recording medium is small or great. The Eq. (22) may be rewritten in a more general form, as follows:

$$y[LD]=f(x[LD]) \qquad \text{Eq. (25)}$$

where f(x) denotes a function of x and a functional for the LD writing values. With the above Eq. (25), the desired aw[LD], like the Eq. (24), can be expressed as:

$$aw[LD]=f(a[LD])\cdot(d-a[0])/100+a[LD] \qquad \text{Eq. (26)}$$

By representing f(a[LD]) with a higher order equation or by referencing a table, it is possible to determine the contribution of the background directly with the values a[LD] read out of the pattern.

How the LUTs are generated or selected by the γ transform processing 410 will be described hereinafter. The YMCK tonality transform tables are each generated by comparing the produced aw[LD] and the reference data A[i] stored in the ROM 416, using the Eqs. (24) and (26). Here, letter i denotes a value input to the transform table. The reference data A[i] are each the target value of a value which the scanner outputs by reading the toner pattern. This toner pattern is output by the LD writing value LD(i) after the input value i has been subjected to YMCK tonality transform.

By determining LD corresponding to A[i] from aw[LD], it is possible to determine an LD output value LD[i] corresponding to the value i input to the YMCK transform table. This is repeated with all the input values i=0, 1, . . . , 255 (in the case of an eight-bit signal) in order to generate a transform table. Alternatively, the processing may be executed skipping a part of the input values i=00H, 01H, . . . , ffH (hexadecimal), e.g., with i=0, 11H, 22H, . . . , ffH, in which case the intervening values will be interpolated by, e.g., a spline function.

Further, among the YMCK γ correction tables stored in the ROM 416, there may be selected the table passing through the (0, LD[0]), (11H, LD[11H]), (22H, LD[22H]), . . . , (ffH, LD[ffH]) set.

Figure 32:
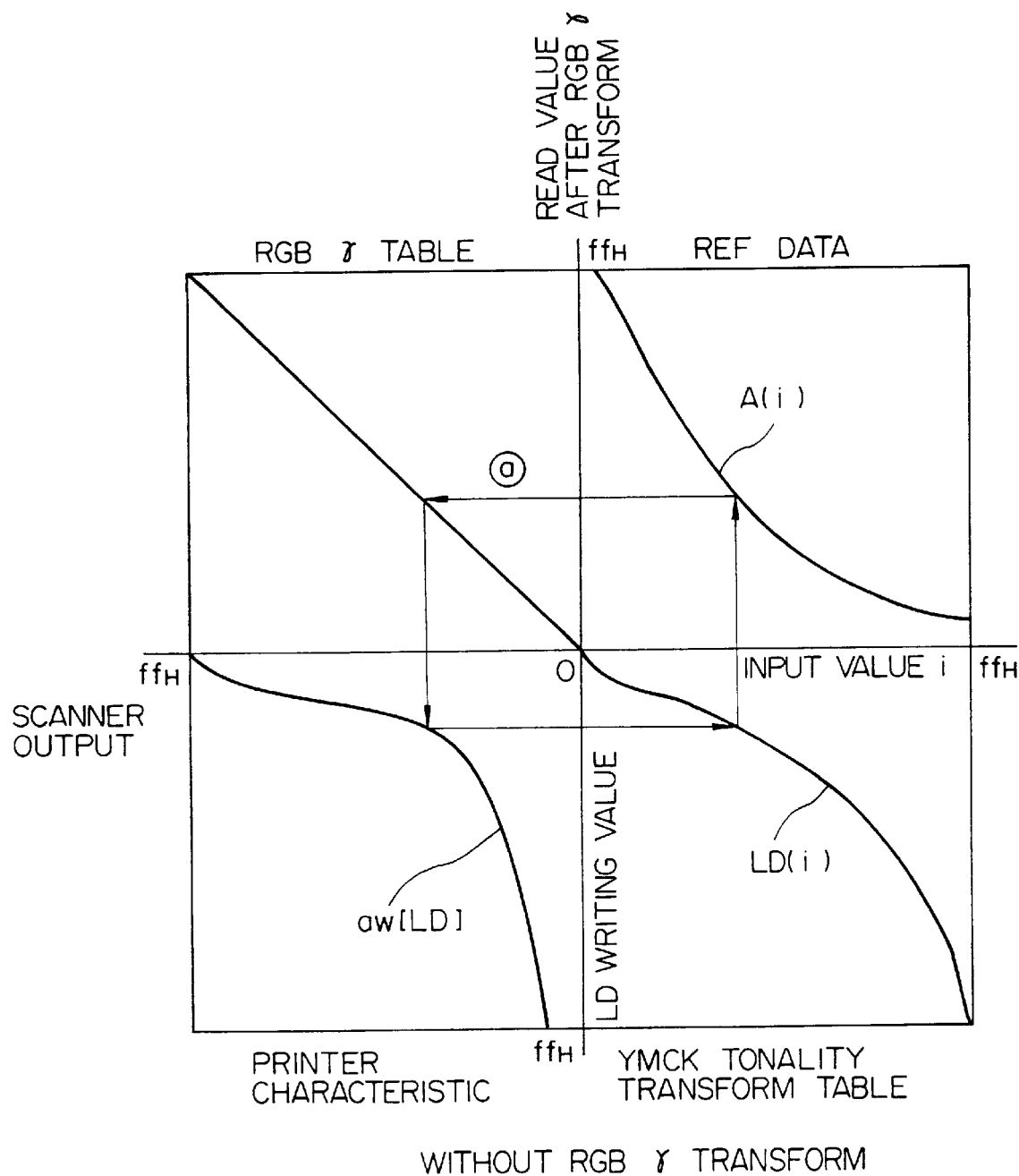
FIG. 32 shows a specific correction table not subjected to RBG γ transform.

The above processing will be described specifically with reference to FIG. 32. In FIG. 32, the first quadrant is representative of the reference data A[i]; the abscissa indicates the values i input to the YMCK tonality conversion tables while the ordinate indicates scanner outputs undergone RGB γ correction. The second quadrant is representative of an RBG γ conversion table; the abscissa indicates input values before γ transform while the ordinate indicates output values undergone γ transform. In FIG. 32, RBG γ conversion is not executed.

The third quadrant indicates the laser writing values; the abscissa indicates the output values of the scanner read a toner pattern formed on a recording medium by a preselected laser output LD. FIG. 32 shows the characteristic of the printer. When RBG γ correction is not executed, the graph coincides with aw[LD]. While the LD writing values of the actual pattern are sixteen points, i.e., 00H (background), 11H, 22H, . . . , eeH, ffH, the intervals between the above points are interpolated so as to complete a continuous graph. The fourth quadrant is representative of the YMCK conversion tables LD[i] which is the target.

Figure 33:
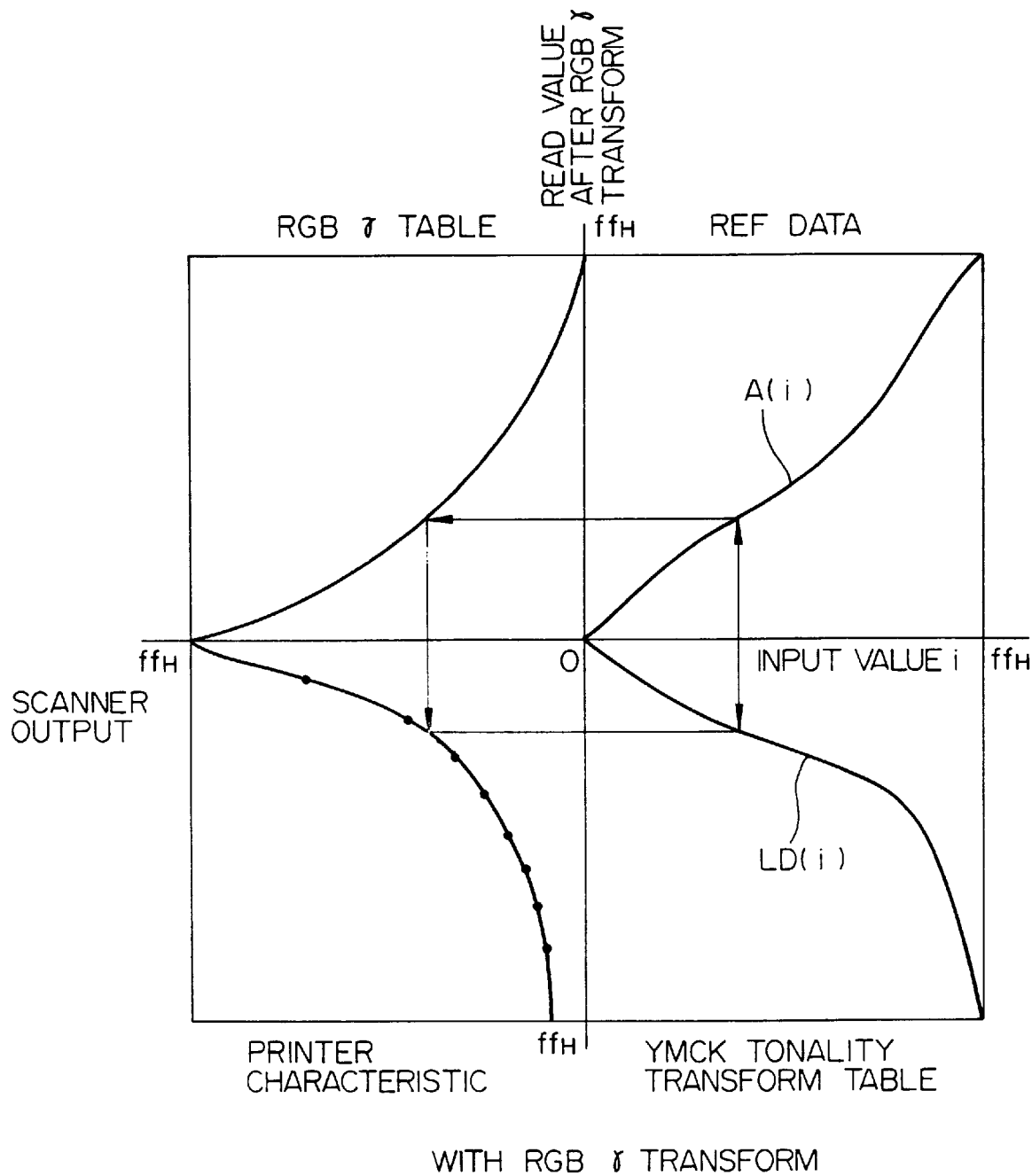
FIG. 33 shows a specific correction table subjected to RGB γ correction.

Reference data A[i] is determined for a given input value i, and then an LD output providing the data A[i] is determined, as indicated by arrows. FIG. 32 shows the characteristic of the printer involving RBG γ transform. While FIG. 32 is coincident with FIG. 33 as to the third quadrant, the former differs from the latter as to the second quadrant. Although the reference data of the first quadrant must be changed, the YMCK conversion tables LD[i] which are the final results are coincident both in FIG. 32 and FIG. 33.

As stated above, the reference data are changed, depending on whether or not RBG γ correction is to be effected.

The ratio of background correction depends on the color of toner, i.e., Y, M, C or K. Therefore, equations (coefficients thereof) providing the previously stated contribution ratios of background correction or reference tables respectively corresponding to Y, M, C and K are stored in the ROM or the RAM. When the YMCK correction table is generated or selected, reference data and the contribution ratio of the background are selected, depending on the toner, and the pattern are corrected based on the reference data and the contribution ratio of background.

When the YMCK toner correction is based on the signal of the color complementary to R, G or B, background correction is executed with the B, G or R signal complementary to Y, M or C. For such processing, reference data and the contribution ratio of background are stored in the RAM or the ROM beforehand for each of Y, M, C and K and for each of the text mode and photo mode.

Figure 25:
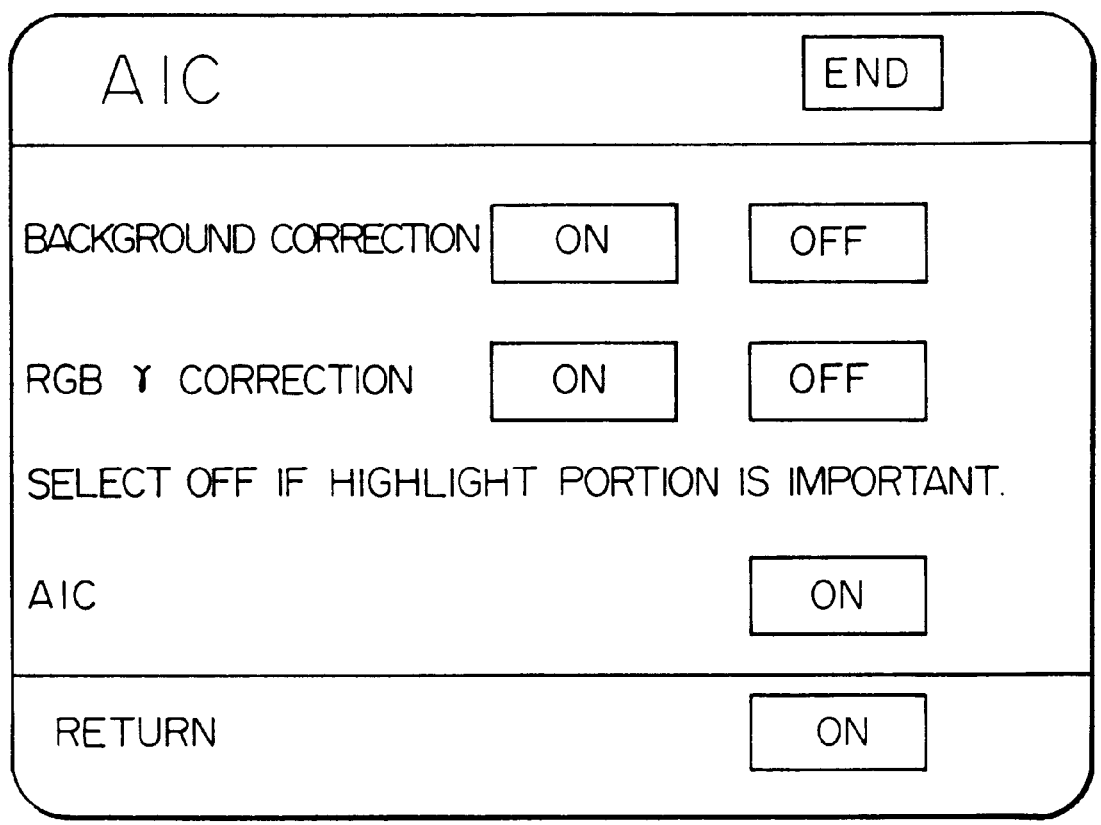
FIG. 25 shows a specific picture to appear on the operation panel.

As shown in FIG. 25, selecting means for allowing the operator to select the background correction is provided on the operation panel. For the background correction, there is selected a tonality correction table listing tonality and low density portion reproducibility which are constant without regard to the color of the surface of the recording medium. Again, when the user desires high color reproducibility with a particular kind of recording media, the background correction is sometimes not desirable. In such a case, the background correction may be inhibited depending on the user's taste and purpose.

As stated above, when a recording medium laid on the glass platen is read with or without the cover plate lying thereon, the resulting data can be corrected to produce substantially the same values. This is also true when the cover plate is replaced with an ADF or a white and a black paper. In addition, the data can be corrected without regard to the spectral reflectance characteristic, i.e., the kind of paper which may be a thick paper, a recycled paper or a coated paper.

The amount of correction of background data is changed in accordance with the signal derived from the pattern. This allows the signal to be adequately corrected and thereby allows the tonality correction tables to be adequately generated or selected.

The ratio of correction of background data may be changed in accordance with the color of toner. Alternatively, when the scanner outputs R, G and B components, the above ratio may be changed in accordance with each of the R, G and B color components. This corrects the difference in the contribution of background data between the colors of toner and allows the tonality correction tables to be adequately generated or selected on the basis of the pattern read.

The ratio of correction using the background area of the recording medium is variable, depending on whether or not RBG γ correction is executed. This also allows the correction tables to be adequately generated or selected. Although the output signal of the reading means is usually proportional to the reflectance of the surface of a document, the signal undergone RBG γ correction is proportional to the image density or the lightness.

The signal not undergone RBG γ correction does not bring about a fall of signal accuracy. However, the signal is different from the human visual sense in that it has high sensitivity to low density portions and low sensitivity to high density portions. In this sense, the above signal is effective when it comes to the selection and generation of the correction tables attaching importance to the accuracy of low density portions.

RBG γ correction causes the signal accuracy to fall. However, the resulting signal is analogous to the human visual sense. This is effective when it comes to the selection and generation of the correction tables having substantially uniform accuracy.

The correction using background data is executed with high accuracy in accordance with the color of toner, the R, G or B component output from the scanner, or the size of a signal representative of the pattern read. This also promotes the adequate selection and generation of the correction tables.

The user is capable of determining whether or not to effect the correction using background data, as desired. For example, when various kinds of recording media including plain paper, recycled paper and coated paper each having a particular spectral reflectance are used, the correction using background data may be effected, as stated earlier.

When any one of the R, G and B components is used for the generation and selection of the YMC correction tables, signal processing is simplified and sped up.

3rd Embodiment

This embodiment, like the second embodiment, is implemented as the copier shown in FIGS. 1 and 2 and also includes the image processing circuitry shown in FIG. 23. The following description will concentrate on the difference in construction and operation between this embodiment and the second embodiment.

The AIC procedure for automatically correcting image density (tonality) will be described. When the operator calls the AIC menu on the operation panel, FIG. 10, the picture shown in FIG. 12 appears on the LCD. Assume that the operator touches the print start key included in the picture of FIG. 12. Then, the copier prints a plurality of density or tonality patterns corresponding to the colors Y, M, C and K and the text and photo modes on a recording medium. Such density patterns are set and stored in the ROM included in the IPU beforehand, as stated earlier. The patterns are implemented as sixteen hexadecimal patterns 00h, 11h, 22h, ..., EEh, FFh. While in FIG. 13 patches of five consecutive tones are shown except for the background, any desired values can be selected out of the eight-bit signals 00h–FFh. In the text mode, the patterns are formed with 256 tones for a single dot; dither processing or similar pattern processing is not executed. In the photo mode, an LD writing value is formed by distributing the sum of the writing values of each two pixels adjoining in the main scanning direction. Specifically, assume that the first and second pixels have LD writing values n1 and n2, respectively. Then, the sum of the values n1 and n2 is distributed as follows:

if n1 + n2 ≦ 255,
    n1 + n2 for first pixel and 0 for second pixel if n1 + n2 > 255
    255 for first pixel and n1 + n2 − 255 for second pixel
or
if n1 + n2 ≦ 128
    n1 + n2 for first pixel and zero for second pixel
if 128 < n1 P n2 ≦ 256
    128 for first pixel and n1 + n2 − 128 for second pixel
if 256 < n1 + n2 ≦ 383
    n1 + n2 − 128 for first pixel and 128 for second pixel
if 383 < n1 + n2
    255 for first pixel and n1 + n2 −255 for second pixel In addition, pattern processing actually used at the time of image formation is used.

In the illustrative embodiment, the contribution ratios of background data are computed beforehand for each of the case with RBG γ conversion and the case without it. Specifically, data derived from the pattern read and not undergone RBG γ correction are processed, then RGBγ conversion is executed with the data of the pattern not undergone RGBγ conversion, and then a similar processing is executed. In practice, the operator can determine whether or not to execute RGBγ correction in the event of pattern detection.

Figure 36:
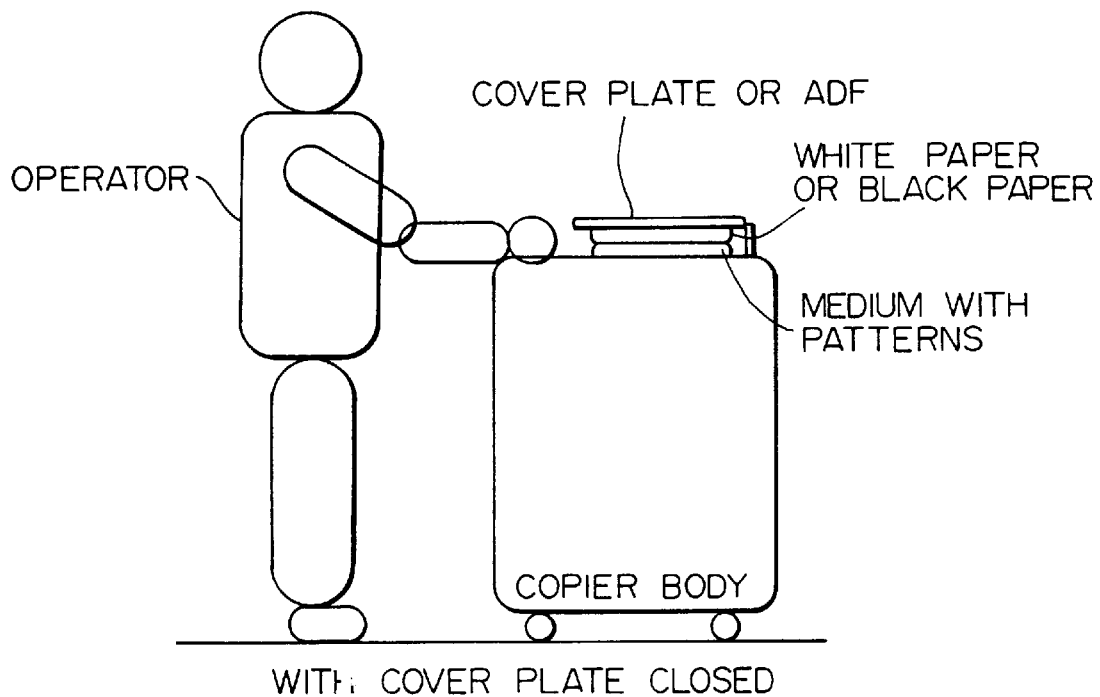
FIGS. 36 and 37 show the procedure of FIG. 35 specifically.
Figure 37:
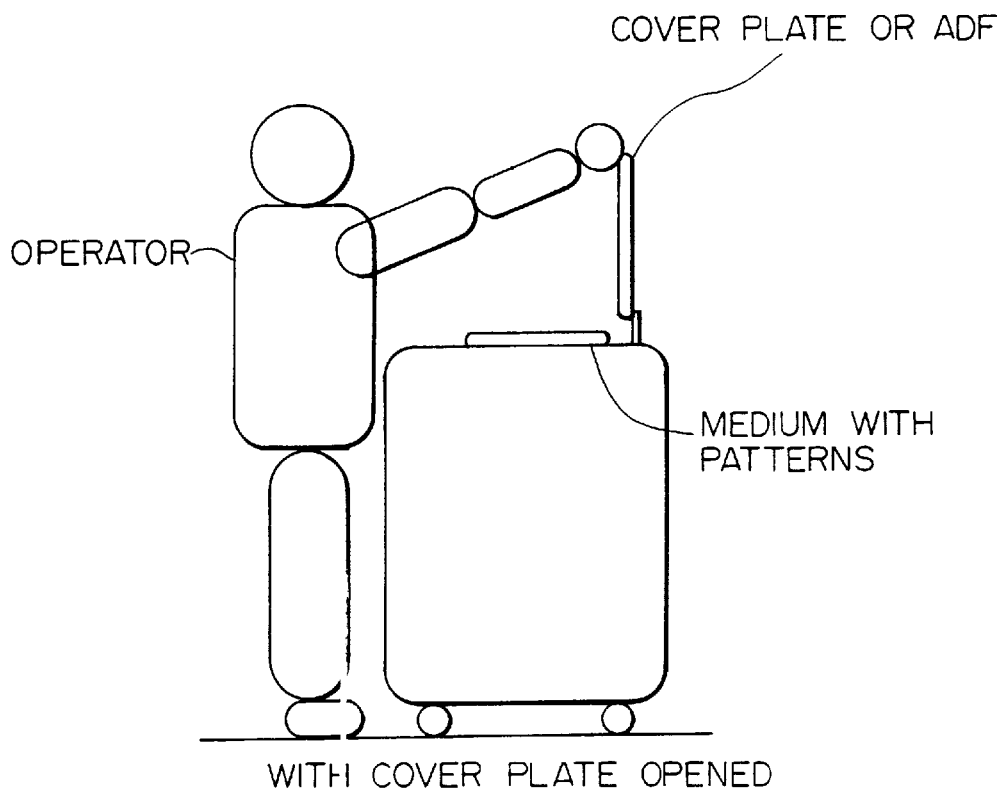

A specific operation of the embodiment will be described with reference to FIG. 35. The operator may lay a white and a black paper one after the other on a recording medium laid on the glass platen and carrying the pattern thereon, as shown in FIG. 36, or may open the cover plate or the ADF, as shown in FIG. 37. A procedure for determining the contribution of the background in any of the conditions shown in FIGS. 36 and 37 will be described hereinafter.

Figures 38, 39:
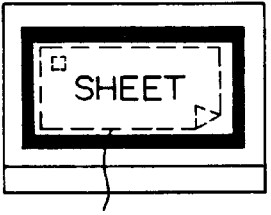
FIGS. 38–41 each shows a specific picture to appear on the operation panel.

Assume that the operator selects the correction of background data on the picture shown in FIG. 11. Then, a picture shown in FIG. 38 appears on the screen. When the operator touches a print start key shown in FIG. 38 (step S1), the copier prints the patterns on a recording medium (step S2). Watching a picture shown in FIG. 39, the operator lays the recording medium or document with the patterns on the glass platen, then lays a white paper on the rear of the document, and then closes the cover plate (step S3). Subsequently, the operator touches a read start key shown in FIG. 39 (step S4). In response, the scanner reads the patterns and background (step S5; first scanning).

Figure 40:
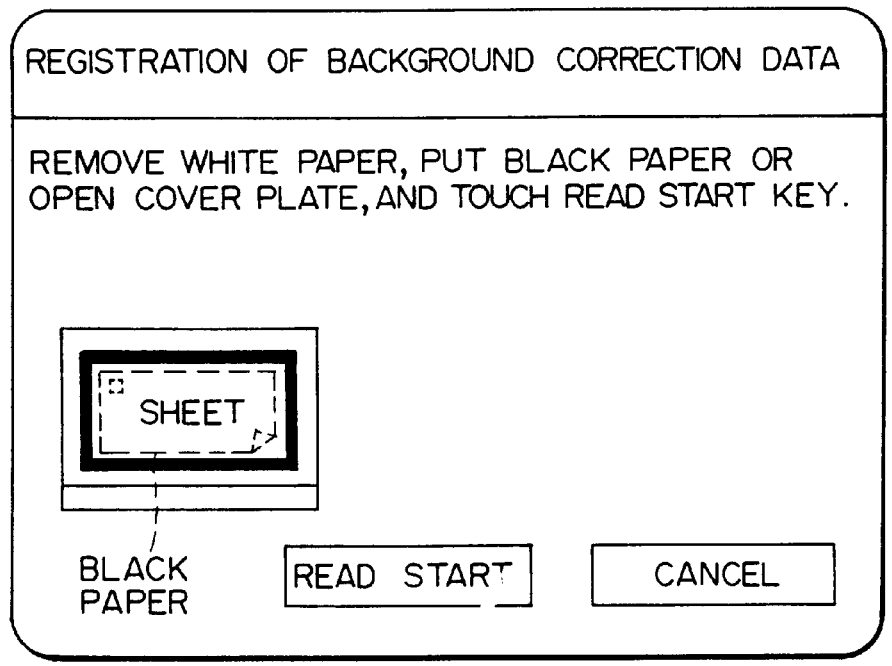

Then, watching a picture shown in FIG. 40, the operator replaces the white paper with a black paper or opens the cover plate or the ADF (step S6), and then touches a read start key (step S7). In response, the scanner again reads the patterns and background (second scanning).

Figure 41:
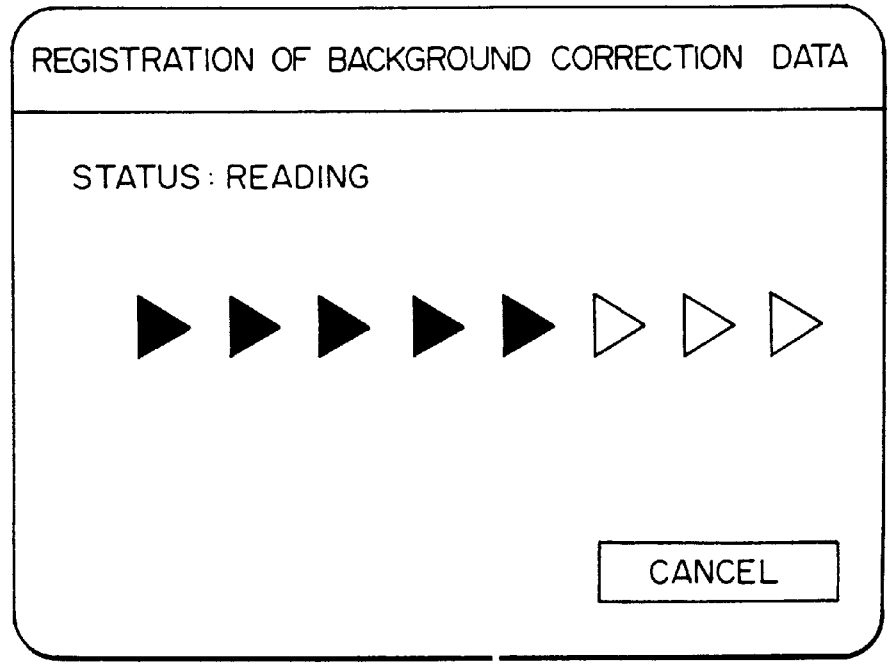

During the course of scanning, a picture shown in FIG. 41 appears. If the values derived from the white paper and black paper are different from each other (N, step S9), constants b1, c1 and d1 for the case without RGBγ correction are determined on the basis of the scanner outputs derived from the white paper or the black paper. The constants b1, c1 and d1 are stored in the RAM (step S10).

Subsequently, the read data are subjected to RGBγ correction (step S11) in order to determine constants b2, c2 and d2. The constants b2, c2 and d2 are also stored in the RAM (step S12). On the other hand, assume that use is made of a thick paper or similar recording medium with no permeability. Then, the scanner outputs are coincident when the white paper is laid on the medium and when the black paper is laid on the same. In such a case (step S9), background correction information is not attainable. Then, if the previous correction values are present (Y, step S13), they are used (step S14). If the previous correction values are absent (N, step S13), default values existing in the ROM are used (step S15). Thereafter, the picture shown in FIG. 11 appears again. To return to the usual picture, the operator touches an end key.

In the step S3, the white paper may be replaced with a white plate formed of plastics and having a high surface reflectance, e.g., the rear of the cover plate sufficiently cleaned. In the step S7, the black paper may be replaced with opening the cover plate or the ADF, with a plate so configured as to diffuse incident light, or with a sheet of glass or plastics transparent for light. The crux is that the rear of the recording medium with the pattern be sequentially provided with two conditions different in reflectance.

Alternatively, the cover plate or the ADF may be closed to provide the rear of the recording medium with high reflectance, and may be opened to provide it with low reflectance. This is simpler than the above schemes.

Figure 42:
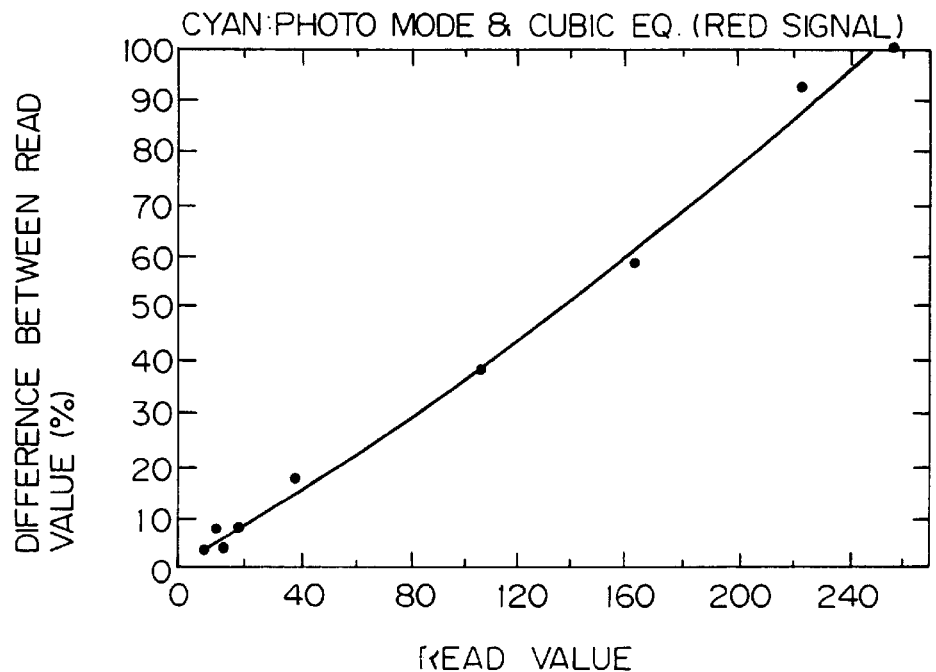
FIG. 42 shows specific values fitted by a cubic equation and derived from a 100% difference in background data and a black paper.

While the data of FIG. 30 are fitted by a linear equation, FIG. 42 shows data fitted by a cubic equation. For read data having levels 10–160, the result of fitting shown in FIG. 42 is more coincident than the result of fitting shown in FIG. 30.

Figure 43:
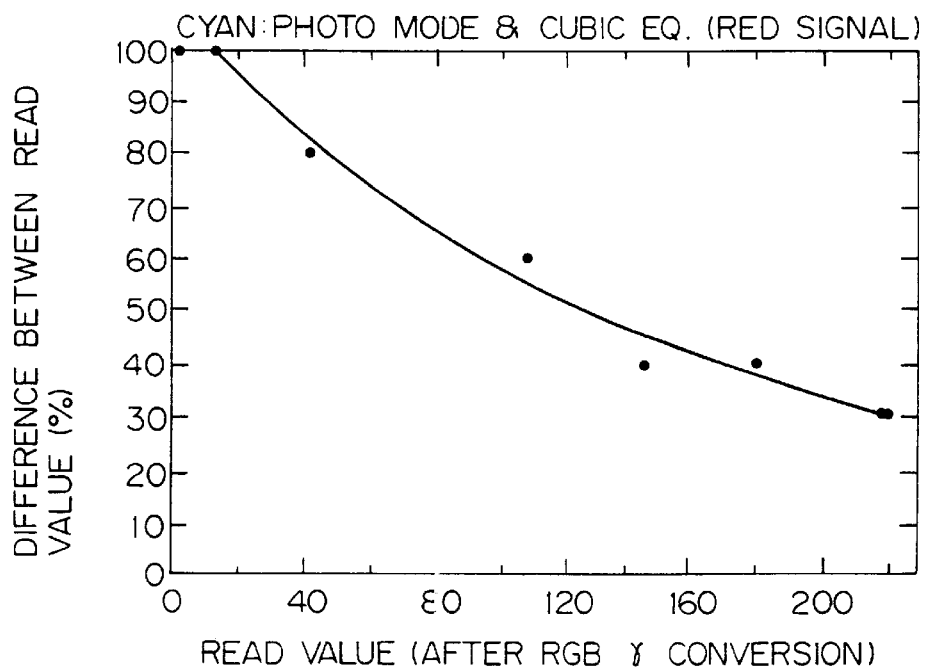
FIG. 43 shows values produced by fitting FIG. 36 with a cubic equation.

Likewise, FIG. 43 shows a result produced by fitting the read data fitted by a linear equation and undergone RGB conversion with a cubic equation. The result shown in FIG. 43 is more desirable for the same reason as stated in relation to FIG. 42. When the above data are used to reference the tables, a smoothing filter (e.g. ¼×(121)) is computed based on y{LD] and x[LD] in order to smooth the data points. This successfully frees the data from irregularity ascribable to, e.g., the creases of the recording medium and the irregular deposition of toner.

Figure 35B:
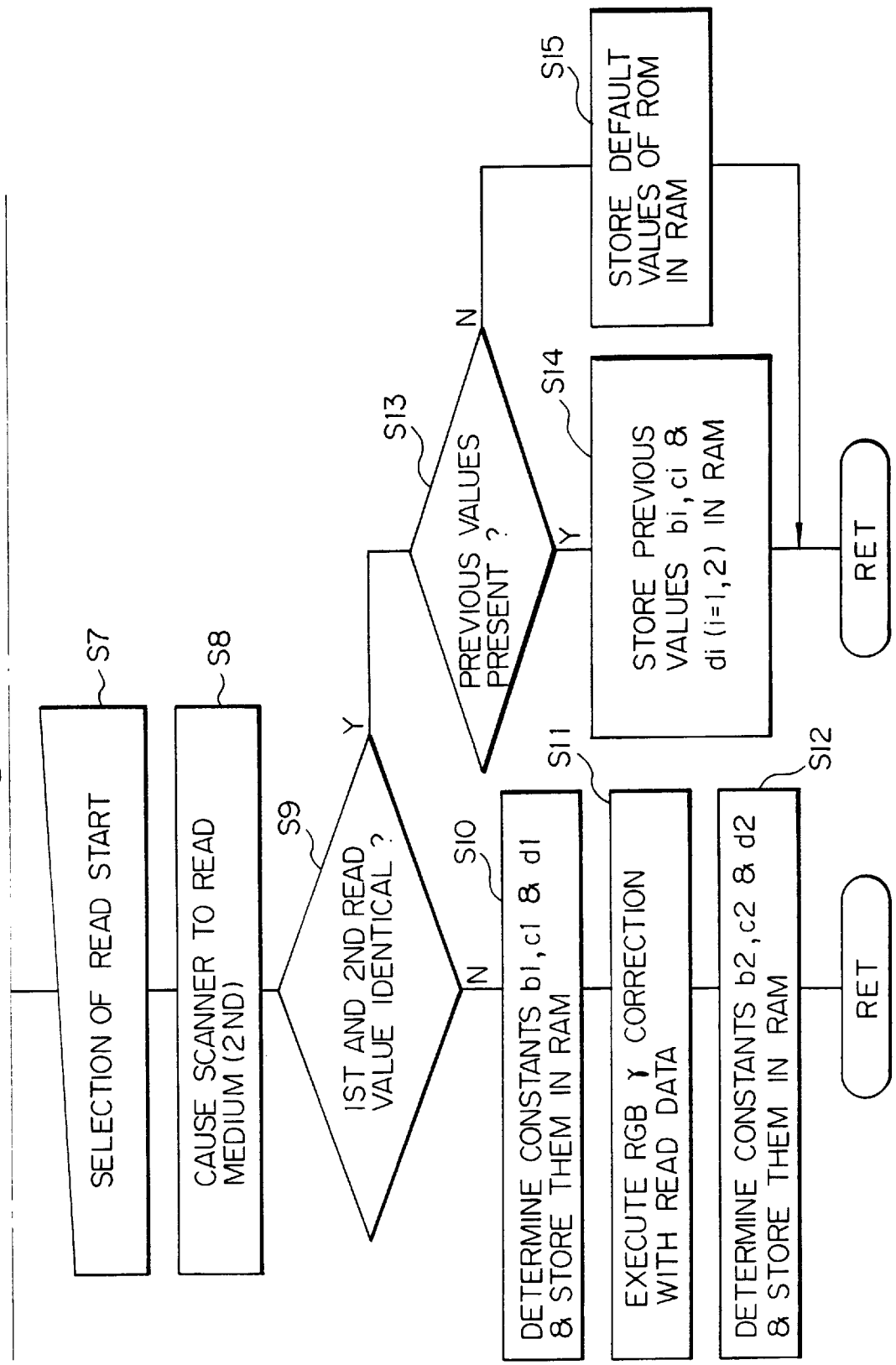
FIG. 35 is a flowchart demonstrating a procedure for producing an amount of background correction.

The above processing is executed in the step S10 or S12 shown in FIG. 35.

The contribution of the background depends on the color of toner, i.e., Y, M, C or K. In addition, the contribution depends on the color component output from the scanner, i.e., R, G or B, as determined by experiments. Therefore, the contribution ratio of background is determined with each of Y, M, C and K, and the coefficients of equations or reference tables are stored in the RAM. Then, in the event of generation or selection of a YMCK correction table, reference data and the contribution ratio of the background are selected, depending on the color Y, M, C or K of toner to be dealt with. The read values derived from the pattern are corrected on the basis of the reference data and contribution ratio selected.

When the Y, M, C or K toner is corrected by a signal complementary in color to the R, G or B output of the scanner, the contribution ratio of the background is determined with each of the B, G and R signals. Also, for each of the photo mode and text mode, the contribution ratio is determined color by color (Y, M, C and K) and stored in the RAM.

Figure 44:
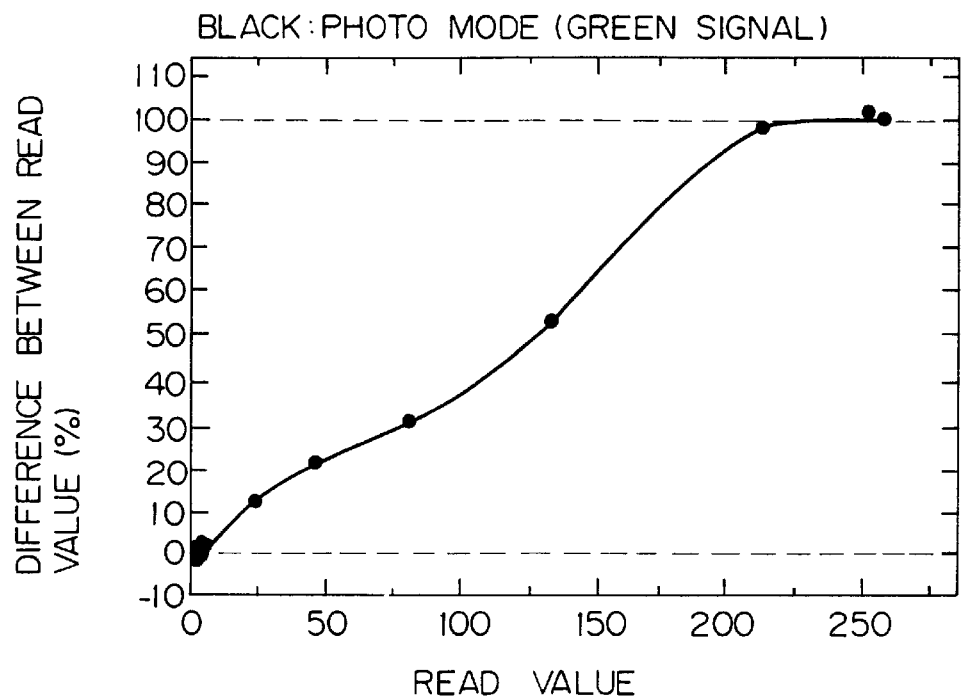
FIG. 44 shows the result of processing of values (G signal) read out of a photo mode pattern of black toner and not subjected to RBG γ correction.
Figure 45:
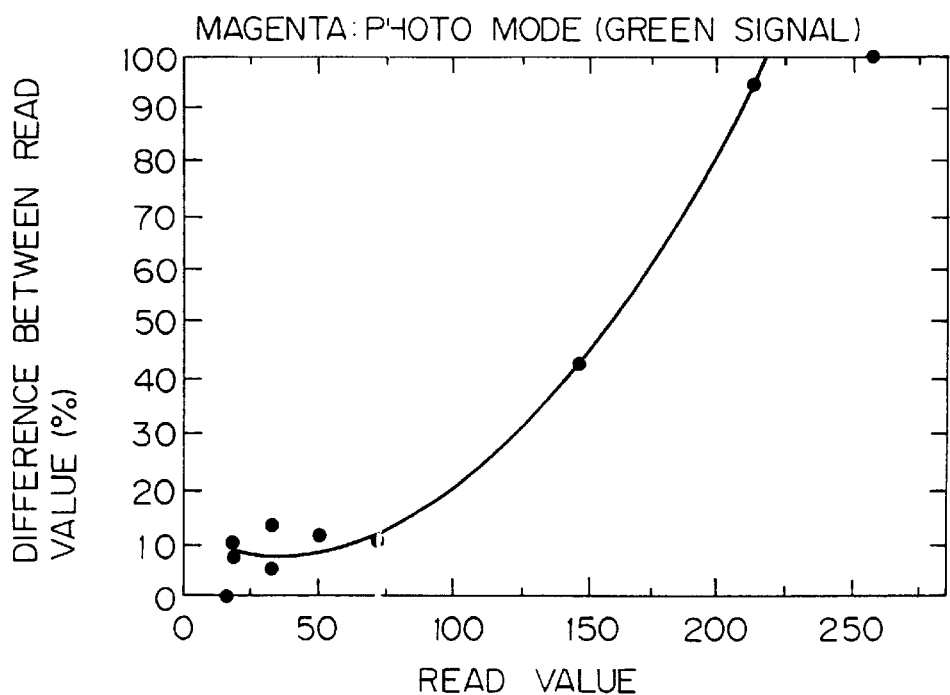
FIG. 45 corresponds to FIG. 44 except for the replacement of the K toner with M toner.
Figure 46:
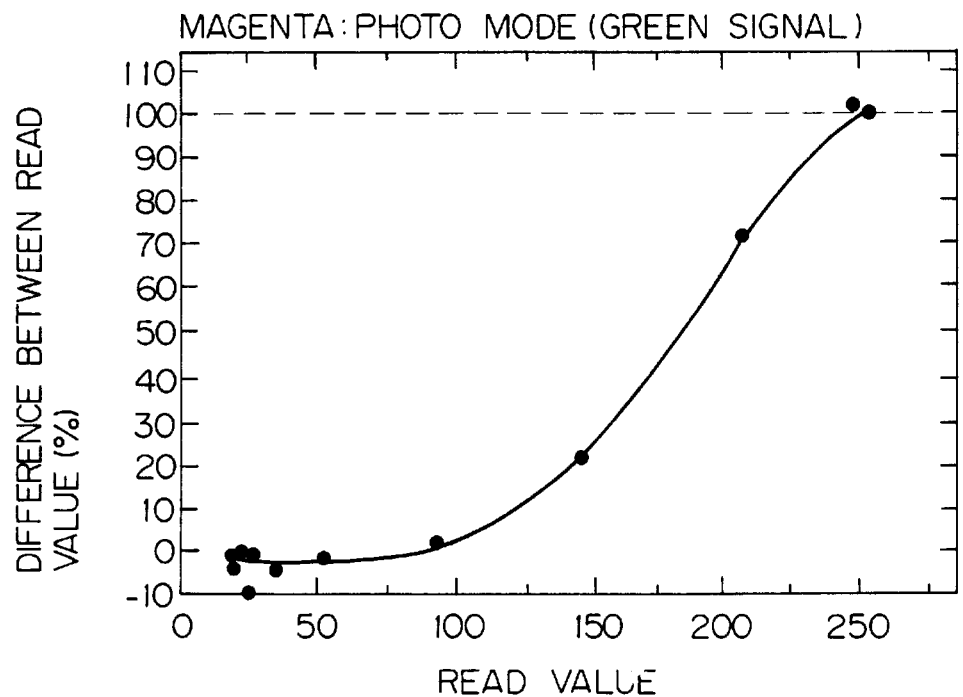
FIG. 46 corresponds to FIG. 44 except for the replacement of the K toner with M toner and the replacement of the photo mode with a text mode.
Figure 47:
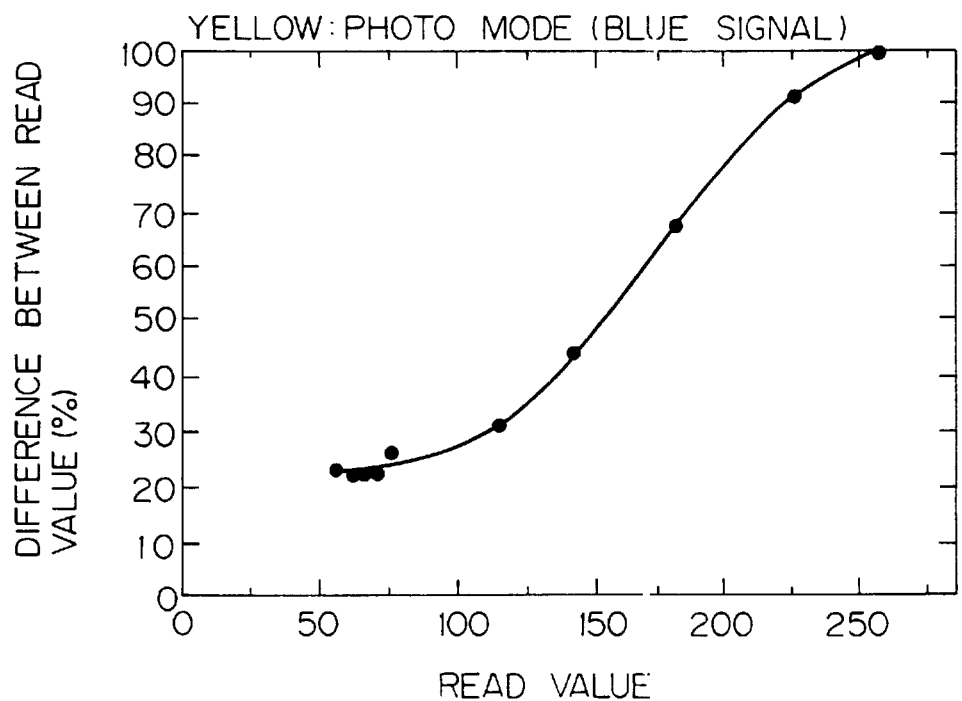
FIG. 47 corresponds to FIG. 44 except for the replacement of the K toner with Y toner.
Figure 48:
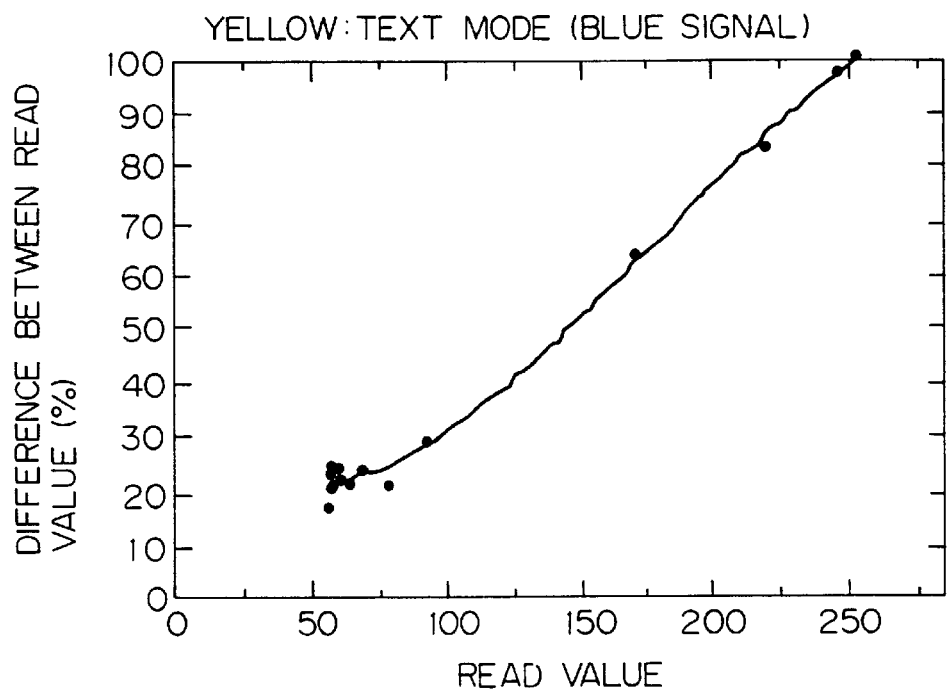
FIG. 48 corresponds to FIG. 44 except for the replacement of the K toner with Y toner and the replacement of the photo mode with a text mode.

FIG. 44 shows data produced when the previously stated processing was executed with values (green signal) read out of black pattern in the photo mode and not undergone RGBγ correction. FIG. 45 corresponds to FIG. 44 except that it is associated with magenta toner(green signal). FIG. 46 shows data (green signal) read out of a magenta pattern in the photo mode. FIG. 47 corresponds to FIG. 46 except that it is associated with yellow toner (blue signal). FIG. 48 shows values read out of a yellow pattern in the character mode (blue signal). As shown, the contribution of the background data included in the read values differs from one color to another color.

The above results show that the amount of correction of background data must be varied, depending on the color of toner or the corresponding signal component output from the scanner and the size of the value read out of the pattern. It is therefore necessary to store in the RAM the amount of correction of background data for each color of toner and for each signal component output from the scanner. Further, the amount of correction may be stored in the RAM for each of the text, photo and other modes in order to further enhance accurate correction.

B, G and R signals respectively complementary to the Y, M and C image patterns are used (in FIG. 26, the R signal is used because the color of toner is cyan). This is because the signal complementary to any one of Y, M and C has a broad dynamic range and therefore desirable S/N ratio. In addition, using a single component for the correction of image density makes the signal processing simple.

While the scanner outputs R, G and B components, the spectral characteristic of the scanner as to such three color components and that of the human visual sense are different. This results in a difference between the color sensed by a person and the color actually reproduced (metamerism). In order to avoid this, a color component having a spectral sensitivity characteristic other than R, G and B, e.g., cyan may be added. Then, a color component having the best dynamic range and best S/N ratio is selected for Y, M, C or K. While the correction table for the K toner may be based on any one of R, G and B, use is made of G having a relatively grat S/N ratio and a broad dynamic range.

With the above processing, it is possible to simply generate the YMCK correction tables without deteriorating accuracy. Moreover, the contribution ratios of the background occupy a minimum of area in the RAM, compared to the case wherein all the R, G and B components are stored.

Figure 49:
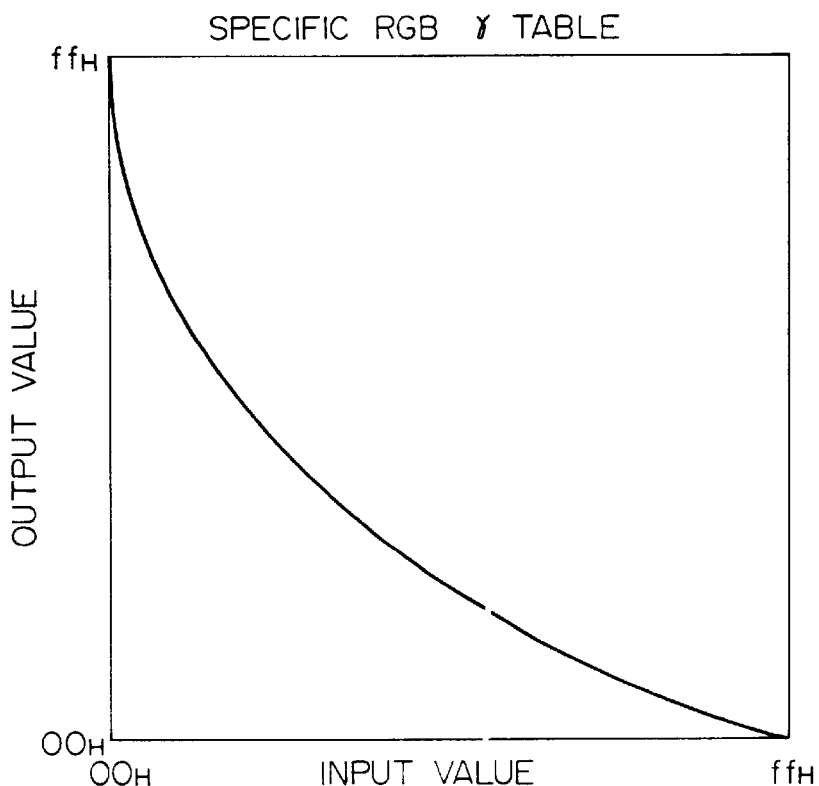
FIG. 49 shows a specific RBG γ correction table.

FIG. 49 shows a specific RGBγ conversion table used in the embodiment.

This embodiment has various unprecedented advantages as described along with the above processing particular thereto.

Various modifications will become possible for those skilled in the art after receiving the teachings of the present disclosure without departing from the scope thereof.

What is claimed is:

1. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal;

image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein said image signal transform table is corrected by reference data in response to an output signal of said image reading means reading image patterns formed by said image writing means and said image forming means on the basis of said plurality of patterns, and wherein said reference data includes said output signal of said image reading means and input values input to said image signal transform table and are corrected in accordance with read values read out of said plurality of patterns; and wherein said reference data includes reference data to be corrected and reference data not to be corrected and located at a low image density side and a high image density side of said read values with respect to said reference data to be corrected, and wherein a target density of an image density range to be corrected is produced from a ratio between a difference between, in a range not to be corrected, the reference data on the low image density side and the reference data at the high image density side, and a difference between said reference data on said low image density side and said read values.

2. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal;

image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein said image signal transform table is corrected by reference data in response to an output signal of said image reading means reading image patterns formed by said image writing means and said image forming means on the basis of said plurality of patterns, and wherein said reference data includes said output signal of said image reading means and input values input to said image signal transform table and are corrected in accordance with read values read out of said plurality of patterns; and means for setting an upper limit of an amount of correction of the reference data to be corrected, wherein a target density of an image density range to be corrected is produced from a ratio between a difference between, in a range not to be corrected, the reference data on the low image density side and the reference data at the high image density side, and a difference between said reference data on said low image density range and said read values, and said upper limit of said amount of correction.

3. An apparatus as claimed in claim 2, further comprising means for designating said upper limit continuously or stepwise.

4. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal; and image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein said image signal transform table is corrected by reference data in response to an output signal of said image reading means read image patterns formed by said image writing means and said image forming means on the basis of said plurality of patterns, and said reference data includes input values input to said image signal transform table, and wherein said apparatus further comprises means for designating a range of said reference data to be corrected in accordance with said read values read out of said plurality of patterns, and a range not to be corrected.

5. An apparatus as claimed in claim 4, wherein said reference data consist of reference data to be corrected and reference data not to be corrected and located at a low image density side and a high image density side of said read values with respect to said reference data to be corrected, and wherein a target density of an image density range to be corrected is produced from a ratio between a difference between, in a range not to be corrected, the reference data on the low image density side and the reference data at the high image density side, and a difference between said reference data on said low image density side and said read values.

6. An apparatus as claimed in claim 4, further comprising means for setting an upper limit of an amount of correction of the reference data to be corrected, wherein a target density of an image density range to be corrected is produced from a ratio between a difference between, in a range not to be corrected, the reference data on the low image density side and the reference data at the high image density side, and a difference between said reference data on said low image density range and said read values, and said upper limit of said amount of correction.

7. An apparatus as claimed in claim 6, further comprising means for designating said upper limit continuously or stepwise.

8. An apparatus as claimed in claim 4, further comprising selecting means for selectively executing the correction of said reference data.

9. An apparatus as claimed in claim 4, further comprising means for estimating an image density which can be output.

10. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal;

image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein in a procedure for correcting said image signal transform table with reference data in response to an output signal of said image reading means reading image patterns formed by said image writing means and said image forming means on the basis of said plurality of patterns, data representative of a background of the recording medium is read, and said output signal of said image reading means is corrected on the basis of said data; and means for varying an amount of correction based on said data of the background in accordance with a size of said output signal of said image reading means.

11. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal;

image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein in a procedure for correcting said image signal transform table with reference data in response to an output signal of said image reading means reading image patterns formed by said image writing means and said image forming means on the basis of said plurality of patterns, data representative of a background of the recording medium is read, and said output signal of said image reading means is corrected on the basis of said data; and means for varying an amount of correction based on said data of the background in accordance with a color of toner used or a color component of said image reading means.

12. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal;

image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein in a procedure for correcting said image signal transform table with reference data in response to an output signal of said image reading means reading image patterns formed by said image writing means and said image forming means on the basis of said plurality of patterns, data representative of a background of the recording medium is read, and said output signal of said image reading means is corrected on the basis of said data; and means for varying an amount of correction based on said data of the background, depending on whether or not said output signal of said image reading means is to be corrected in accordance with said image signal conversion table.

13. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal;

image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein in a procedure for correcting said image signal transform table with reference data in response to an output signal of said image reading means reading image patterns formed by said image writing means and said image forming means on the basis of said plurality of patterns data representative of a background of the recording medium is read, and said output signal of said image reading means is corrected on the basis of said data; and a reference table for varying an amount of correction based on said data of the background in accordance with a size of said output signal of said image reading means.

14. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal; and image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein in a procedure for correcting said image signal transform table with reference data in response to an output signal of said image reading means reading image patterns formed by said image writing means and said image forming means on the basis of said plurality of patterns, data representative of a background of the recording medium is read, and said output signal of said image reading means is corrected on the basis of said data;

wherein said output signal of said image reading means comprises at least an R, a G and a B component, and wherein one of said R, G and B components having a maximum dynamic range is used to generate or select a YMC tonality transform table.

15. An image forming apparatus comprising:

image reading means for reading a document located at a preselected position by optically scanning the document to thereby output an image signal;

image processing means for transforming said image signal to an output image signal;

image writing means for writing information on an image carrier in accordance with said output image signal; and image forming means for forming an image on a recording medium with a developer;

said image processing means or said image writing means including an image signal generating device for generating a plurality of patterns and an image signal transform table disposed in said image processing means for transforming said image signal output from said image reading means to said output image signal;

wherein said image signal transform table is corrected by reference data in response to an output signal of said image reading means read image patterns formed by said image writing means and said image forming means on the basis of said plurality of patterns, wherein said output signal of said image reading means is corrected in accordance with reference data and data representative of a background of the recording medium, and wherein an amount of correction of said data of the background is determined on the basis of a result of comparison between a signal output from said image reading means when a reflectance of a material forming a rear of the recording medium carrying said patterns is increased and a signal output when said reflectance is reduced.

16. An apparatus as claimed in claim 15, the reflectance is increased by a white paper laid on the rear of the recording medium and decreased by a black paper laid on the rear of the recording medium or by opening a cover plate or an ADF.

17. An apparatus as claimed in claim 15, further comprising means for varying an amount of correction based on said data of the background in accordance with a size of said output signal of said image reading means.

18. An apparatus as claimed in claim 15, wherein an amount of correction based on said data of the background is varied in accordance with a color of toner used or a color component of said image reading means.

19. An apparatus as claimed in claim 15, wherein an amount of correction based on said data of the background is varied, depending on whether or not said output signal of said image reading means is to be corrected in accordance with said image signal conversion table.

20. An apparatus as claimed in claim 15, wherein a reference table is generated for determining an amount of correction of said data of the background in accordance with a size of said output signal of said image reading means, or a coefficient of an equation which is a result if fitting is computed, and wherein said reference table or said coefficient is stored.

21. An apparatus as claimed in claim 15, wherein said output signal of said image reading means consists of at least an R, a G and a B component, and wherein one of said R, G and B components having a maximum dynamic range is used to generate or select a YMC tonality transform table.

* * * * *